United States Patent
Mestha et al.

(10) Patent No.: US 10,931,687 B2
(45) Date of Patent: Feb. 23, 2021

(54) CYBER-ATTACK DETECTION, LOCALIZATION, AND NEUTRALIZATION FOR UNMANNED AERIAL VEHICLES

(71) Applicant: General Electric Company, Schenectady, NY (US)

(72) Inventors: Lalit Keshav Mestha, North Colonie, NY (US); Olugbenga Anubi, Niskayuna, NY (US); Justin Varkey John, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 307 days.

(21) Appl. No.: 15/899,903

(22) Filed: Feb. 20, 2018

(65) Prior Publication Data

US 2019/0260768 A1 Aug. 22, 2019

(51) Int. Cl.
*H04L 29/06* (2006.01)
*G06F 21/50* (2013.01)
(Continued)

(52) U.S. Cl.
CPC .......... *H04L 63/1416* (2013.01); *G06F 21/50* (2013.01); *G06N 20/00* (2019.01);
(Continued)

(58) Field of Classification Search
CPC . H04L 63/1416; H04L 63/1466; H04L 63/14; H04L 29/06; G06N 20/00;
(Continued)

(56) References Cited

U.S. PATENT DOCUMENTS 9,178,903 B1 * 11/2015 Kaplan ............... H04L 63/1433
9,516,053 B1 * 12/2016 Muddu ................. G06F 16/254
(Continued)

FOREIGN PATENT DOCUMENTS

CA 106649727 A 5/2017

OTHER PUBLICATIONS

Kwon, Cheolhyeon et al., "Security Analysis for Cyber-Physical Systems Against Stealthy Deception Attacks", American Control Conference, http://ieeexplore.ieee.org/abstract/document/6580348/, Jun. 17-19, 2013, (pp. 3344-3349, 6 total pages).
(Continued)

*Primary Examiner* — Alexander Lagor
*Assistant Examiner* — Quazi Farooqui
(74) *Attorney, Agent, or Firm* — Buckley, Maschoff & Talwalkar LLC

(57) ABSTRACT

In some embodiments, an Unmanned Aerial Vehicle ("UAV") system may be associated with a plurality of monitoring nodes, each monitoring node generating a series of monitoring node values over time that represent operation of the UAV system. An attack detection computer platform may receive the series of current monitoring node values and generate a set of current feature vectors. The attack detection computer platform may access an attack detection model having at least one decision boundary (e.g., created using a set of normal feature vectors a set of attacked feature vectors). The attack detection model may then be executed and the platform may transmit an attack alert signal based on the set of current feature vectors and the at least one decision boundary. According to some embodiments, attack localization and/or neutralization functions may also be provided.

20 Claims, 56 Drawing Sheets

(51) Int. Cl.
*G06N 20/00* (2019.01)
*B64C 39/02* (2006.01)
*G08G 5/00* (2006.01)
*G06F 21/55* (2013.01)

(52) U.S. Cl.
CPC ........ *H04L 63/1466* (2013.01); *B64C 39/024* (2013.01); *G06F 21/554* (2013.01); *G08G 5/0026* (2013.01); *G08G 5/0069* (2013.01); *H04L 63/14* (2013.01)

(58) Field of Classification Search
CPC ..... G06F 21/50; G06F 21/554; G08G 5/0026; G08G 5/0069; B64C 39/024
See application file for complete search history.

(56) References Cited

U.S. PATENT DOCUMENTS

| | | | | |
|---|---|---|---|---|
| 2012/0039395 | A1* | 2/2012 | Jannarone | G06K 9/3241 375/240.18 |
| 2012/0131130 | A1* | 5/2012 | Field | H04L 12/4035 709/217 |
| 2013/0312092 | A1* | 11/2013 | Parker | H04L 63/1408 726/22 |
| 2014/0324253 | A1 | 10/2014 | Duggan et al. | |
| 2015/0378339 | A1 | 12/2015 | Ji | |
| 2016/0216708 | A1 | 7/2016 | Krivoshein et al. | |
| 2016/0285907 | A1 | 9/2016 | Nguyen et al. | |
| 2017/0054751 | A1* | 2/2017 | Schneider | H04L 63/1425 |
| 2017/0162059 | A1 | 6/2017 | Jarrell | |
| 2017/0208151 | A1* | 7/2017 | Gil | H04L 67/1097 |
| 2017/0214708 | A1 | 7/2017 | Gukal et al. | |
| 2017/0264629 | A1* | 9/2017 | Wei | H04L 63/1433 |
| 2017/0316342 | A1* | 11/2017 | Franc | G06F 17/11 |
| 2018/0124091 | A1* | 5/2018 | Sweeney | G06F 16/2228 |
| 2018/0270244 | A1* | 9/2018 | Kumar | H04L 9/3239 |
| 2018/0330201 | A1* | 11/2018 | Witbrock | G06K 9/6278 |
| 2019/0005791 | A1* | 1/2019 | Keshavarzian | G08B 29/188 |
| 2019/0222597 | A1* | 7/2019 | Crabtree | H04L 43/08 |

OTHER PUBLICATIONS

Pasqualetti, Fabio et al., "Attack Detection and Identification in Cyber-Physical Systems", IEEE Transactions on Automatic Control, http://ieeexplore.ieee.org/abstract/document/6545301/, vol. 58, Issue 11, Nov. 2013, DOI: 10.1109/TAC.2013.2266831, (pp. 2715-2729, 15 total pages).

Petnga, Leonard et al., "Security of Unmanned Aerial Vehicles: Dynamic State Estimation Under Cyber-Physical Attacks", International Conference on Unmanned Aircraft Systems, http://ieeexplore.ieee.org/abstract/document/7502663/, Jun. 7-10, 2016, (pp. 811-819, 9 total pages).

\* cited by examiner $$x(k+1) = \begin{bmatrix} y(k+1) \\ y(k) \\ y(k-1) \\ \vdots \\ y(k-p+2) \end{bmatrix} = \begin{bmatrix} A_1 & A_2 & \cdots & A_{p-1} & A_p \\ I & 0 & \cdots & 0 & 0 \\ 0 & I & \cdots & 0 & 0 \\ \vdots & \vdots & \ddots & \vdots & \vdots \\ 0 & 0 & \cdots & I & 0 \end{bmatrix} \underbrace{\begin{bmatrix} y(k) \\ y(k-1) \\ y(k-2) \\ \vdots \\ y(k-p+1) \end{bmatrix}}_{x(k)} + \begin{bmatrix} b \\ 0 \\ 0 \\ \vdots \\ 0 \end{bmatrix} u(k) + \begin{bmatrix} I \\ 0 \\ 0 \\ \vdots \\ 0 \end{bmatrix} e(k)$$

$$y(k) = [I \quad 0 \quad \cdots \quad 0]x(k)$$

FIG. 26

VIRTUAL SENSOR LOOKUP TABLE — 3700

| VIRTUAL SENSOR MATRIX 3710 | SIGNAL BEING ESTIMATED 3720 |
|---|---|
| $C_{1,1}$ | ALTITUDE |
| $C_{2,1}$ | VELOCITY |
| $C_{3,1}$ | ACCELERATION |
| $C_{4,1}$ | PITCH |
| $C_{5,1}$ | LATITUDE |
| $C_{6,1}$ | LONGITUDE |
| $C_{1,2}$ | ALTITUDE, VELOCITY |
| .... | .... |
| $C_{15,2}$ | PITCH, LATITUDE |

*FIG. 37*

| UAV IDENTIFIER 5602 | UAV DESCRIPTION 5604 | VIRTUAL SENSOR IDENTIFIER 5606 | MATRIX 5608 | DESCRIPTION 5610 | STATUS 5612 |
|---|---|---|---|---|---|
| UAV_2001 | DRONE MODEL A | VS_01 | C1,1 | ALTITUDE | NORMAL |
| UAV_2001 | DRONE MODEL A | VS_02 | C2,1 | VELOCITY | ATTACKED |
| UAV_2001 | DRONE MODEL A | VS_03 | C5,1 | PITCH | PREDICTED |
| UAV_2002 | DRONE MODEL B | VS_04 | C1,2 | PITCH, YAW | NORMAL |

CYBER-ATTACK DETECTION, LOCALIZATION, AND NEUTRALIZATION FOR UNMANNED AERIAL VEHICLES

This invention was made with Government support under contract number DEOE0000833 awarded by the Department of Energy. The Government has certain right in this invention.

BACKGROUND

Unmanned Aerial Vehicle ("UAV") systems (e.g., drones that perform a survey function, a fleet of UAVs that inspect UAV systems, etc.) are increasingly connected to the Internet. As a result, these control systems have been increasingly vulnerable to threats, such as cyber-attacks (e.g., associated with a computer virus, malicious software, etc.), that could disrupt the operation of the UAV system. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a UAV. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect a UAV system, such as failure and diagnostics technologies, may not adequately address these problems—especially when multiple, simultaneous attacks occur since such multiple faults/failure diagnostic technologies are not designed for detecting stealthy attacks in an automatic manner.

It may be important to maintain UAV system functionality during an attack. For example, an operator may want a drone to continue operation even when one or more sensors, actuators, etc. are the subject of a cyber-attack. Moreover, it may be advantageous to provide protection for a UAV system without requiring redundant components (e.g., UAV systems) and/or any major changes and/or re-design of controllers.

SUMMARY

According to some embodiments, an Unmanned Aerial Vehicle ("UAV") system may be associated with a plurality of monitoring nodes, each monitoring node generating a series of monitoring node values over time that represent operation of the UAV system. An attack detection computer platform may receive the series of current monitoring node values and generate a set of current feature vectors. The attack detection computer platform may access an attack detection model having at least one decision boundary (e.g., created using a set of normal feature vectors a set of attacked feature vectors). The attack detection model may then be executed and the platform may transmit an attack alert signal based on the set of current feature vectors and the at least one decision boundary. According to some embodiments, attack localization and/or neutralization functions may also be provided Some embodiments comprise: means for performing cyber-attack detection for a UAV system; means for performing cyber-attack localization for the UAV system; and/or means for performing cyber-attack neutralization for the UAV system.

Some technical advantages of some embodiments disclosed herein are improved systems and methods to protect one or more UAVs from cyber-attacks in an automatic and accurate manner.

BRIEF DESCRIPTION OF THE DRAWINGS

FIG. 26 illustrates a VAR(p) model conversion into a standard state space structure according to some embodiments.

FIG. 37 includes a portion of a virtual sensor lookup table according to some embodiments.

FIG. 56 is portion of a tabular virtual sensor database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

A UAV system may include one or more UAVs (e.g., drones) that each use number of sensors, actuators, and/or controllers to stabilize an individual flight path or a group of UAVs flying in a coordinated/cooperative fashion to accomplish an intended task (e.g., an inspection process). By ways of examples, the sensors, actuators, and reference inputs may include Inertial Measurement Unit ("IMU") sensors (e.g., outputting six coordinates, a three-dimensional motion tracking signal, etc.), a Global Positioning System ("GPS") sensor receive signal (e.g., outputting altitude, latitude, longitude, etc.), inter-UAV communication sensors (e.g., outputting position commands, velocity, acceleration, etc.), a camera feed sensor, multiple motor control actuators (e.g., outputting signals for six motors), reference inputs (e.g., communication of coordinates from remote control centers), etc.

Figure 1:
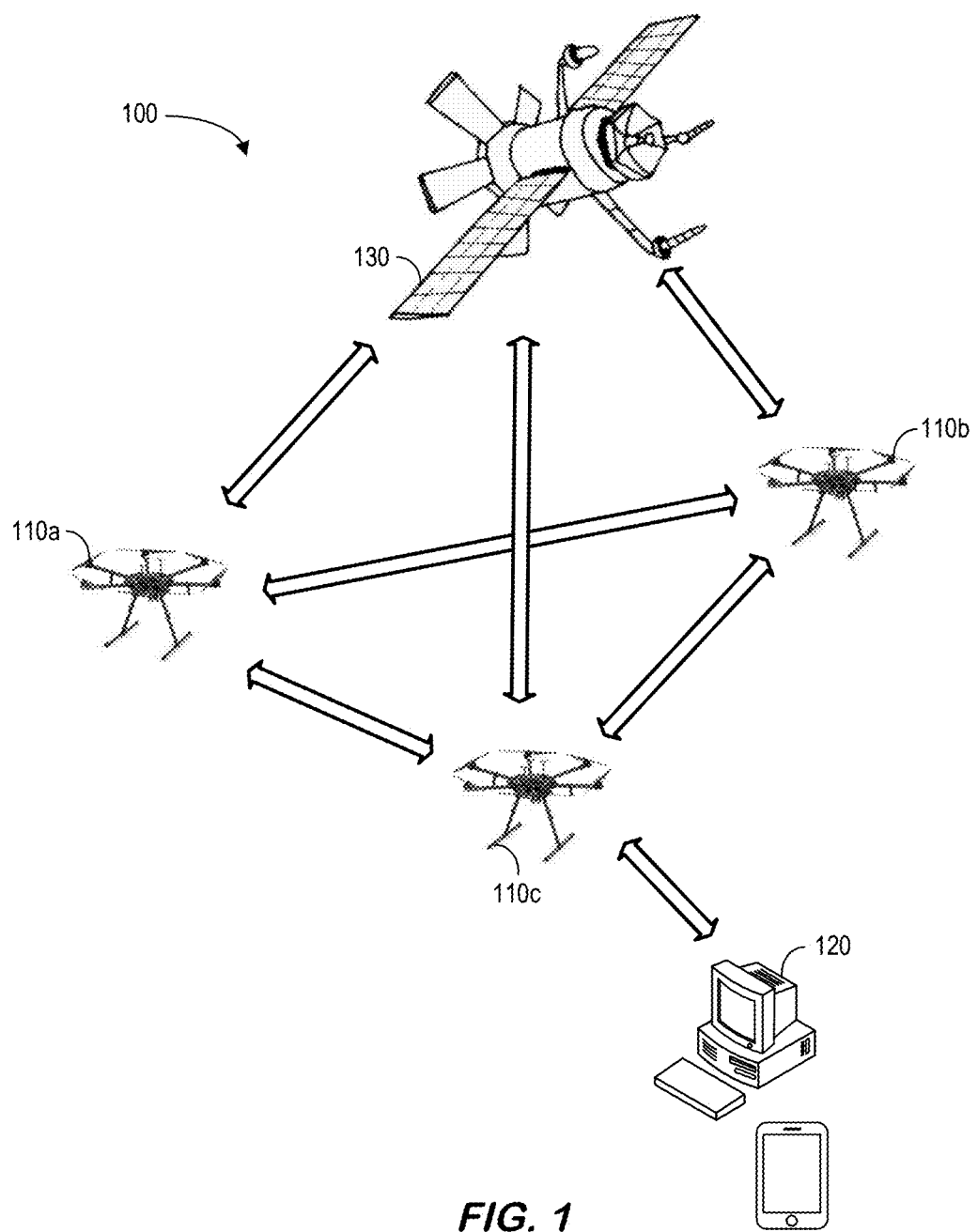
FIG. 1 is a high-level overview of a UAV system according to some embodiments.
Figure 2:
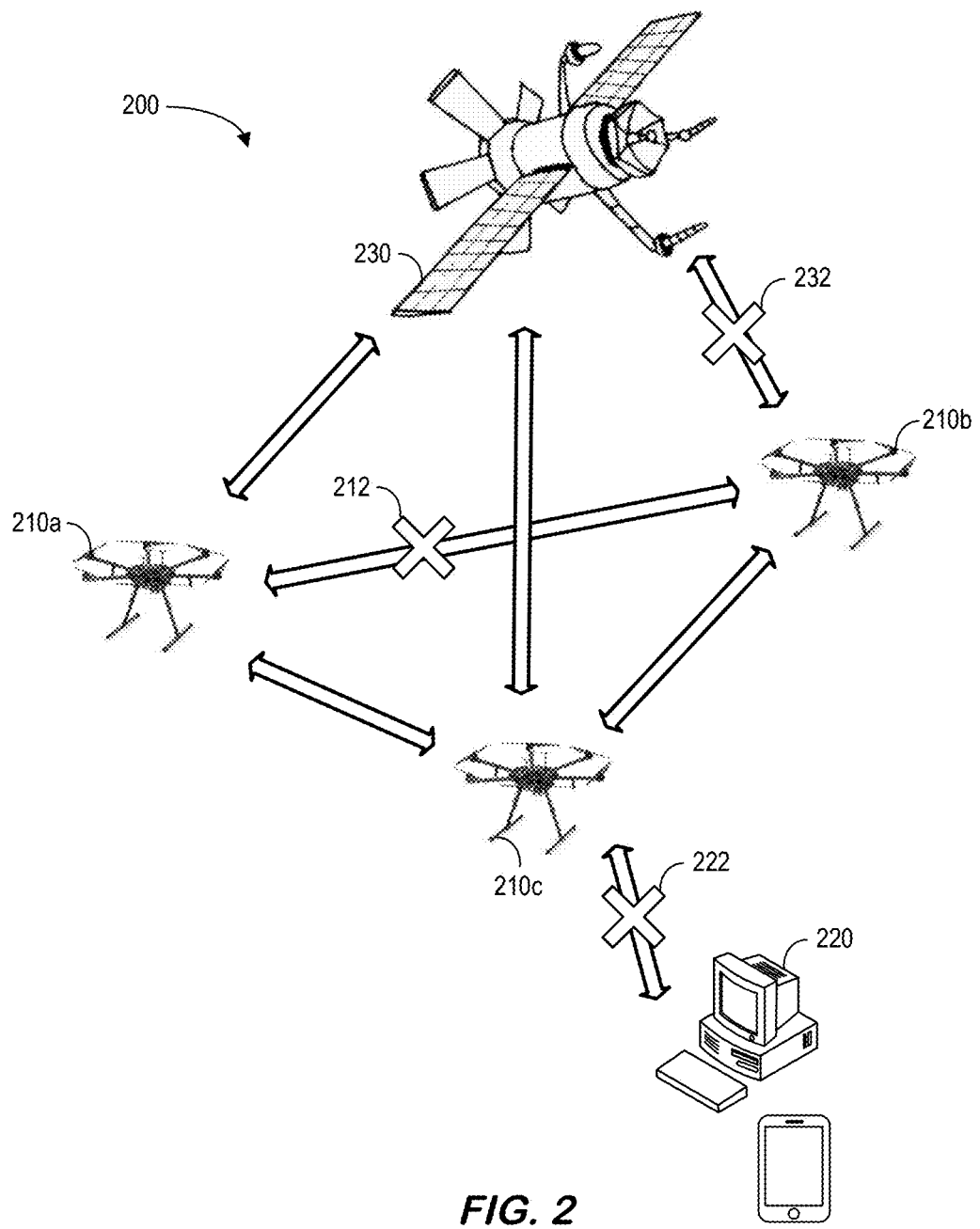
FIG. 2 illustrates some ways in which a UAV system might be compromised in accordance with some embodiments.

Each UAV can be viewed as part of a Cyber-Physical System ("CPS") with a networked wireless communication and control system. For example, FIG. 1 is a high-level overview of a UAV system 100 including drones 110a, 110b, 110c, operator devices 120, and one or more satellites according to some embodiments. Note that the security of the system 100 can be extremely important. Although the communication of information to each drone 110a, 110b, 110c might be secure, the entire networked control system, including time-critical operations occurring in the control system, might not be secure (and, as a result, may be vulnerable to malicious attacks). For example, an attacker may obtain unauthorized access and launch jamming attacks, spoof sensor readings, and/or apply erroneous signals to actuators to cause visible and/or stealthy harm. FIG. 2 illustrates some ways in which a UAV system 200 might be compromised in accordance with some embodiments. In particular, an attacker might compromise 212 communications between drones 210a, 210b, 210c, compromise 222 communication between an operator device 220 and the drones 210a, 210b, 210c, and/or compromise 232 communications between one or more satellites 230 and the drones 210a, 210b, 210c.

Figure 3:
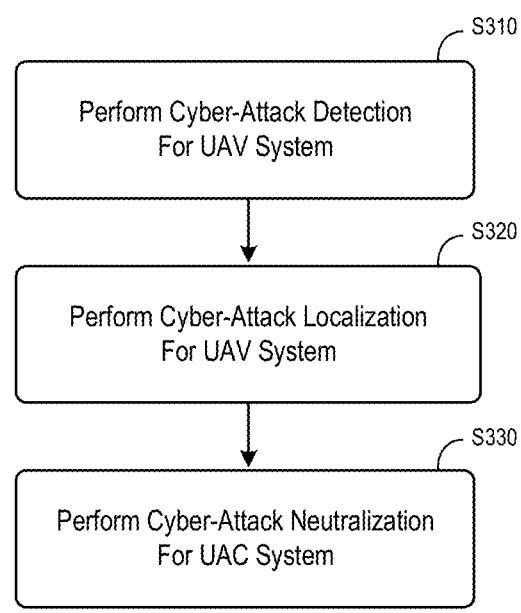
FIG. 3 illustrates a method of protecting one or more UAVs according to some embodiments.

Embodiments described herein may protect UAVs by making their control systems resilient to attacks. In particular, a system may monitor behavior and then take actions in substantially real-time as a self-defender to protect the flight path and to continue with the mission. FIG. 3 illustrates a method of protecting one or more UAVs according to some embodiments. At S310, the system may perform cyber-attack detection for a UAV system (as described in connection with FIGS. 4 through 11). At S320, the system may perform cyber-attack localization for the UAV system (as described in connection with FIGS. 12 through 33). At S330, the system may perform cyber-attack neutralization for the UAV system (as described in connection with FIGS. 34 through 52).

Figure 4:
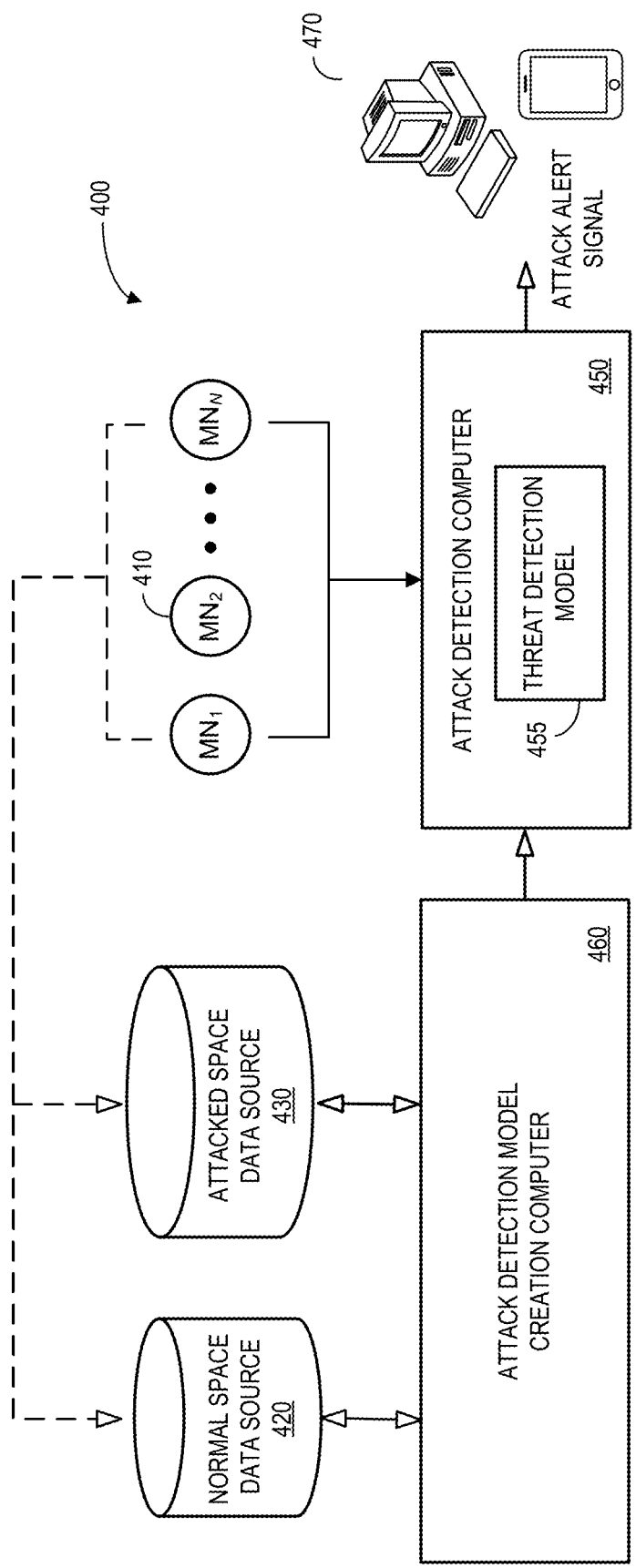
FIG. 4 is a high-level block diagram of a system that may be provided in accordance with some embodiments.

Note that UAV systems are increasingly connected to the Internet. As a result, UAV control systems have been increasingly vulnerable to threats and, in some cases, multiple attacks may occur simultaneously. Existing approaches to protect a UAV system, such as failure and diagnostics technologies, may not adequately address these threats—especially when multiple, simultaneous attacks occur. It would therefore be desirable to protect a UAV system from cyber threats in an automatic and accurate manner. FIG. 4 is a high-level architecture of a system 400 in accordance with some embodiments. The system 400 may include monitoring node sensors 410 $MN_1$ through $MN_N$, a "normal space" data source 420, and an "attacked space" data source 430. The normal space data source 420 might store, for each of the plurality of monitoring nodes 410, a series of normal values over time that represent normal operation of a UAV system (e.g., generated by a model or collected from actual sensor data as illustrated by the dashed line in FIG. 4). The attacked space data source 430 might store, for each of the monitoring nodes 410, a series of attacked values that represent a threatened operation of the UAV system (e.g., when the system is experiencing a cyber-attack).

Information from the normal space data source 410 and the attacked space data source 420 may be provided to an attack detection model creation computer 460 that uses this data to create a decision boundary (that is, a boundary that separates normal behavior from threatened behavior). The decision boundary may then be used by an attack detection computer 450 executing a threat detection model 455. The threat detection model 455 may, for example, monitor streams of data from the monitoring nodes 410 comprising data from sensor nodes, actuator nodes, and/or any other critical monitoring nodes (e.g., sensor nodes $MN_1$ through $MN_N$) and automatically output an attack alert signal to one or more remote monitoring devices 470 when appropriate (e.g., for display to an operator). As used herein, the term "automatically" may refer to, for example, actions that can be performed with little or no human intervention. According to some embodiments, information about detected threats may be transmitted back to a UAV control system.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The attack detection model creation computer 460 may store information into and/or retrieve information from various data stores, such as the normal space data source 420 and/or the attacked space data source 430. The various data sources may be locally stored or reside remote from the attack detection model creation computer 460. Although a single attack detection model creation computer 460 is shown in FIG. 4, any number of such devices may be included. Moreover, various devices described herein might be combined according to embodiments of the present invention. For example, in some embodiments, the attack detection model creation computer 460 and one or more data sources 420, 430 might comprise a single apparatus. The attack detection model creation computer 460 functions may be performed by a constellation of networked apparatuses, in a distributed processing or cloud-based architecture.

A user may access the system 400 via one of the monitoring devices 470 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., attack detection trigger levels) and/or provide or receive automatically generated recommendations or results from the attack detection model creation computer 460 and/or attack detection computer 450.

Figure 5:
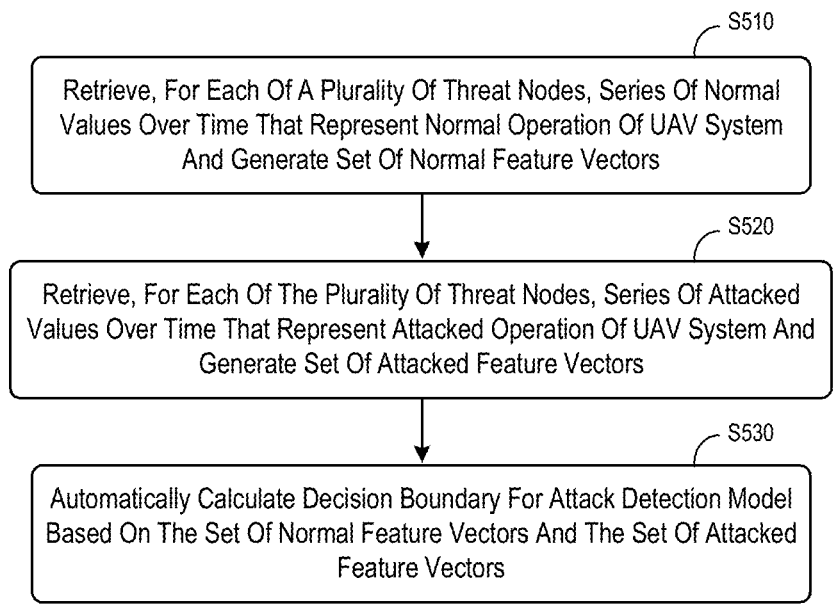
FIG. 5 is a model creation method according to some embodiments.

For example, FIG. 5 illustrates a model creation method that might be performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, the system may retrieve, for each of a plurality of threat nodes (e.g., monitoring nodes), a series of normal values over time that represent normal operation of the UAV system and a set of normal feature vectors may be generated. Similarly, at S520 the system may retrieve, for each of the plurality of threat nodes, a series of attacked values over time that represent an attacked operation of the UAV system and a set of attacked feature vectors may be generated. The series of normal and/or attacked values might be obtained, for example, by running Design of Experiments ("DoE") on a UAV system. At S530, a decision boundary may be automatically calculated for an attack detection model based on the set of normal feature vectors and the set of attacked feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space. In addition, note that the attack detection model might be associated with the decision boundary, feature mapping functions, and/or feature parameters.

Figure 6:
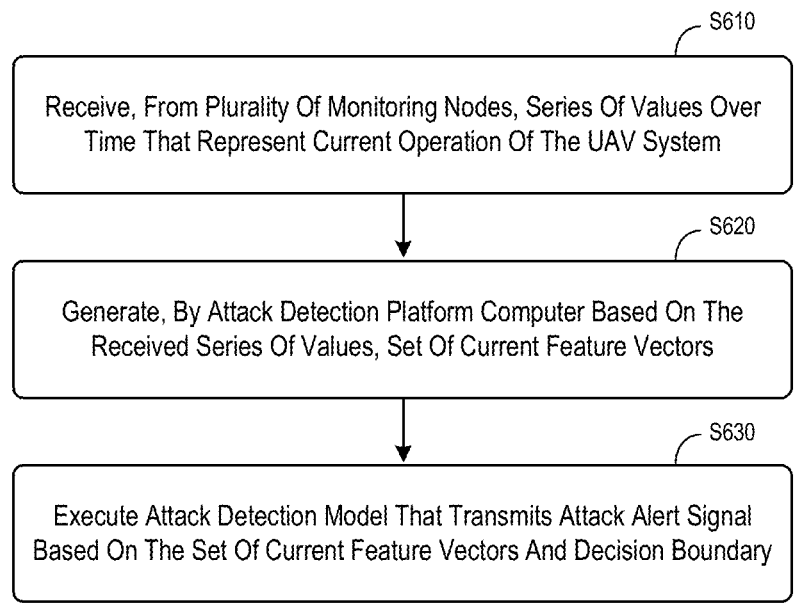
FIG. 6 is threat alert method according to some embodiments.

The decision boundary can then be used to detect cyber-attacks. For example, FIG. 6 is an attack alert method according to some embodiments. At S610, the system may receive, from a plurality of monitoring nodes, a series of current values over time that represent a current operation of the UAV system. At S620, an attack detection platform computer may then generate, based on the received series of current values, a set of current feature vectors. At S630, an attack detection model may be executed to transmit an attack alert signal based on the set of current feature vectors and a decision boundary when appropriate (e.g., when a cyber-attack is detected). According to some embodiments, one or more response actions may be performed when an attack alert signal is transmitted. For example, the system might automatically shut down all or a portion of the UAV system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 7:
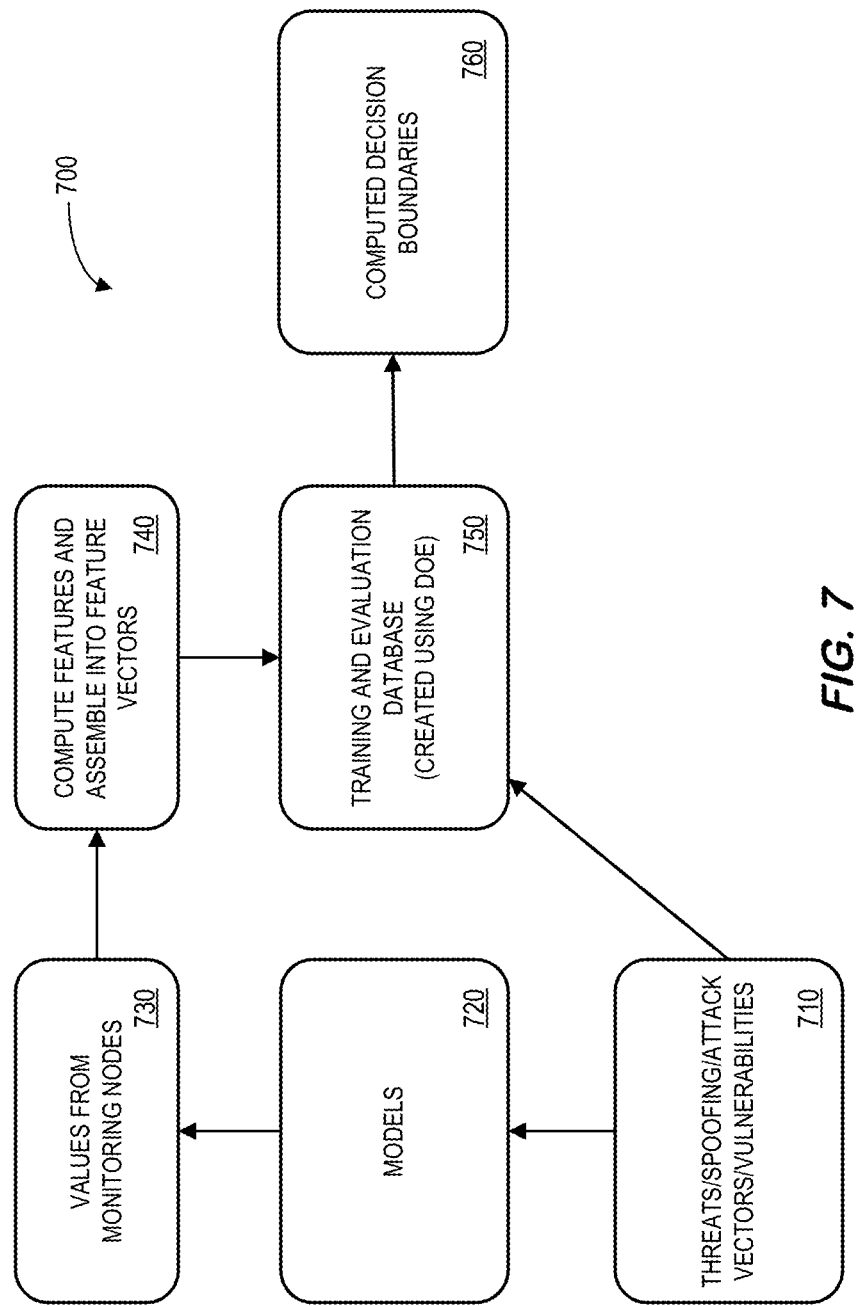
FIG. 7 illustrates an off-line process in accordance with some embodiments.

FIG. 7 illustrates an off-line boundary creation process 700 in accordance with some embodiments. Information about threats, spoofing, attack vectors, vulnerabilities, etc. 710 may be provided to models 720 and/or a training and evaluation database 750 created using DoE techniques. The models 720 may, for example, simulate data 730 from monitoring nodes to be used to compute features that are assembled into a feature vector 740 to be stored in the training and evaluation database 750. The data in the training and evaluation database 750 may then be used to compute decision boundaries 760 to distinguish between normal operation and attacked operation. According to some embodiments, the process 700 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 720 may comprise high-fidelity models that can be used to create a data set (e.g., a set that describes threat space as "levels of threat conditions in the system versus quantities from the threat nodes"). The data 730 from the threat nodes might be, for example, quantities that are captured for a length of from 60 to 80 seconds from sensor nodes, actuator nodes, and/or controller nodes (and a similar data set may be obtained for "levels of normal operating conditions in the system versus quantities from the threat nodes"). This process will result in data sets for "attack space" and "normal space." The 60 to 80 seconds long quantities may be used to compute features 740 using feature engineering to create feature vectors. These feature vectors can then be used to obtain a decision boundary that separates the data sets for threat space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 8:
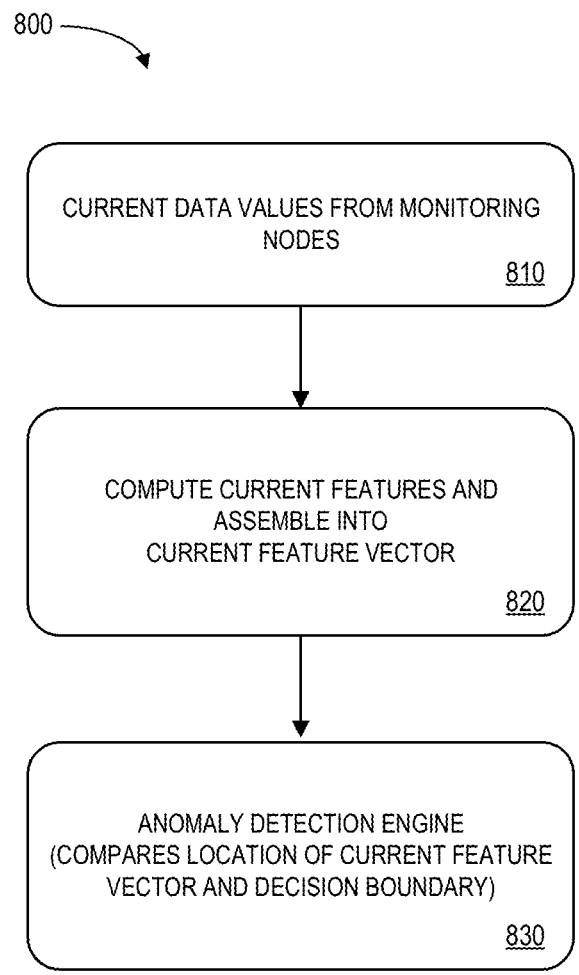
FIG. 8 illustrates a real-time process according to some embodiments.

FIG. 8 illustrates a real-time process 800 to protect a UAV system according to some embodiments. At 810, current data from monitoring nodes may be gathered (e.g., in batches of from 60 to 80 seconds). At 820, the system may compute features and form feature vectors. For example, the system might use weights from a principal component analysis as features. At 830, an anomaly detection engine may compare location of feature vectors to a decision boundary to make a determination (and output an alert signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 9:
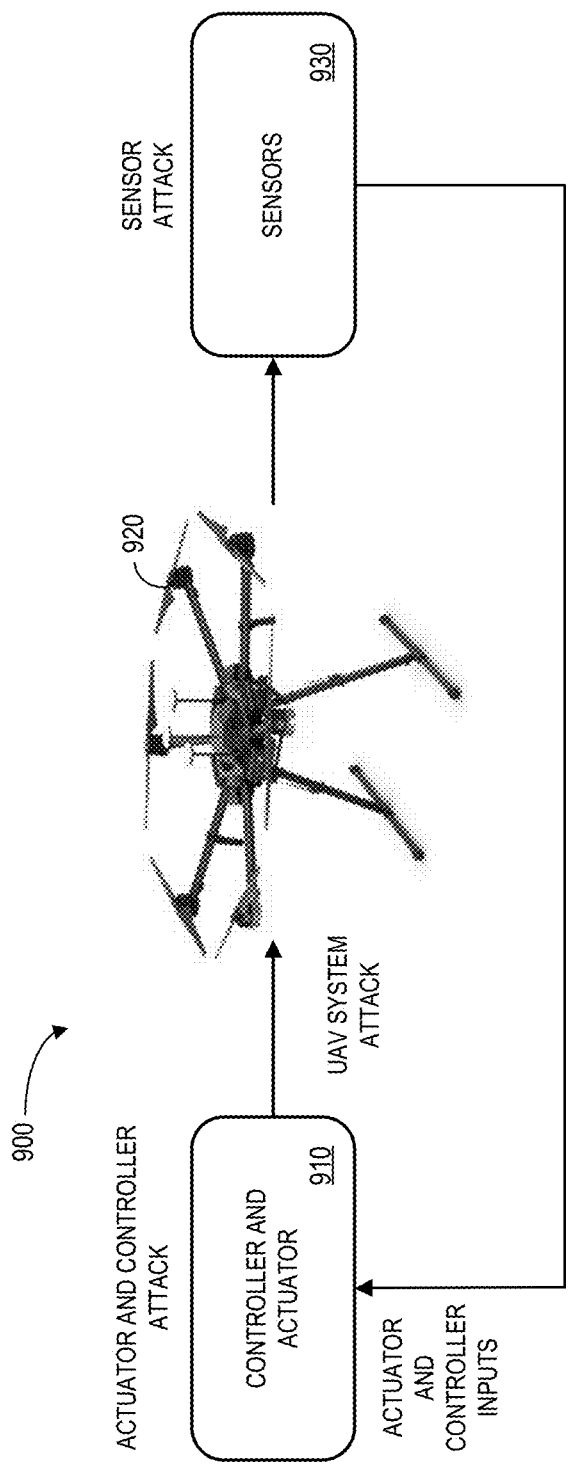
FIG. 9 is an example associated with a UAV engine in accordance with some embodiments.

FIG. 9 is an example 900 associated with a UAV system in accordance with some embodiments. In particular, the example includes a controller and actuator portion 910 subject to actuator and controller attacks, a drone portion 920 subject to drone state attacks, and sensors 930 subject to sensor attacks. By way of examples only, the sensors 930 might comprise physical and/or virtual sensors associated with altitude, velocity, acceleration, pitch, yaw, etc. The actuators might be associated with, for example, motors. By monitoring the information in the UAV system, a threat detection platform may be able to detect cyber-attacks (e.g., using feature vectors and a decision boundary) that could potentially cause a large amount of damage.

Figure 10:
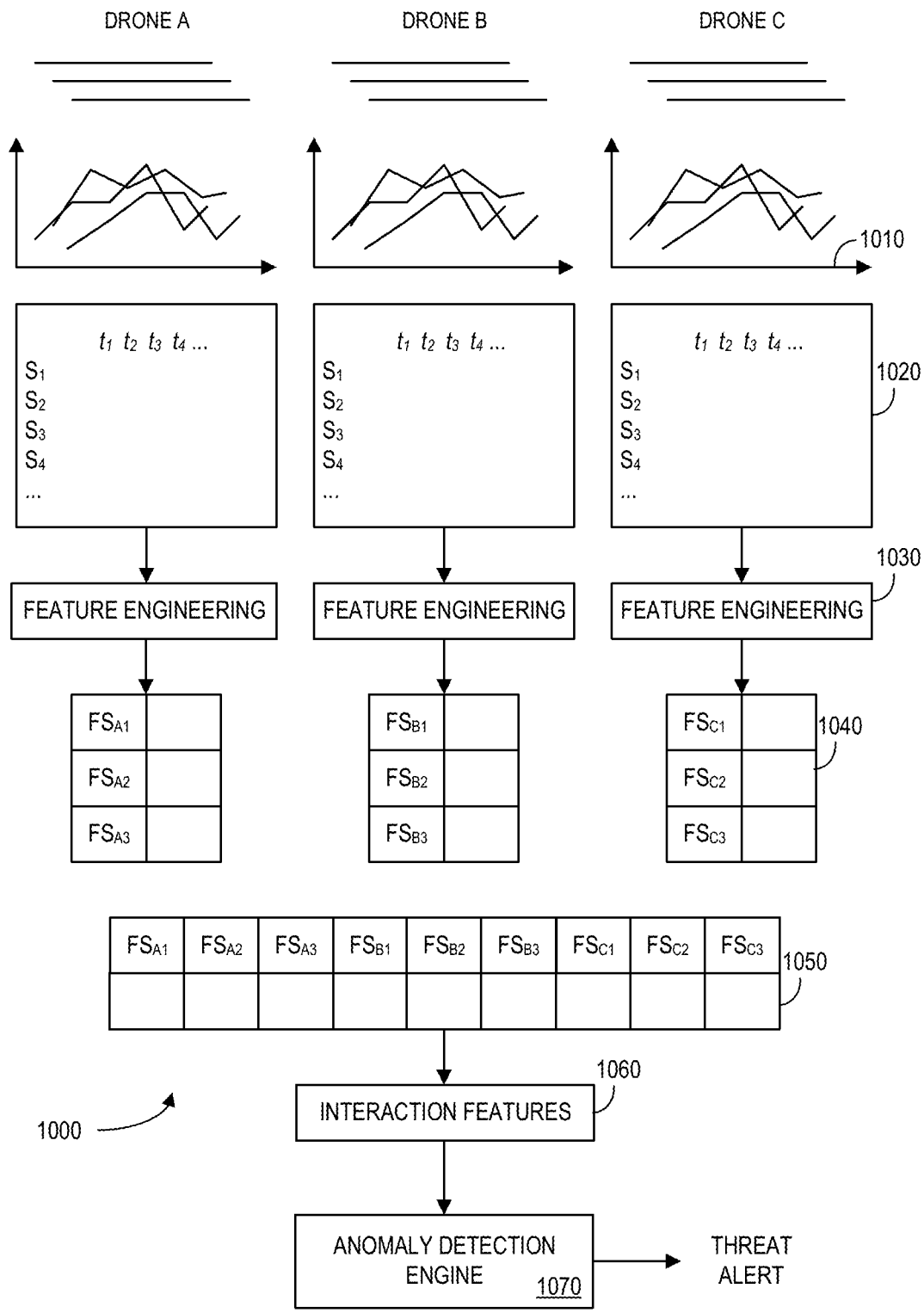
FIG. 10 is an example of a global threat protection system in accordance with some embodiments when multiple drones are involved in a system.

FIG. 10 is an example of a global threat protection system 1000 in accordance with some embodiments when multiple drones are involved in a system. In particular, system includes three drones (A, B, and C) and batches of values 1010 from threat nodes are collected for each generated over a period of time (e.g., 60 to 80 seconds). According to some embodiments, the batches of values 1010 from threat nodes overlap in time. The values 1010 from threat nodes may, for example, be stored in a matrix 1020 arranged by time ($t_1$, $t_2$, etc.) and by type of threat node ($S_1$, $S_5$, etc.). Feature engineering components 1030 may use information in each matrix 1020 to create a feature vector 1040 for each of the three drones (e.g., the feature vector 1040 for drone C might include $FS_{C1}$, $FS_{C2}$, etc.). The three feature vectors 1040 may then be combined into a single global feature vector 1050 for the system 1000. Interaction features 1060 may be applied (e.g., associated with A*B*C, A+B+C, etc.) and an anomaly detection engine 1070 may compare the result with a decision boundary and output a threat alert signal when appropriate.

Figure 11:
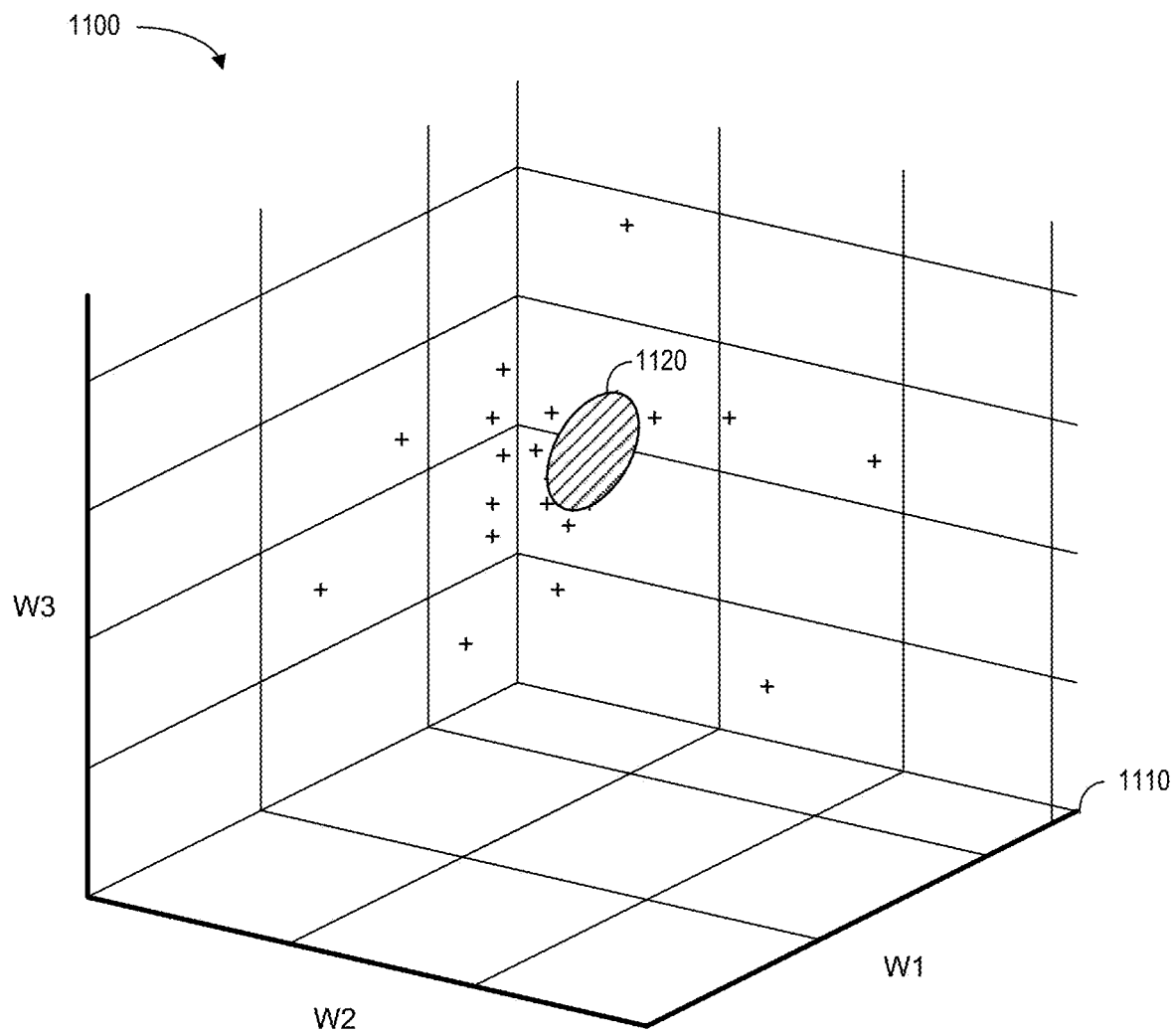
FIG. 11 illustrates three dimensions of sensor outputs in accordance with some embodiments.
Figure 12:
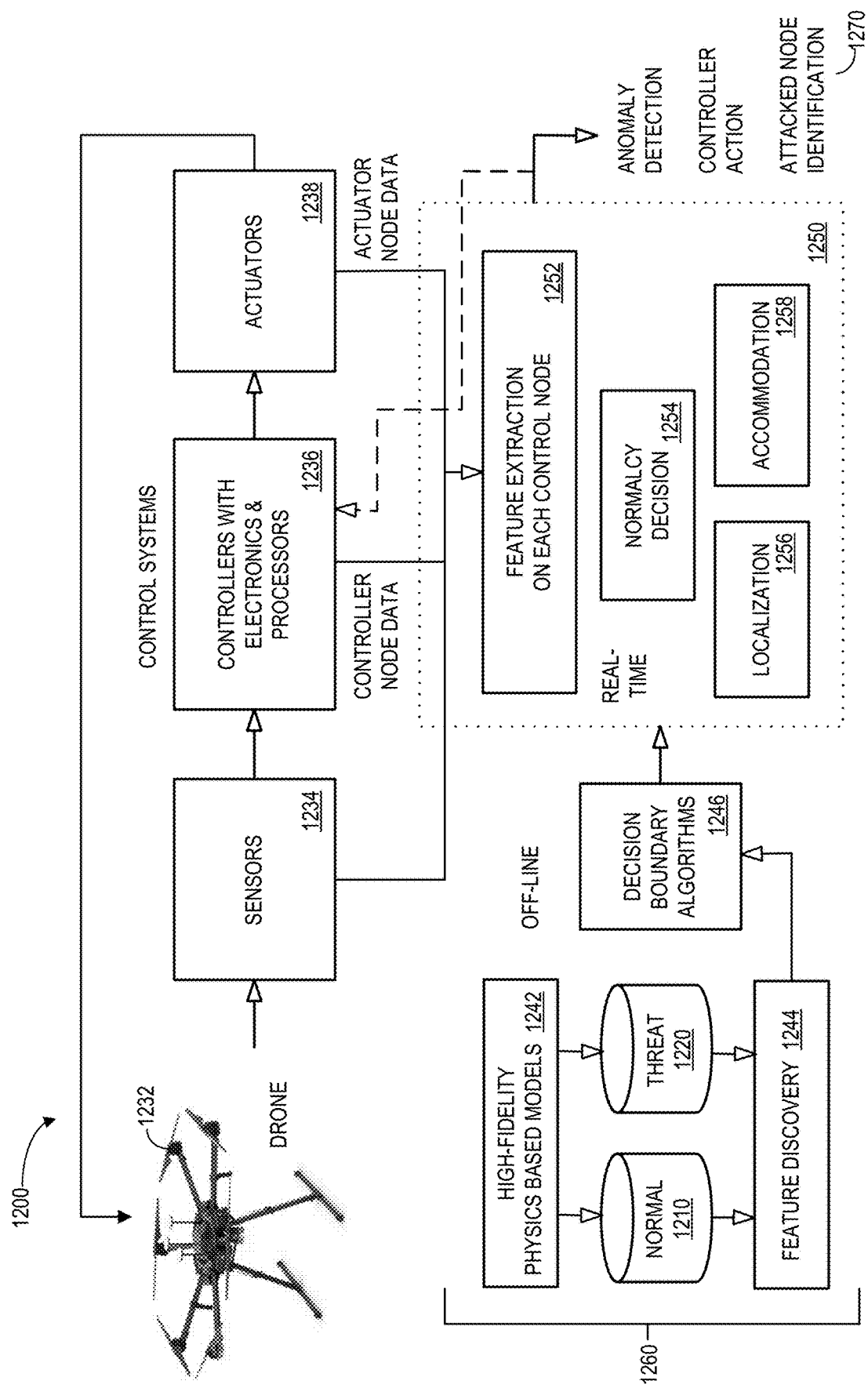
FIG. 12 is threat alert system according to some embodiments.

FIG. 11 illustrates 1100 three dimensions of threat node outputs in accordance with some embodiments. In particular, a graph 1110 plots threat node outputs ("+") in three dimensions, such as dimensions associated with Principal Component Features ("PCF"): w1, w2, and w3. Moreover, the graph 1110 includes an indication of a normal operating space decision boundary 1120. Although a single contiguous boundary 1120 is illustrated in FIG. 11, embodiments might be associated with multiple regions. Note that PCF information may be represented as weights in reduced dimensions. For example, data from each threat node may be converted to low dimensional features (e.g., weights). According to some embodiments, threat node data is normalized as follows:

$$S_{normailized}(k) = \frac{S_{nominal}(k) - S_{original}(k)}{\overline{S}_{nominal}}$$

where S stands for a threat node quantity at "k" instant of time. Moreover, output may then be expressed as a weighted linear combination of basis functions as follows:

$$S = S_0 + \sum_{j=1}^{N} w_j \Psi_j$$

where $S_0$ is the average threat node output with all threats, $w_j$ is the $j^{th}$ weight, and $\Psi_j$ is the $j^{th}$ basis vector. According to some embodiments, natural basis vectors are obtained using a covariance of the threat nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., drones) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to UAV system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

A cyber-attack detection and localization algorithm may process a real-time UAV signal data stream and then compute features (multiple identifiers) which can then be compared to the signal-specific decision boundary. A block diagram of a system 1200 utilizing a signal-specific UAV cyber-attack detection and localization algorithm according to some embodiments is provided in FIG. 12. In particular, a drone 1232 provides information to sensors 1234 which helps controllers with electronics and processors 1236 adjust actuators 1238. A threat detection system 1260 may include one or more high-fidelity physics based models 1242 associated with the drone 1232 to create normal data 1210 and/or threat data 1220. The normal data 1210 and threat data 1220 may be accessed by a feature discovery component 1244 and processed by decision boundary algorithms 1246 while off-line (e.g., not necessarily while the drone 1232 is operating). The decision boundary algorithms 1246 may generate a threat model including decision boundaries for various monitoring nodes. Each decision boundary may separate two data sets in a high dimensional space which is constructed by running a binary classification algorithm, such as a support vector machine using the normal data 1210 and threat data 1220 for each monitoring node signal (e.g., from the sensors 1234, controllers 1236, and/or the actuators 1238).

A real-time threat detection platform 1250 may receive the boundaries along with streams of data from the monitoring nodes. The platform 1250 may include a feature extraction on each monitoring node element 1252 and a normalcy decision 1254 with an algorithm to detect attacks in individual signals using signal specific decision boundaries, as well rationalize attacks on multiple signals, to declare which signals were attacked, and which became anomalous due to a previous attack on the system via a localization module 1256. An accommodation element 1258 may generate outputs 1270, such as an anomaly decision indication (e.g., threat alert signal), a controller action, and/or a list of attacked monitoring nodes.

During real-time detection, contiguous batches of control signal data may be processed by the platform 1250, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 1238 and then manifested in the sensor 1234 data. Attack assessments might be performed in a post decision module (e.g., the localization element 1256) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1234 is spoofed, the attacked sensor feature vector will cross the hard decision boundary earlier than the rest of the vectors as described with respect to FIGS. 13 through 21. If a sensor 1234 is declared to be anomalous, and a command to the auxiliary equipment is later determined to be anomalous, it may be determined that the original attack, such as signal spoofing, occurred on the sensor 1234. Conversely, if the signal to the auxiliary equipment was determined to be anomalous first, and then later manifested in the sensor 1234 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 13:
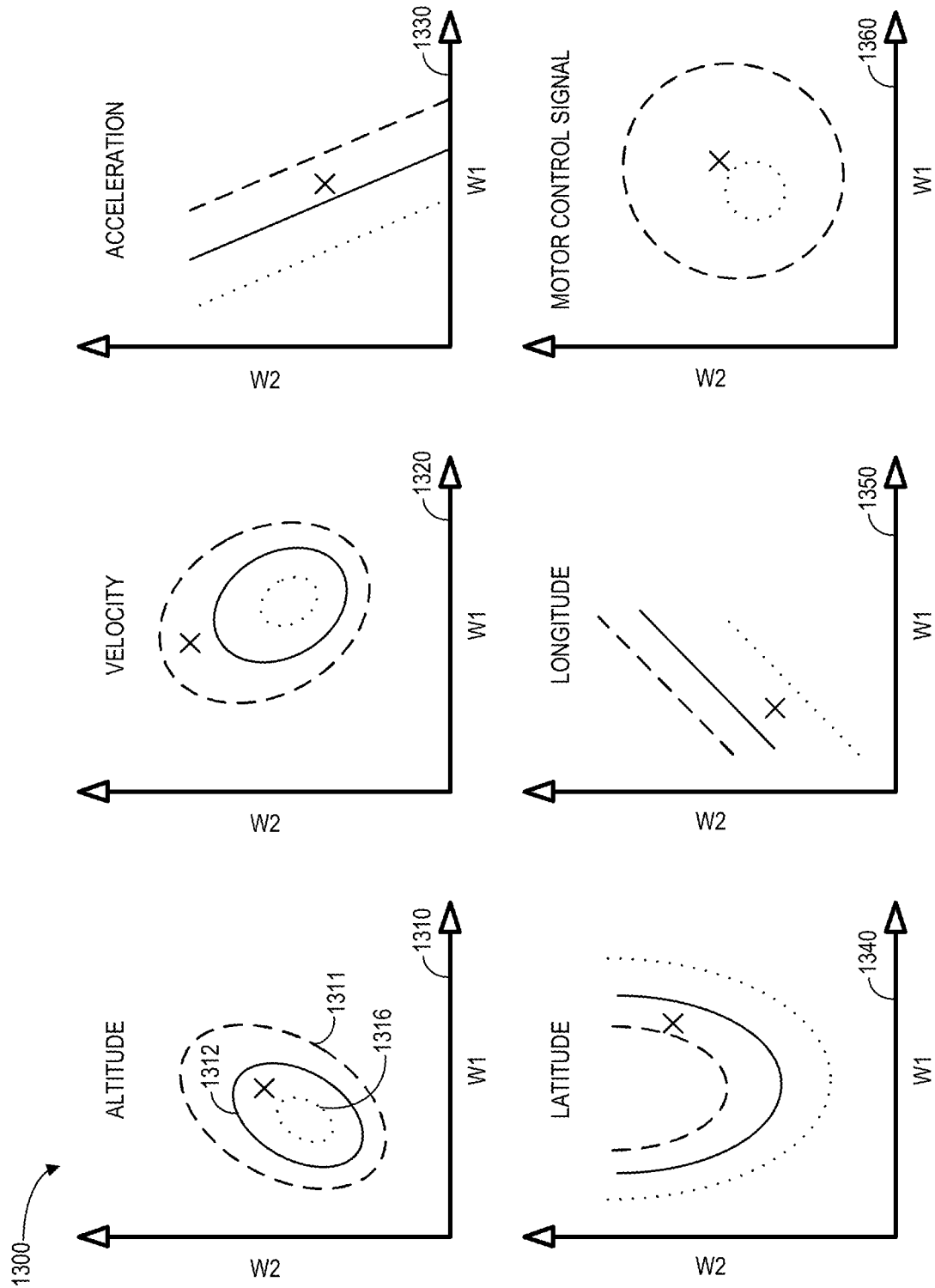
FIGS. 13 through 15 illustrate boundaries and locations of feature vectors for various parameters in accordance with some embodiments.

FIG. 13 illustrates 1300 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for altitude 1310, velocity 1320, acceleration 1330, latitude 1340, longitude 1350, and a motor control signal 1360. Each graph includes an average boundary 1312 (solid line), minimum boundary 1316 (dotted line), and maximum boundary 1311 (dashed line) and an indication associated with current feature location for each monitoring node parameter (illustrated with an "X" on the graph). As illustrated in FIG. 13, the current monitoring node location is between the minimum and maximum boundaries (that is, the "X" is between the dotted and dashed lines). As a result, the system may determine that the operation of the UAV system is normal (and no threat is being detected indicating that the system is currently under attack).

Figure 14:
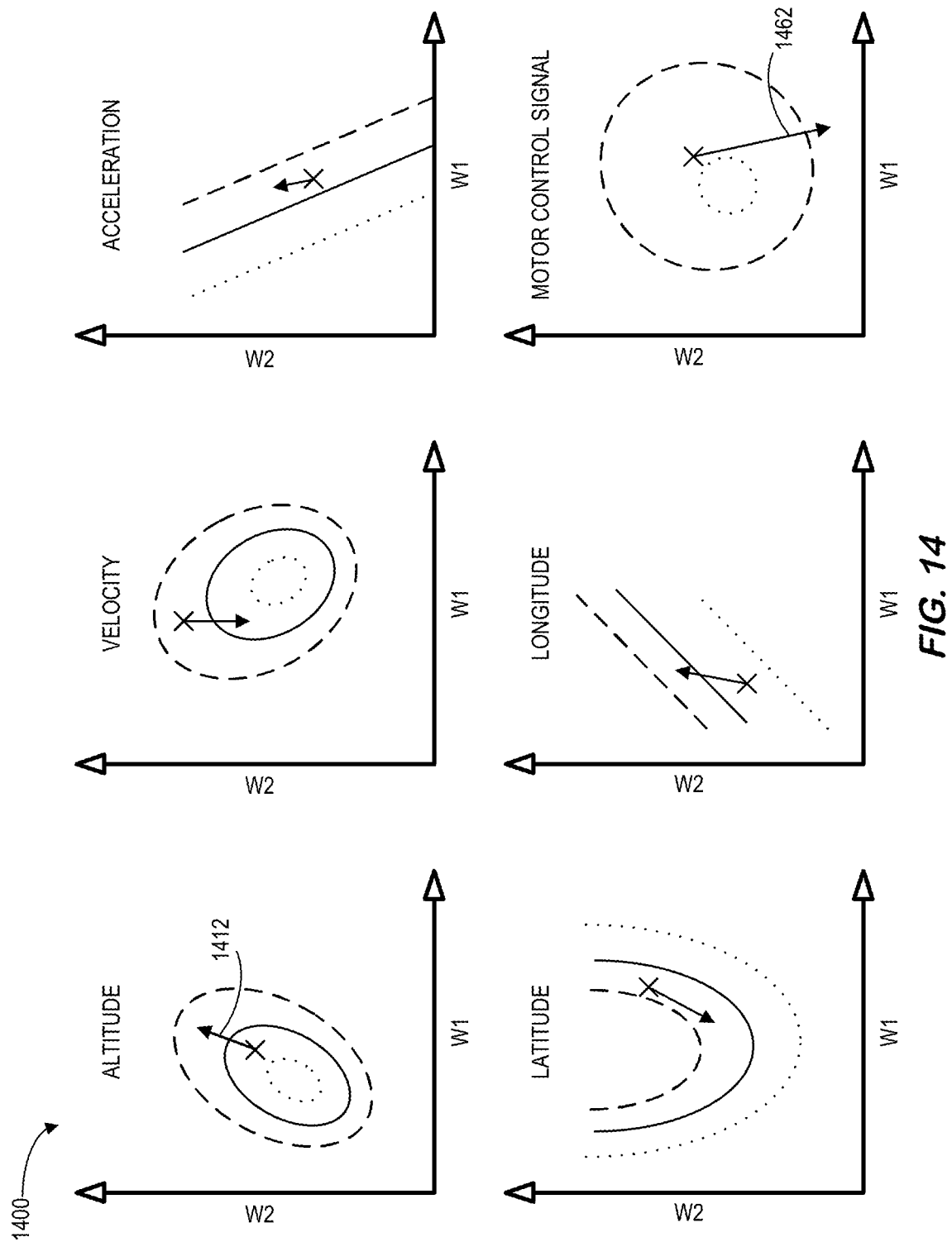

FIG. 14 illustrates 1400 subsequent boundaries and feature vectors for these parameters. Consider, for example, a feature vector movement 1412 for altitude. Even though feature vector 1412 has moved, it is still within the maximum and minimum boundaries and, as a result, normal operation of that monitoring node may be determined. This is the case for the first five graphs in FIG. 14. In this example, a feature vector movement 1462 for the motor control signal has exceeded the maximum boundary and, as a result, abnormal operation of that monitoring node may be determined. For example, a threat may exist for a motor control signal-calibration constant, which is a corrective value. The result is that the feature for the intermediary control signal illustrated in FIG. 14 moves 1462 such that it is anomalous. The algorithm detects this cyber-attack, and two parallel actions might be initiated. One action may be post processing of the signal to discover what was attacked, in this case if the system has been monitoring motor behavior, it may conclude that none of them are currently abnormal. Therefore, it may be determined that something that was used to calculate this feature was attacked. The other action may be to continually monitor and detect additional attacks. Such an approach may facilitate a detection of multiple signal attacks.

Given the example of FIG. 14, assume that the motor control signal was attacked. This may cause the system to respond in such a way so as to put other signals into an abnormal state. This is illustrated 1500 in FIG. 15, where the attack has already been detected and now other signals shown to be abnormal. In particular, feature movement for altitude 1512, velocity 1522, acceleration 1532, and latitude 1542 have all become abnormal (joining the feature vector for the motor control signal 1562). Note that the feature vector for longitude did not become abnormal. In order to decide whether or not these signals 1512, 1522, 1532, 1542 are truly currently under attack, a historical batch with pertinent feature vector information may be kept for some duration of time. Then when an attack is detected on another signal, this batch is examined, and the time at which the confirmed attack on the motor control signal as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., UAV speed, altitude, etc.). Full factorial, Taguchi screening, central composite and Box-Behnken are some of the known design methodologies used to create the attack space. When models are not available, these DoE methods are also used to collect data from real-world UAV systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 15:
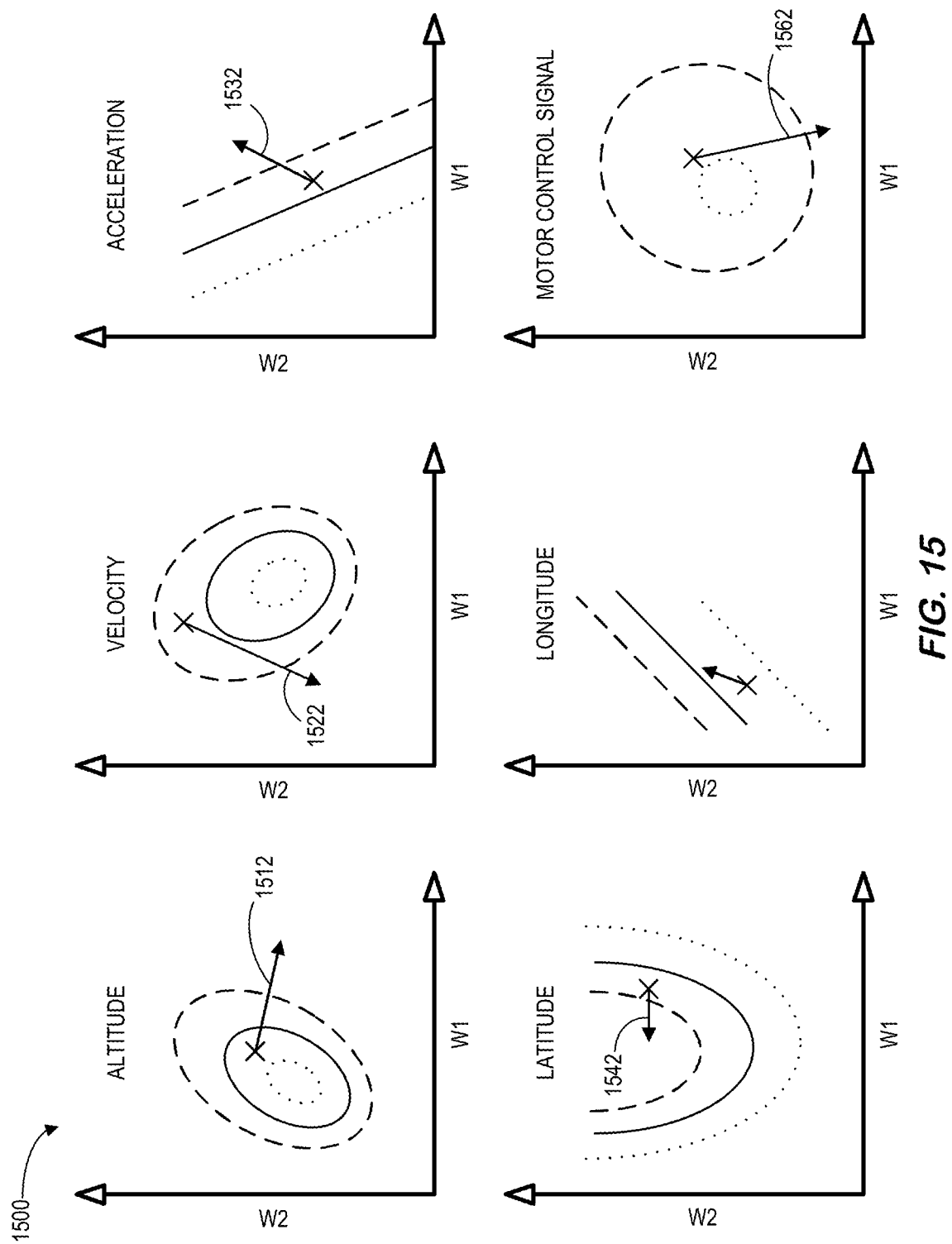

Note that multiple vector properties might be examined, and the information described with respect to FIGS. 13 through 15 may be processed to determine if the signal had been trending in a specific direction as the attack was detected (or if it had just been moving due to noise). Had the signal been uniformly trending as the attack took place and afterward, then this signal is a response to the original attack and not an independent attack. This is shown in FIGS. 16 through 21. If this signal was relatively stagnant during and after the attack, and then became abnormal this would characterize an independent attack.

Figure 16:
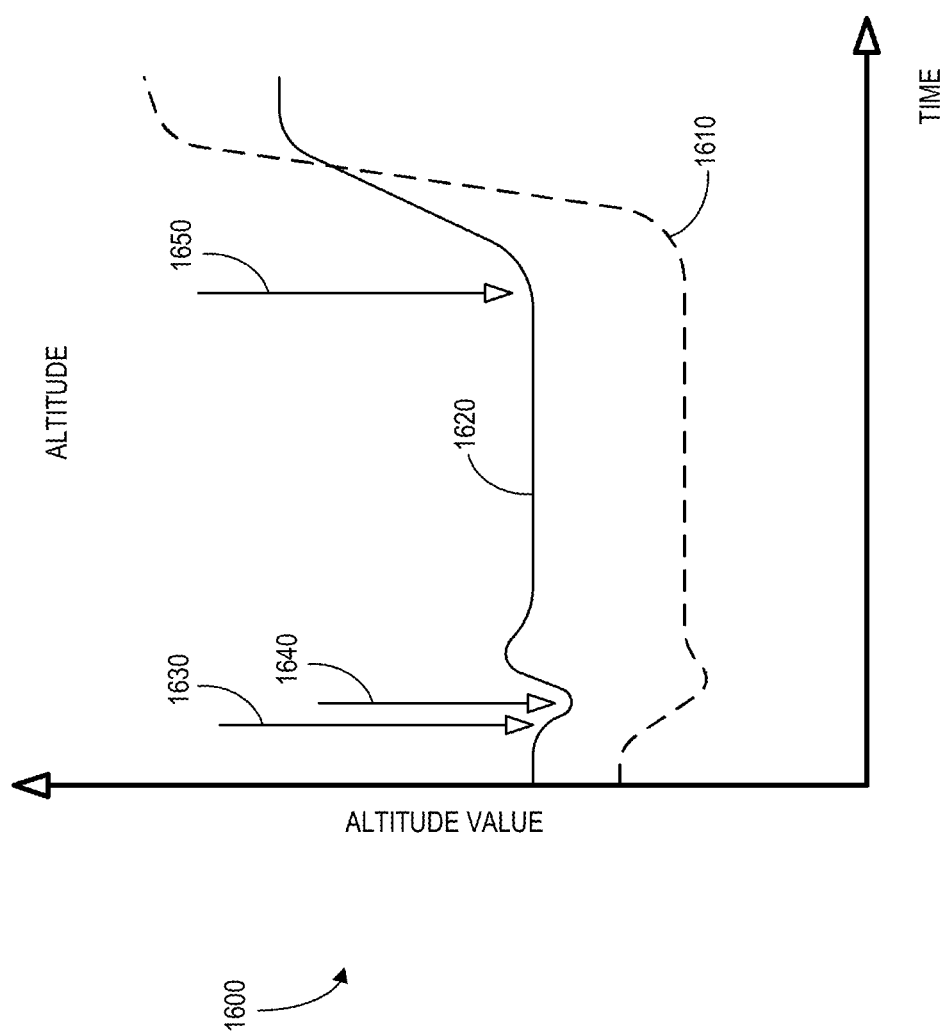
FIGS. 16 through 21 comprise graphs of parameter values over time in accordance with some embodiments.

In particular, FIG. 16 illustrates 1600 an evolution of altitude values over time, including a first value w1 1610 and a second value w2 1620. A "first" (in terms of time of occurrence) arrow 1630 indicates when an attack on the UAV altitude (and is located at the same spot/time in FIGS. 17 through 21). A middle arrow 1640 indicates when w1 and w2, taken together to form a feature vector, has become abnormal (that is, the feature vector has passed a boundary). This event is not at the same spot/time for each sensor, but it does show that the attack is declared during a transient and that the transient started after the initial attack. Therefore, the abnormalities detected in the sensors for altitude, velocity, acceleration, and latitude are determined to be in response to an attack, and not independently under attack. A last arrow 1650 indicates when an attack was detected on another sensor (velocity and is located at the same location in FIGS. 17 through 21). Note that the feature vector displayed a large change, and the feature vector had settled, thus indicating a separate attack. Therefore, attacks on multiple sensors have been successfully rationalized.

Figure 17:
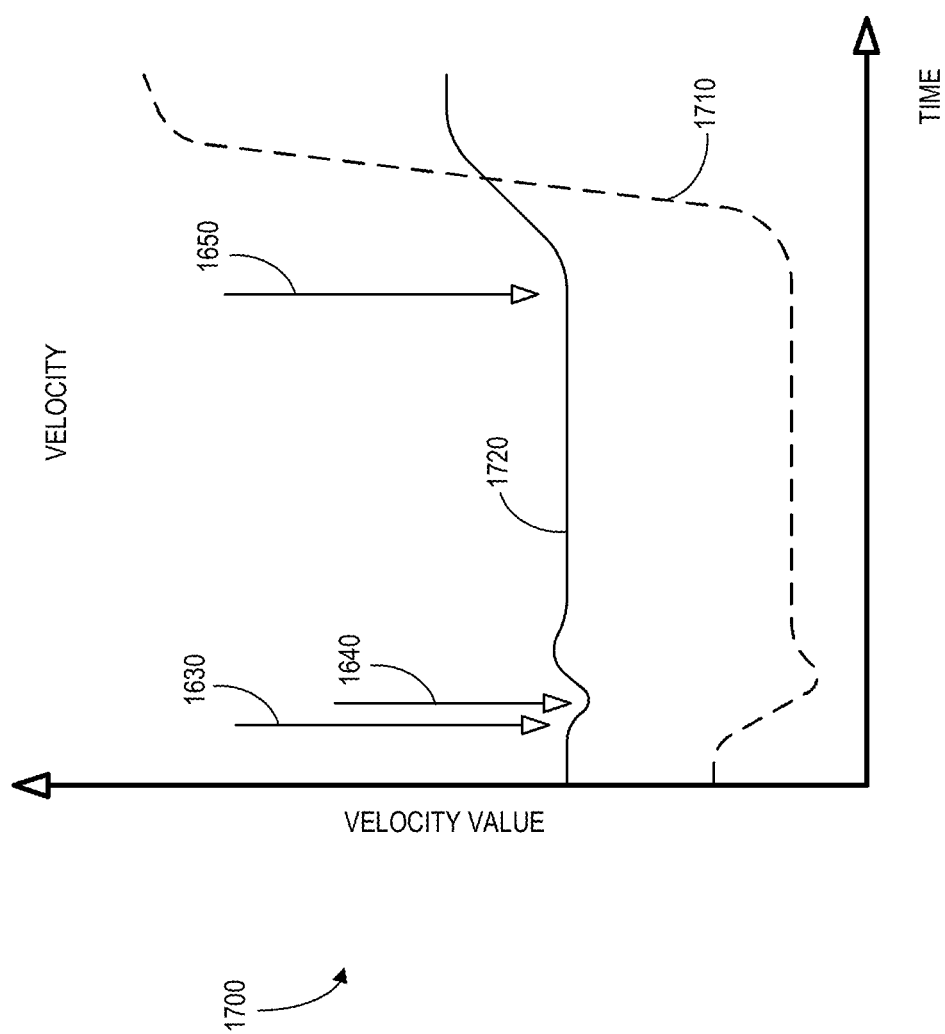
Figure 18:
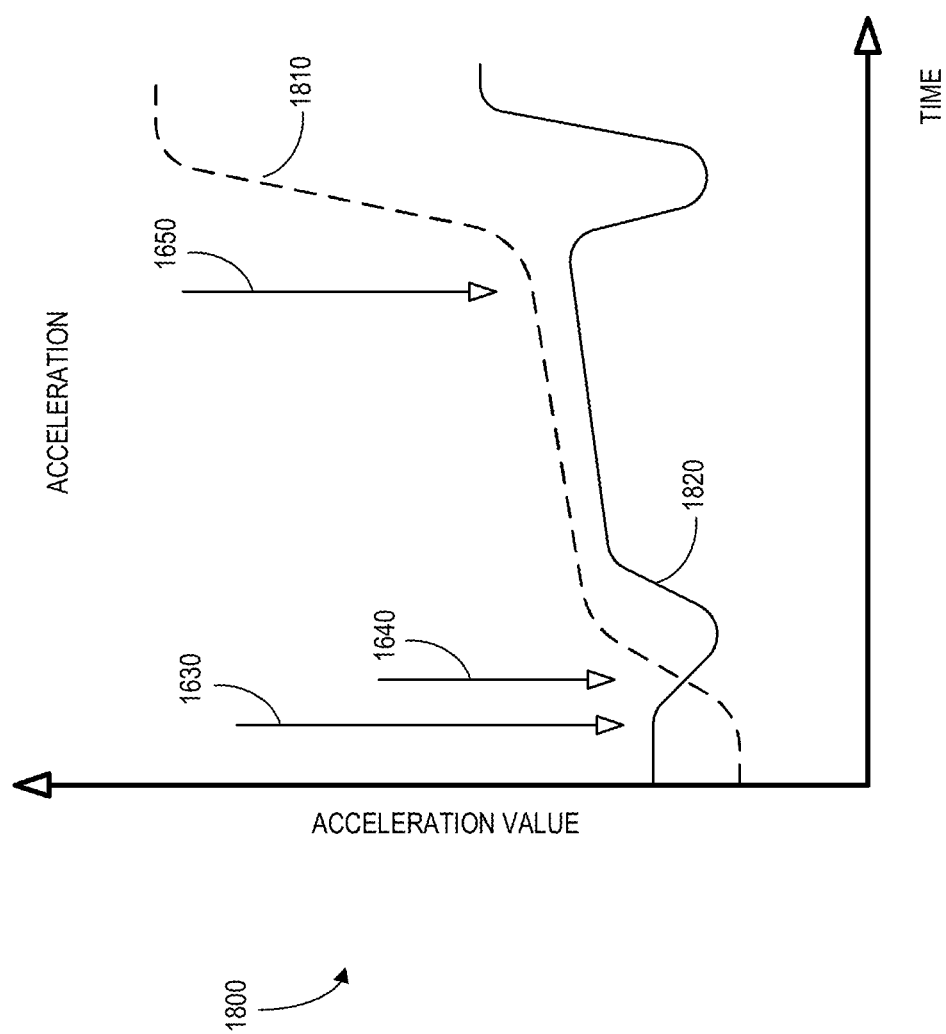
Figure 19:
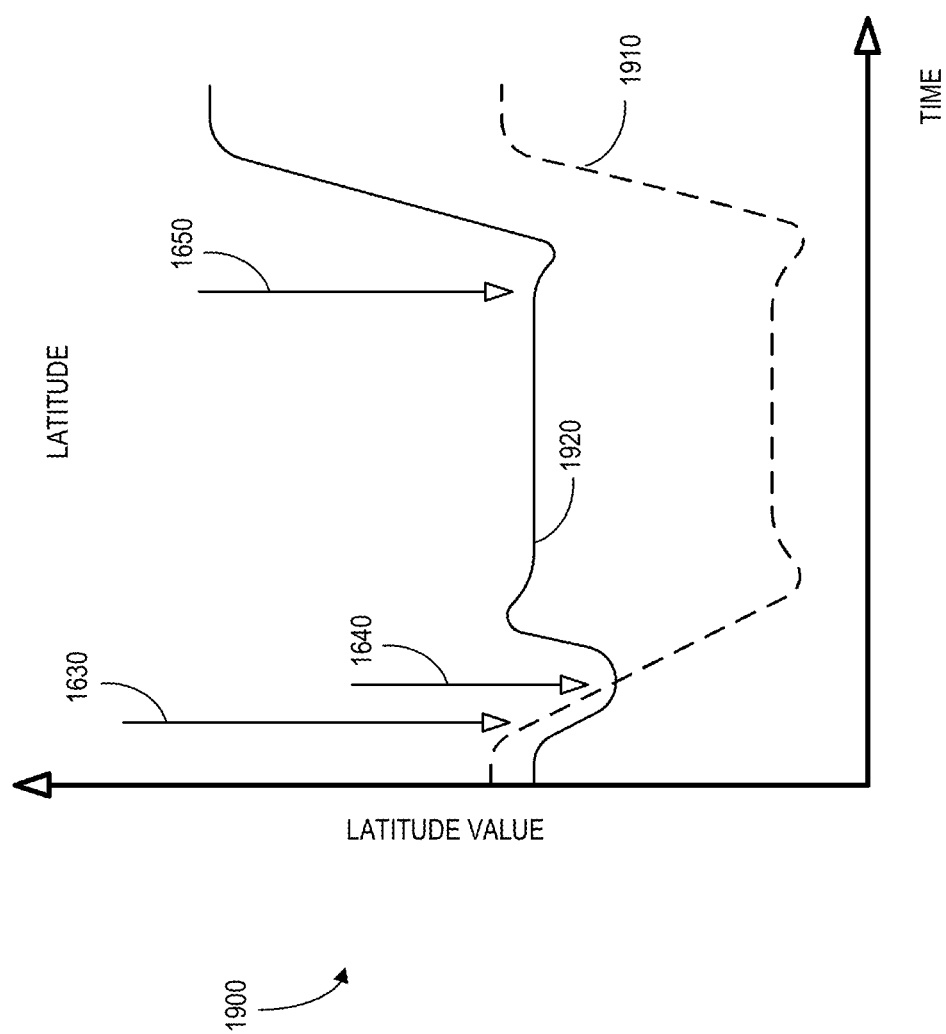
Figure 20:
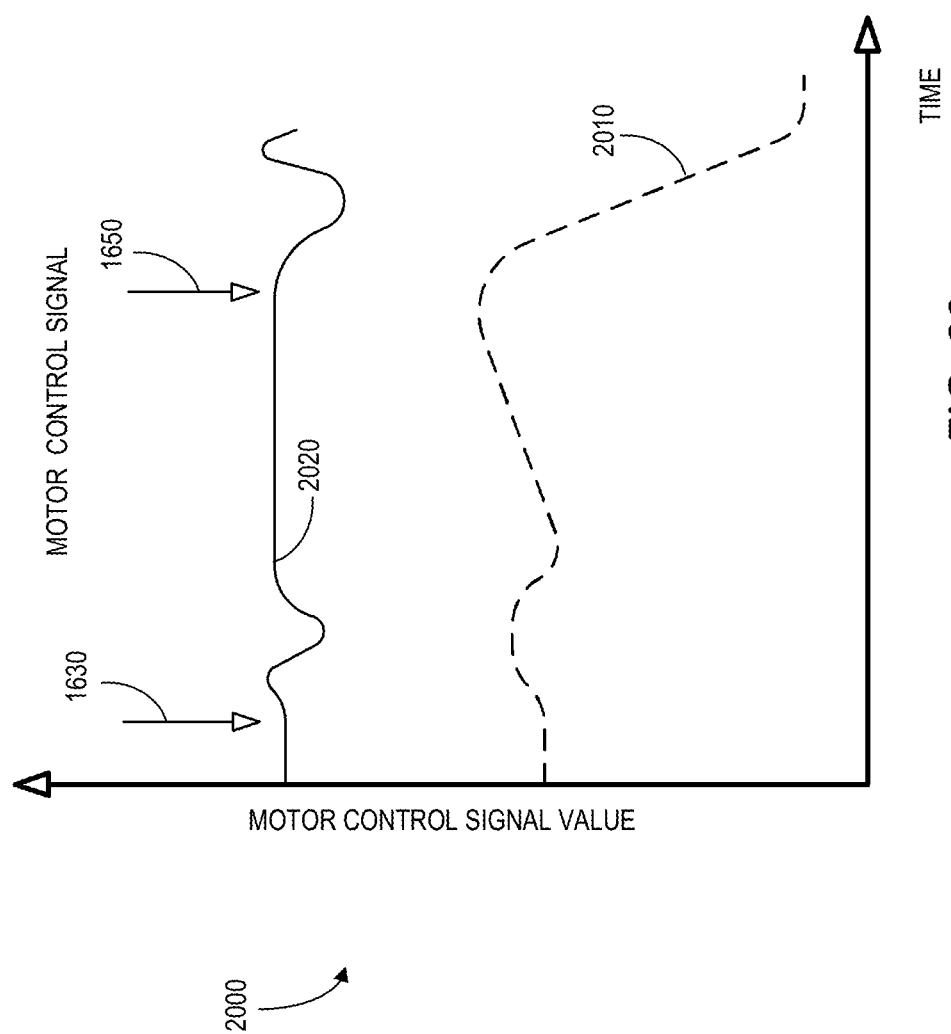
Figure 21:
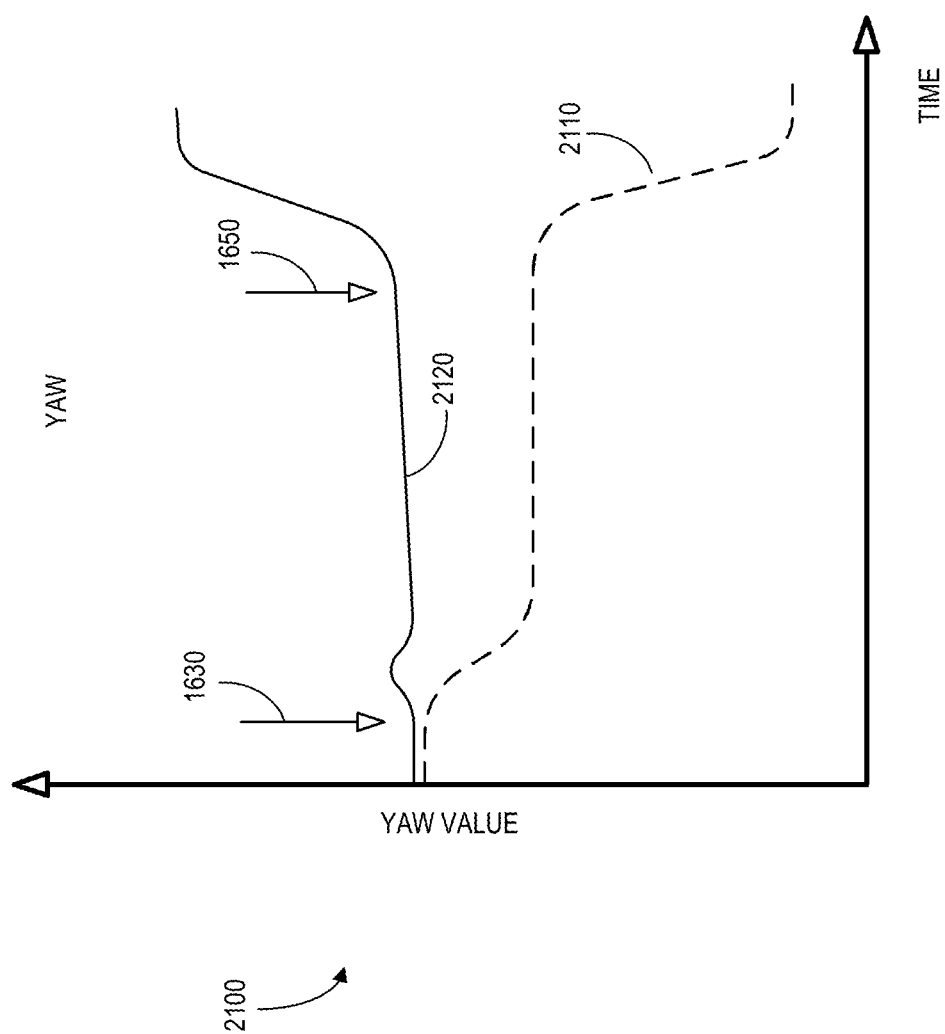

FIG. 17 illustrates 1700 an evolution of velocity values over time, including a first value w1 1710 and a second value w2 1720. FIG. 18 illustrates 1800 an evolution of acceleration values over time, including a first value w1 1810 and a second value w2 1820. FIG. 19 illustrates 1900 an evolution of latitude values over time, including a first value w1 1910 and a second value w2 1920. FIG. 20 illustrates 2000 an evolution of motor control signal values over time, including a first value w1 2010 and a second value w2 2020. FIG. 21 illustrates 2100 an evolution of UAV yaw values over time, including a first value w1 2110 and a second value w2 2120.

In FIG. 16 through 21, an attack was detected on the yaw. To validate that it is indeed the UAV yaw sensor, the individual signals that make up the UAV yaw might be evaluated. If there is no abnormality at the sensor level, then the abnormality of UAV yaw is declared an attack on the signal. If there is an abnormality at the sensor level, then the UAV yaw signal is declared abnormal due to its response to an abnormal sensor. In this case, the post processing will not be displayed. The detection of an abnormality of the UAV yaw sensor, and how to rationalize sequential responses, can be understood by noting that FIGS. 16 through 19 each have three arrows and four sections: before the first arrow 1630; between the first arrow 1630 and a middle arrow; between the middle arrow and the last arrow 1650; and after the last arrow 1650. FIGS. 20 and 21 each have two arrows and three sections: before the first arrow 1630; between the first arrow 1630 and the last arrow 1650; and after the last arrow 1650. FIG. 20 does not have a middle arrow because motor control signal was never determined to be abnormal. FIG. 21 does not have a middle arrow because UAV yaw was the initial attack, and therefore UAV yaw is not declared abnormal again until the attack has been mitigated.

The sections before the first arrow 1630 in each of FIGS. 16 through 21 shows the monitoring node feature at normal operating conditions prior to the detection of an abnormality at the UAV yaw. The section between the first arrow 1630 and middle arrow in FIGS. 16 through 19 shows the response from signals prior to detection that they themselves are abnormal. This is where a detection may be classified as a response. Notice that in FIG. 16 through 19, w1 and w2 are uniformly trending from the moment that the detection of the UAV yaw attack occurs, which is denoted by the first arrow 1630. This means that the features are evolving in response to the UAV yaw. These monitoring nodes would be classified as abnormal due to an attack on the UAV yaw sensor. Each signal was declared abnormal as it passed the middle arrow (which represents the decision boundary in reduced dimensionality). The section between the middle arrow and the last arrow 1650 shows that the features return to a steady state after the initial attack. At this point, while the features still reside in an abnormal state but are steady-state, it might be determined that the signal is not responding to a previous attack. Then an attack on the velocity sensor is initiated, designated by the last arrow 1650. Although the feature vector for the velocity sensor was already in an anomalous state, it was a steady-state, therefore the sharp jump in the feature vector characterizes and independent attack. As shown in section after the last arrow 1650, the other signals respond, but reiterating this method would conclude that these responses are not independent attacks, but rather responses to the second attack.

Thus, embodiments may enable the passive detection of indications of multi-class abnormal operations using real-time signals from monitoring nodes. Moreover, the detection framework may allow for the development of tools that facilitate proliferation of the invention to various systems (various types of autonomous vehicles, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to UAV system operators so that an attack may be thwarted (or the effects of the attack may be blunted), reducing damage to equipment.

Figure 22:
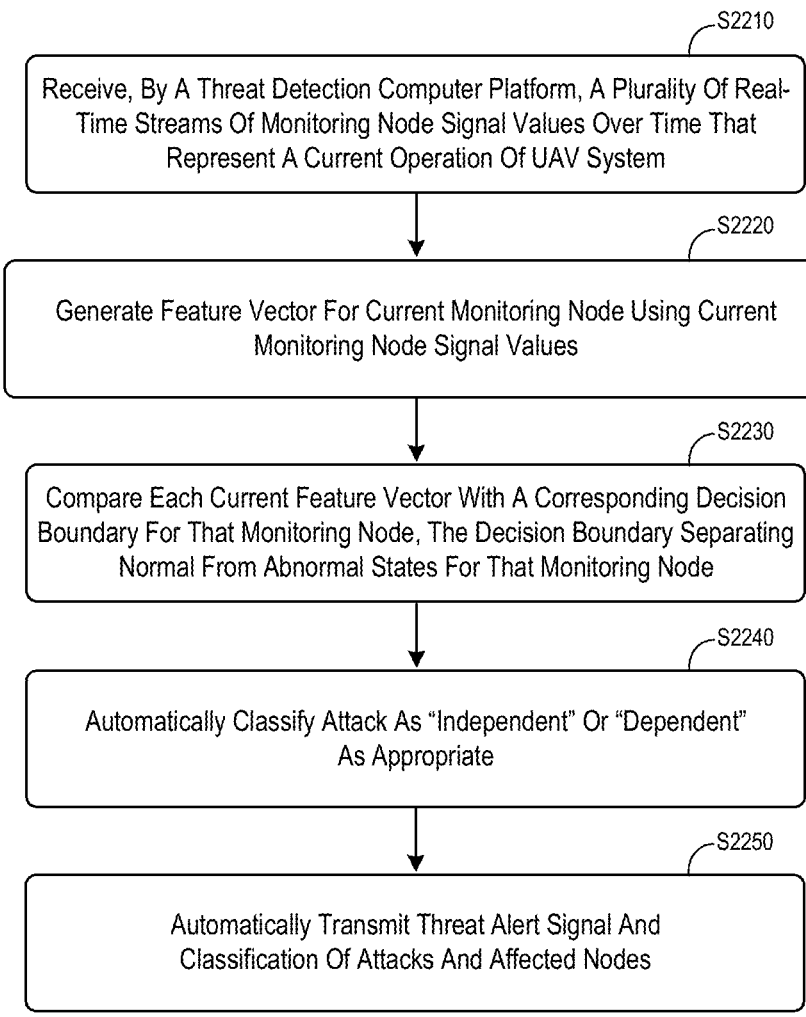
FIG. 22 is a method according to some embodiments.

FIG. 22 illustrates another method that might be performed by some or all of the elements of the system 100 described with respect to FIG. 1. At S2210, a plurality of real-time monitoring node signal inputs may receive streams of monitoring node signal values over time that represent a current operation of a UAV system. At least one of the monitoring nodes (e.g., control nodes, etc.) may be associated with, for example, sensor data, an auxiliary equipment input signal, a control intermediary parameter, valves, circuit breakers, and/or a control logic value.

At S2220, a threat detection computer platform may receive the streams of monitoring node signal values and, for each stream of monitoring node signal values, generate a feature vector for the current monitoring node using the current monitoring node signal values. Note that generation of the feature vector may include processing via one of feature transforms, identity transforms, and feature-based dynamic models. According to some embodiments, at least one of the current monitoring node feature vectors is associated with principal components, statistical features, deep learning features, frequency domain features, time series analysis features, logical features, geographic or position based locations, and/or interaction features.

At S2230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S2230 is performed in connection with each of those boundaries. Note that a decision boundary might be generated, for example, in accordance with a feature-based learning algorithm and a high-fidelity model or a normal operation of the UAV system. Moreover, at least one decision boundary may exist in a multi-dimensional space and be associated with a dynamic model which is constructed using data obtained from design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically obtained and adapted based on a transient condition, a steady state model of the UAV system, and/or data sets obtained while operating the system as in self-learning systems from incoming data stream.

At S2240, an attack identified at S2230 may be classified as either an "independent attack" or "dependent attack" in accordance with any of the embodiments described herein. For example, the classification might be based on a causal dependency test, a propagation path fulfillment test, and/or a time separation test, etc. as described with respect to FIG. 28. At S2250, the system may automatically transmit a threat alert signal (e.g., a notification message, etc.) based on results of the comparisons performed at S2230 along with a classification of the attack (e.g., as determined at S2240) and affected nodes. The threat might be associated with, for example, an actuator attack, a controller attack, a monitoring node attack, a drone state attack, spoofing, physical damage, unit availability, a unit trip, a loss of unit life, and/or asset damage requiring at least one new part. According to some embodiments, one or more response actions may be performed when a threat alert signal is transmitted. For example, the system might automatically shut down all or a portion of the UAV system (e.g., to let the detected potential cyber-attack be further investigated). As other examples, one or more parameters might be automatically modified, a software application might be automatically triggered to capture data and/or isolate possible causes, etc. Note that a thread alert signal might be transmitted via a cloud-based system, such as the PREDIX® field agent system. Note that according to some embodiments, a cloud approach might also be used to archive information and/or to store information about boundaries.

According to some embodiments, the system may further localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal. In the method of FIG. 22, the system may automatically classify an attack as either an "independent attack" (e.g., a new attack unrelated to any prior attack) or a "dependent attack" (e.g., an abnormal status resulting from a previously detected attack).

Some embodiments described herein may take advantage of the physics of a UAV system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the UAV system may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the UAV system to normal operation in a timely fashion.

Thus, some embodiments may provide an advanced anomaly detection algorithm to detect cyber-attacks on, for example, key UAV control sensors. The algorithm may identify which signals(s) are being attacked using control signal-specific decision boundaries and may inform a UAV system to take accommodative actions. In particular, a detection and localization algorithm might detect whether a sensor, auxiliary equipment input signal, control intermediary parameter, or control logical are in a normal or anomalous state. Some examples of UAV monitoring nodes that might be analyzed include: critical control sensors; control system intermediary parameters; auxiliary equipment input signals; and/or logical commands to controller.

A cyber-attack detection and localization algorithm may process a real-time UAV signal data stream and then compute features (multiple identifiers) which can then be compared to the sensor specific decision boundary. In some embodiments, generating features may involve simply performing an identity transform. That is, the original signal might be used as it is.

Figure 23:
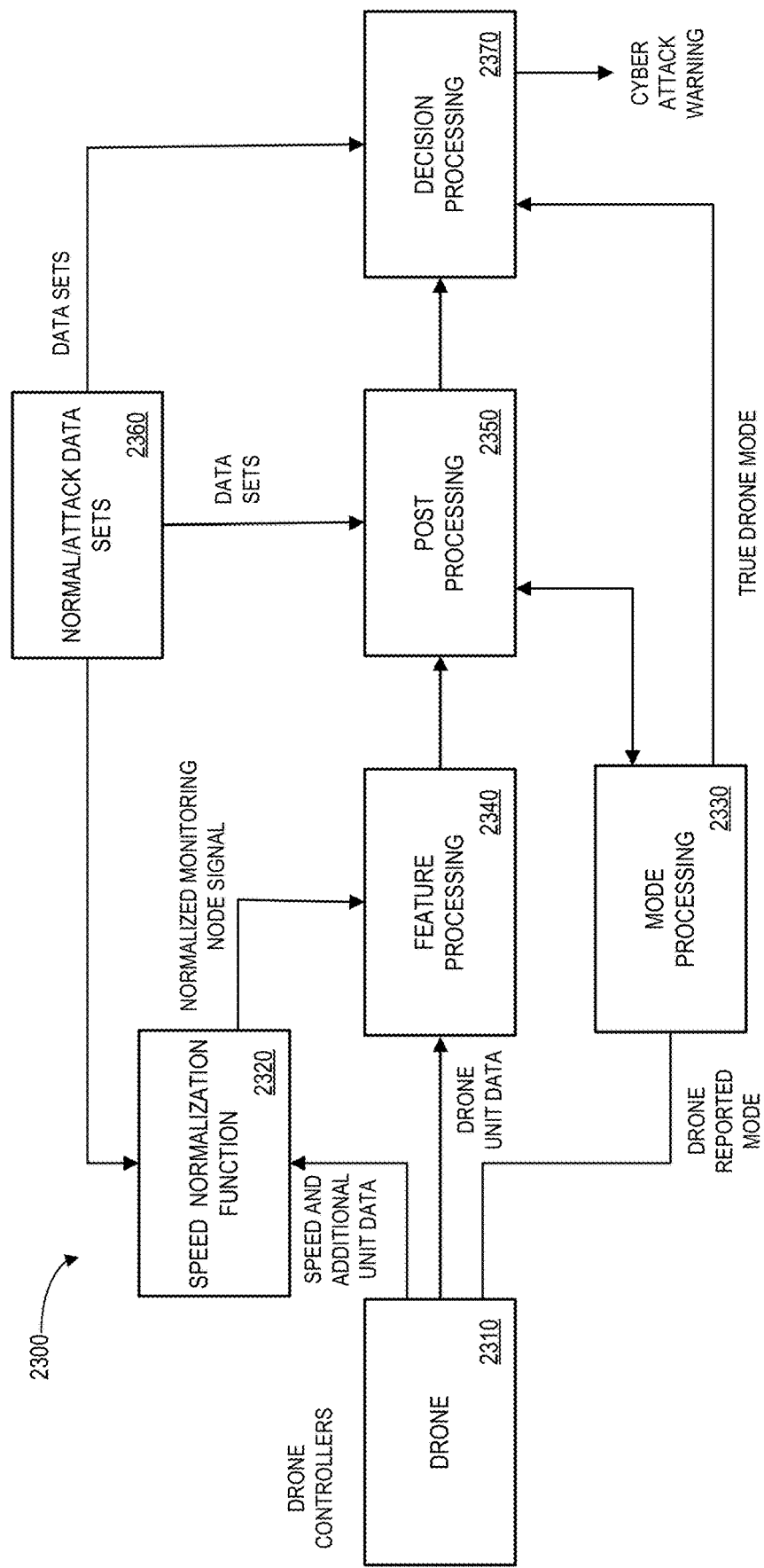
FIG. 23 illustrates a block diagram view of a cyber-attack detection system in accordance with some embodiments.

Note that a UAV system may be associated with non-linear operations over a range of operating parameters. As a result, data variations can be substantial and determining when a cyber threat is present based on operation of the control system may be difficult. FIG. 23 illustrates a block diagram view of a cyber-attack detection system 2300 in accordance with some embodiments. In particular, the system 2300 illustrates a drone 2310 (e.g., associated with UAV unit controllers) that transmits information about speed, etc. to a normalization function 2320. The drone 2310 may also transmit information, to mode processing 49320 (e.g., a UAV reported mode of operation) and feature processing 2340 (e.g., UAV unit data). The normalization function 2320 might, for example, transmit a normalized monitoring node signal to feature processing 2340. Post processing 2350 may receive information from feature processing 2340 and transmit data to decision processing 2370 (which can automatically create a cyber-attack warning based at least in part on data sets received from a normal/attack data sets storage unit 2360).

Figure 24:
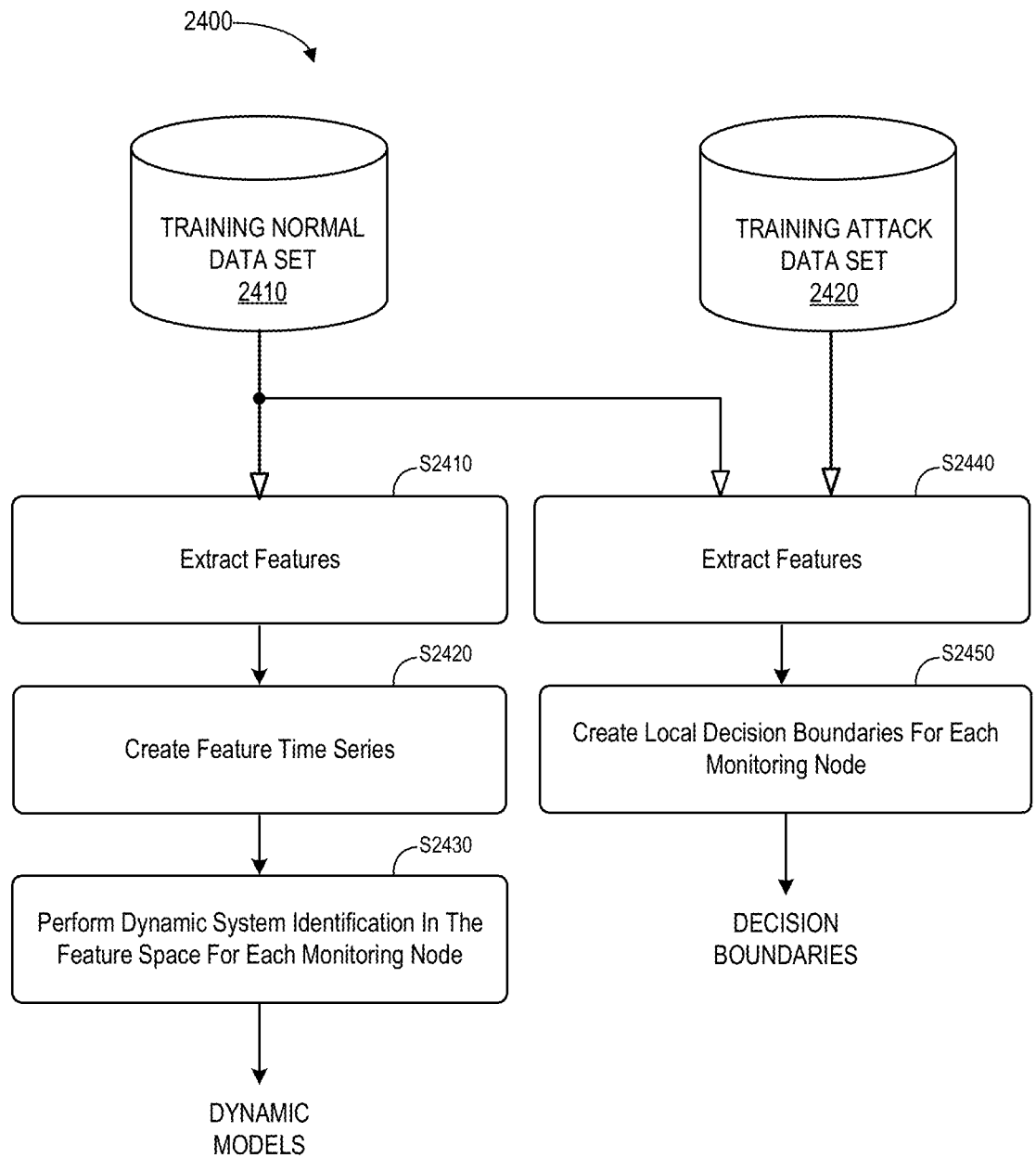
FIG. 24 is method that might be associated with an off-line training process for an automated attack localization system according to some embodiments.

FIG. 24 is method 2400 that might be associated with an off-line training process for an automated attack localization system according to some embodiments. During a training phase (off-line), a training normal data set 2410 and a training attack data set 2420 may be used to create local decision boundaries in the feature space using data-driven learning methods such as support vector machines. In particular, at S2410 information from the training normal data set 2410 may be used to extract features which are then used to create a feature time series at S2420. The system may then perform dynamic system identification at S2430 in the feature space for each monitoring node to create appropriate dynamic models.

At S2440, information from the training normal data set 2410, the training attack data set 2420, and dynamic models may be used to generate features and create decision boundaries. The system may then create local decision boundaries as appropriate for each monitoring node at S2450. Note that the number of features used for each boundary might be selected based on an optimization of the detection rate and false alarm rate. Also note that the feature extraction and boundary generation process may be performed individually on each and every monitoring node. In a similar fashion, features may be extracted to be used for dynamic system identification as values of features evolve over time. The features used for dynamic modeling might be, for example, from the training normal data set 2410 (or a data set generated from the models with attacks and normal operational behavior). Features extracted from the training normal data set 2410 may use a sliding time window over the time-series data in the physical space to create new time series of feature evolution in the feature space. Then, the feature time series may be used for dynamic modeling. The dynamic models may be, for example, in the state space format.

According to some embodiments, a multivariate Vector Auto-Regressive ("VAR") model approach may be used to fit dynamic models into feature time series data. A VAR model may, for example, have the following form:

$$y(k+1)=A_1 y(k)+A_2 y(k-1)+ \ldots +A_p(k-p+1)+b+e(k)$$

where y(k) is the value of the multivariate feature time series at sample time t, p is the number of lags (i.e., delays) in the model, b is a constant affine term, and e(k) is white Gaussian random noise. The size of they vector, m, may equal the number of features selected. A VAR(p) model may be identified for each monitoring node, resulting in matrices $A_1$ to $A_p$, the b vector, and covariance matrix Q of e, for each node.

Figure 25:
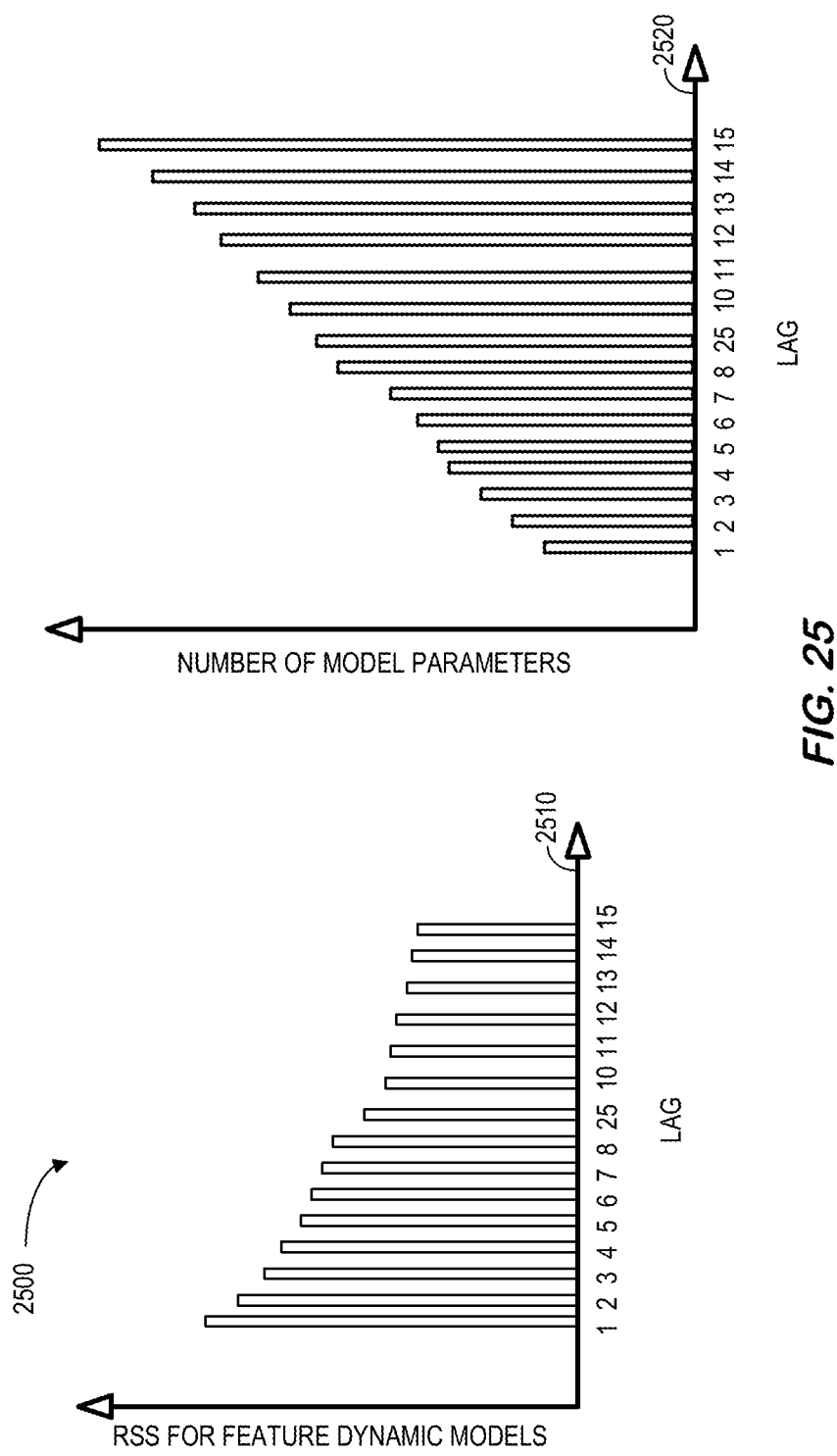
FIG. 25 illustrates relationships between Residuals Sum of Squares ("RSS") and number of model parameters, per different lag numbers (i.e., order of the model) for feature-driven dynamic models and lags in accordance with some embodiments.

As the number of lags in the VAR model increase, the model fits better into the training data set but there are more parameters n of the model to be estimated. For example, FIG. 25 illustrates 2500 relationships between Residuals Sum of Squares ("RSS") for feature-driven dynamic models, lags, and a number of model parameters in accordance with some embodiments. In particular, a first graph 2510 shows RSS for feature dynamic models for lags from 1 through 15. Note that the number of parameters in the model for VAR(p) models might have m=5 features (and thus five individual parameters might be included on the graph). The RSS decreases as the number of lags increases. A second graph 2520 shows the number model parameters for each lag from 1 through 15. Note that the number of model parameters increases as the number of lags increases.

The order of the VAR model, p, may selected automatically using Bayesian Information Criterion ("BIC") or Akaike Information Criterion ("AIC"). Note that BIC may provide a good balance between the model fitness and complexity (e.g., in order to avoid over-fitting). The system may use a weighted average of features to compute the BIC per different lag numbers. In computing the weighted average BIC, the BIC value of each feature might be weighted by the magnitude of the feature so that the features with higher magnitudes are weighted more, and as such fitting a better model to those features becomes more important. The number of lags in the model, p, is then selected based on the value of p, that minimize the weighted averaged BIC. The identified VAR(p) model may then be converted 2600 into standard state space structure as illustrated in FIG. 26. This process may be done separately for each monitoring node, which may be the result of different values of p for each monitoring node. Note that the conversion 2600 of FIG. 26 may be written in compact form as:

$$x(k+1)=Ax(k)+Bu(k)+Ee(k)$$

$$y(k)=Cx(k)$$

where, u(k) is a fictitious unit step input to accommodate for the affine term. During the training phase, one such state space feature-driven dynamic model may be built for each monitoring node. Although a VAR modeling approach is described herein, note that other modeling approaches might be used instead in any of the embodiments (e.g., a Markov model approach).

Figure 27:
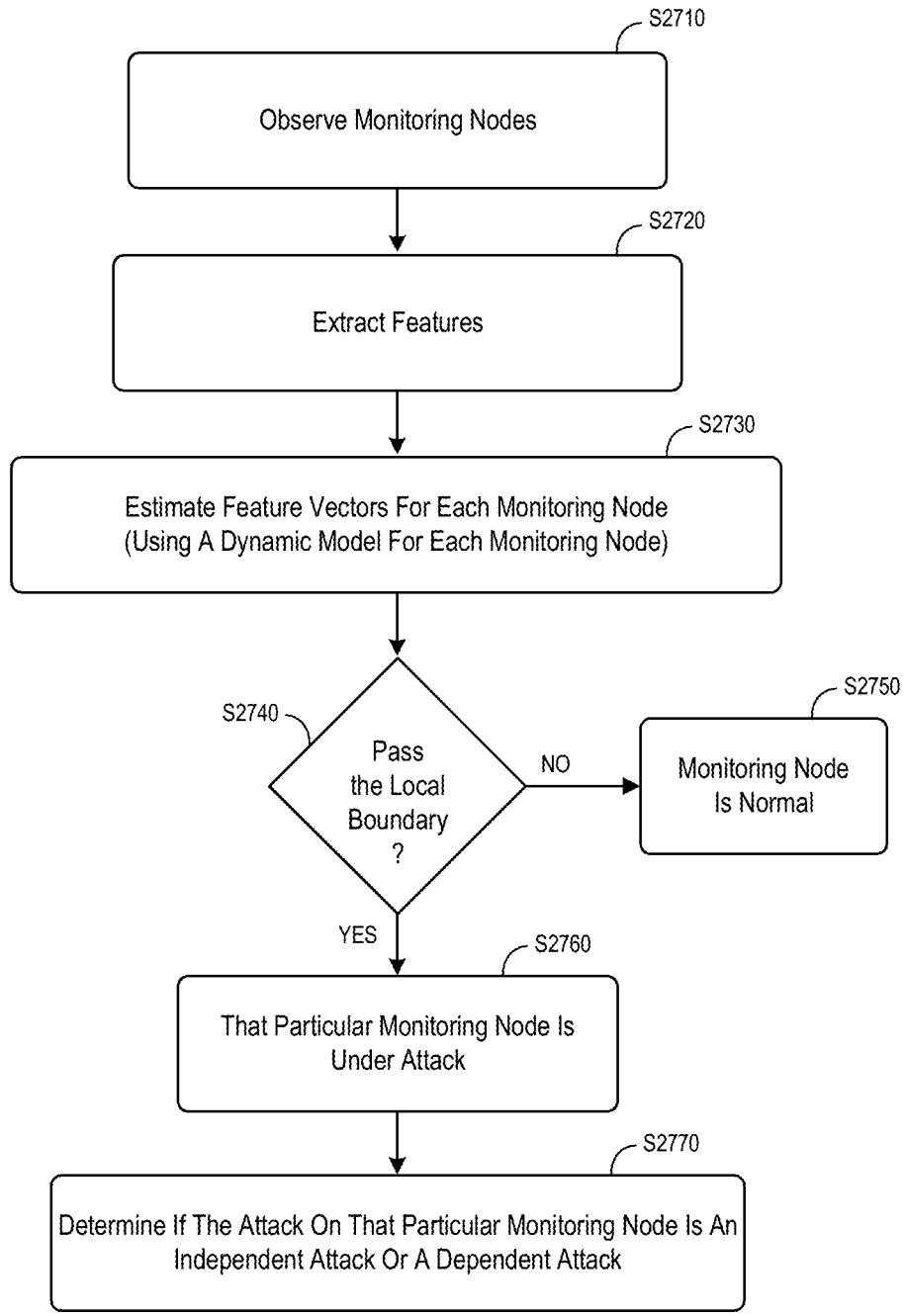
FIG. 27 is a method that might be associated with an on-line operational process in accordance with some embodiments.

FIG. 27 is a method that might be associated with an on-line operational process in accordance with some embodiments. After observing the monitoring nodes at S2710, the features are extracted at S2720 from each observation of each monitoring node. Then using the dynamic models identified in a training phase, each model then generates filtered or estimated features at S2730 using stochastic estimation techniques, such as Kalman filtering. In some embodiments, dynamic models may not be required to further filter or estimate features. The covariance matrix of the process noise needed for the stochastic estimator is readily available here as Q, which can be computed during training phase as the covariance of the error term e(t). Then the output of each stochastic estimator is compared against its corresponding local decision boundary at S2740, also computed and pre-stored during the training phase. If the local boundary is not passed at S2740, the monitoring node is normal at S2750. Each monitoring node with an estimated feature that violates the corresponding decision boundary is reported as being under attack at S2760.

In the next stage, the system post-processes the localized attack and determines whether the detected attack is an independent attack or it is an artifact of the previous attack through propagation of the effects in the closed-loop feedback control system at S2770. This may provide additional information and insight and may be useful when multiple attacks are detected at the same time.

Figure 28:
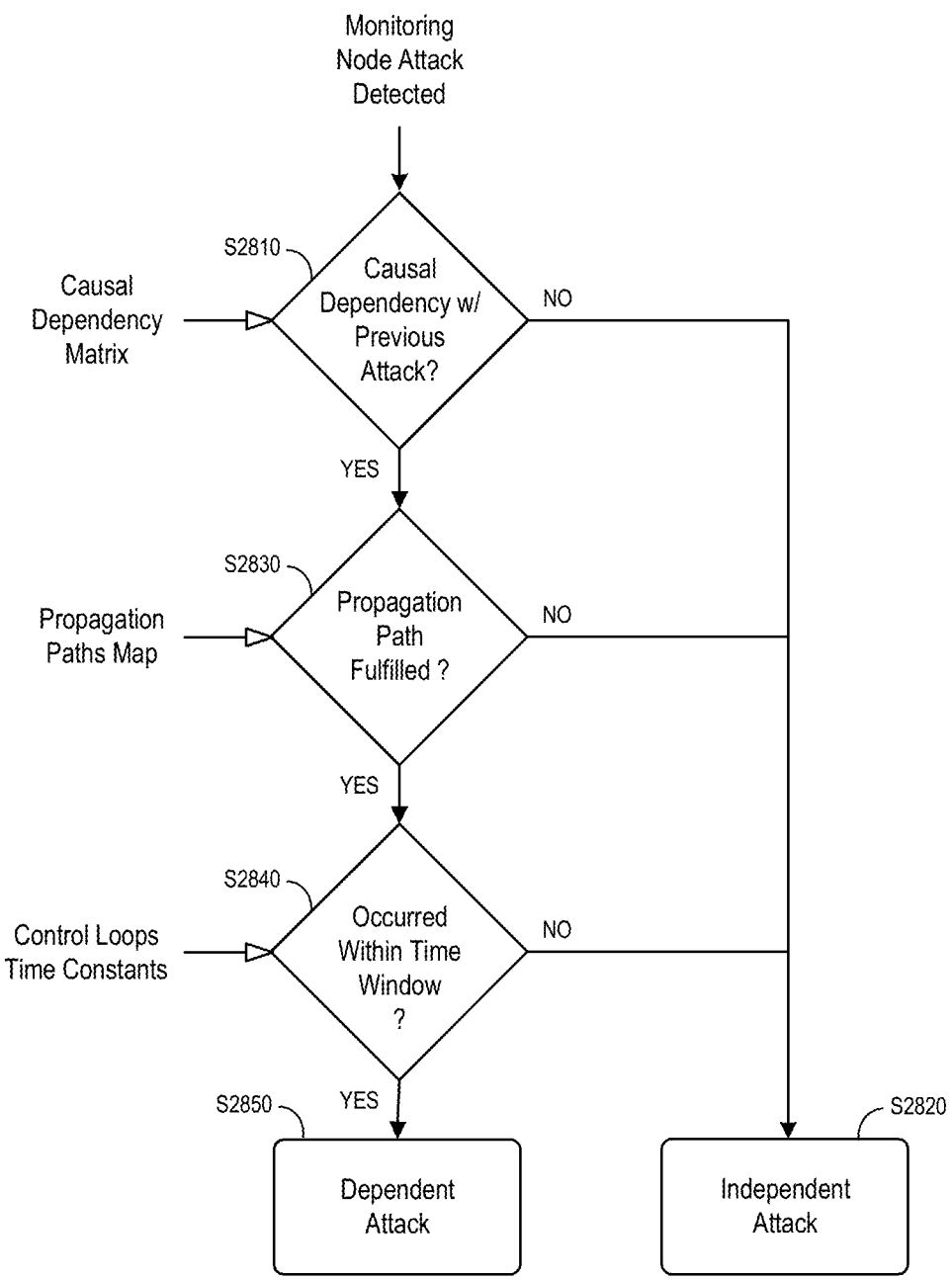
FIG. 28 is a method of determining whether an attack is an independent attack or a dependent attack according to some embodiments.

For example, FIG. 28 is a method of determining whether an attack is an independent attack or a dependent attack according to some embodiments. According to some embodiments, three tests may be performed to determine if an attack should be classified as an "independent attack" or a "dependent attack:" (1) a causal dependency test, (2) a propagation path test, and (3) a time separation test. Together, these three tests are referred to herein as the "attack dependency conformance test." At S2810, a causal dependency matrix may be used to determine if the current attack was potentially caused by a previous attack. If the current attack could not have been caused by a previous attack at S1210, it is classified as an "independent attack" at S2820. In this causality test, the system may check whether there is a potential causal dependency between the newly detected attack and any previously detected attack on other monitoring nodes. This check might be based on, for example, a binary matrix of causal dependencies between any two nodes (e.g., as described with respect to FIG. 32). The causal dependency matrix might be generated, according to some embodiments, based on domain knowledge. If no such possible dependencies exist, the attack is reported as an "independent attack" at S2820. Otherwise, the system may perform a second check.

In particular, at S2830 a propagation paths map may be used to determine if the current attack potentially propagated from a previous attack. If the current attack could not have propagated from a previous attack at S2830, it is classified as an "independent attack" at S2820. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S2820. Otherwise, the system may perform the third check.

At S2840, control loops time constraints may be used to determine if the current attack was potentially caused by a previous attack based on time separation. If the current attack could not have been caused by a previous attack based on time separation at S2840, it is classified as an "independent attack" at S2820. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5*\tau+n*p<\Delta t<5*\tau+n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S2820.

If it is determined at S2850 that the current attack meets the time separation test (and, therefore, also meets both the propagation test of S2830 and the causal dependency test of S1240), the current attack is classified as a "dependent attack" at S2850.

Note that other attack and anomaly detection techniques may only provide a binary status of the overall system (whether it is under attack or not). Embodiments described herein may provide an additional layer of information by localizing the attack and determining not only if the system is under attack (or not) but also which node is exactly under attack.

As a result, embodiments may provide a significant and automated solution to attack localization. Note that the attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large scale interconnected system, even when the data comes from many geospatially located heterogeneous sensors (i.e., conventional drone sensors, unconventional sensors, etc.). This may offer additional commercial advantages for post-mortem analysis after an attack.

Figure 29:
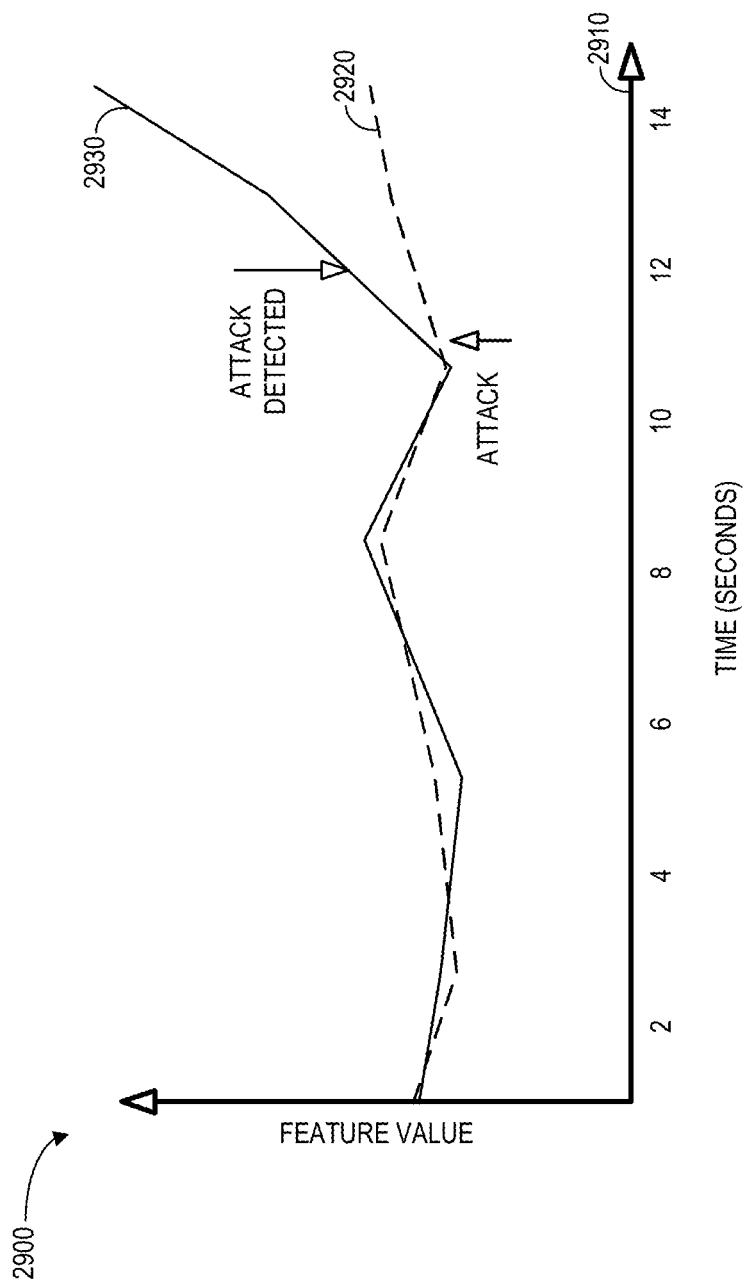
FIG. 29 illustrates a feature time series of an attack comparing the real-time feature of a monitoring node to the modeled feature of the monitoring node according to some embodiments.

FIG. 29 illustrates a feature time series 2900 of a first attack example comparing the real-time feature of a monitoring node to the modeled feature of a monitoring node via a graph 2910 according to some embodiments. In particular, the examples described with respect to FIGS. 29 through 32 involve the following parameters for a UAV system:

Velocity,
Acceleration,
Yaw,
Latitude,
Longitude, and
Pitch.

Consider, for example, an attack on pitch. In this single attack scenario, the system may want to verify whether it can detect and localize the attacked node. As illustrated in FIG. 29, the attack is detected at t=12 sec. Using the embodiments described herein, the attack is detected within 1 sec and correctly localized to pitch. FIG. 29 shows the measured feature time series of the detected and localized attack 2930 along with the generated features 2920 estimated using stochastic model-based estimation.

Figure 30:
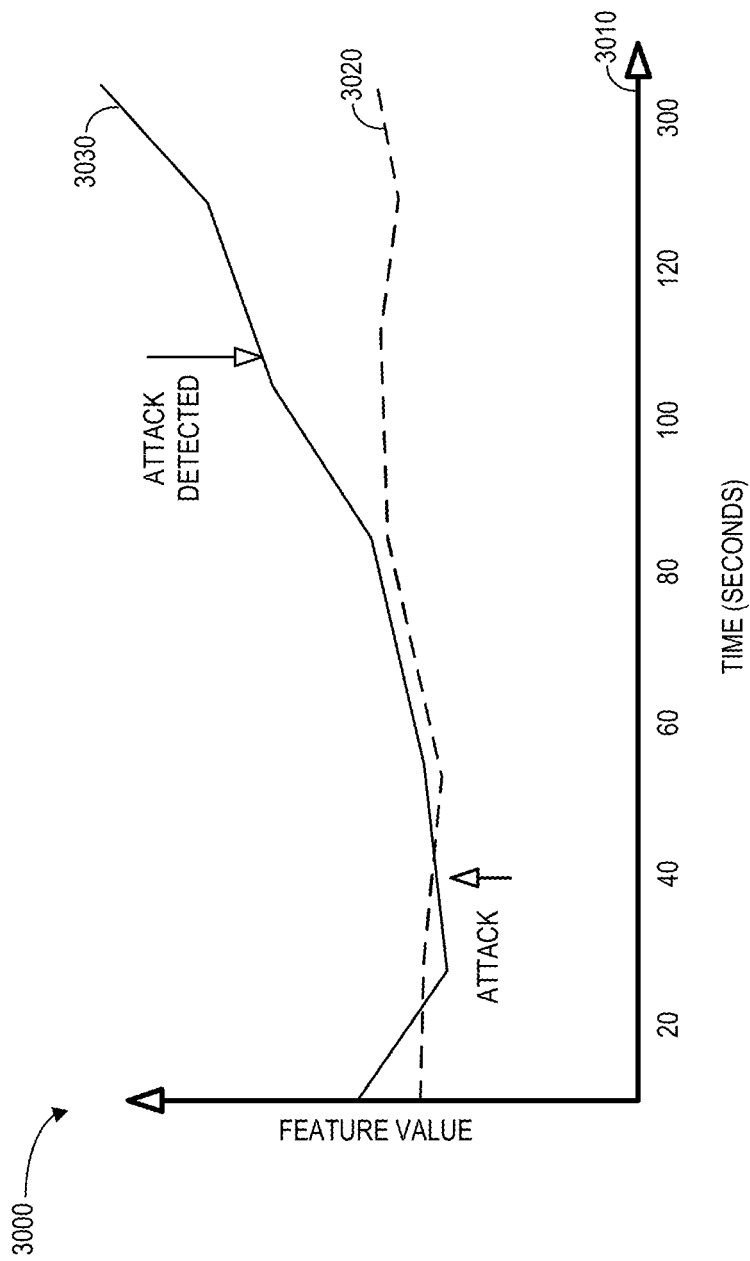
FIG. 30 illustrates a feature time series of a stealthy attack comparing the real-time feature of a monitoring node to the modeled feature of a monitoring node in accordance with some embodiments.
Figure 31:
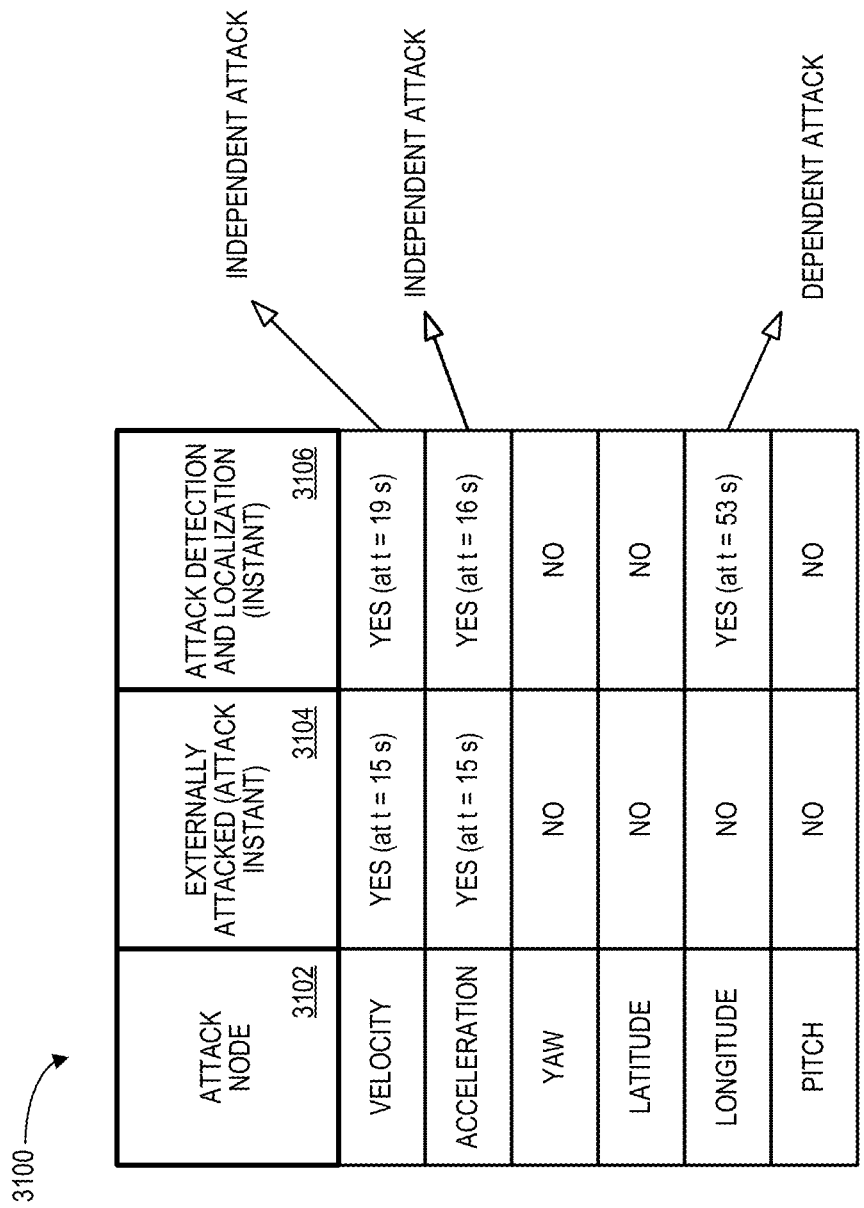
FIG. 31 is an example of attack localization in a multiple-attack scenario according to some embodiments.

FIG. 30 illustrates a feature time series 3000 via a graph 3010 of a second (stealthy) attack comparing the real-time feature of a monitoring ode to the modeled feature of a monitoring node in accordance with some embodiments. That is, this is again an attack on pitch but this time the attack simulates a stealthy attack in which the sensor is tampered with slowly over time and/or elaborately. Such stealthy attacks are designed to pass the existing fault diagnosis system and can remain in the control system for a long time without being detected. In this simulation, the attack was applied at t=40 sec. Using the localization methods described herein, the attack was detected at t=105 sec, and is correctly localized to pitch. FIG. 30 shows the measured feature time series of the detected and localized attack 3030 along with the expected features 3020 estimated using the stochastic model-based estimation.

In a third attack scenario, the system may simulate a simultaneous attack on two monitoring nodes. Two sensors are attacked at the same time, namely velocity and acceleration, and both attacks are applied at t=15 sec. Using embodiments described herein, both attacks are truly detected and localized within seconds. Out of the other 4 sensors, 3 are correctly not detected at all. One is detected (longitude) at a later time, which is dependent attack. The results are summarized in the table 3100 of FIG. 31. In particular, the table 3100 lists the attack nodes 3102 along with associated externally attacked data 3104 and attack detection and localization data 3106.

Figure 32:
FIG. 32 is a causal dependency matrix of monitoring nodes in accordance with some embodiments.

In this third example (illustrated in the table 3100), there are two externally injected attacks on velocity and acceleration. The first attack is detected at t=15 sec and localized to acceleration. Since there is no previously detected attack, the causality test fails and this attack is correctly reported as an "independent attack." The second attack is detected at t=19 sec and correctly localized to velocity. In this case, there is causal dependency and a direct proportion path from acceleration to velocity. The causal dependency matrix 3200 for this example is shown in FIG. 32. The matrix 3200 lists each potential attack node and whether or not that node can have an effect on each other node (with a "1" indicating a potential effect and a "0" indicating no potential effect).

The second attack therefore passes both the causality test and the proportion test. However, based on time separation criterion, in order for the velocity attack to be a dependent attack it must have happened within 4.25<$\Delta t$<9.5 sec after the acceleration detection instance. The actual $\Delta t$ illustrated in the table 3100 is 3 sec (that is, 19 sec-16 sec). Therefore, the time separation test is not passed and, as a result, the velocity attack is correctly reported as an "independent attack."

At t=53 sec, the longitude sensor is also reported as being under attack. Note that there are two previously reported attacks, and the causality and propagation tests pass for both previous attacks (as shown in the matrix 3200). Using the time separation criterion, the longitude attack instant must be with 15.5<$\Delta t$<47 sec after those attacks. The table 3100 lists the actual $\Delta t$ as $\Delta t$=53 sec-16 sec=37 sec for acceleration attack and $\Delta t$=53 sec-19 sec=34 sec for velocity attack.

So, the time separation test passes for both previous attacks and, therefore, the longitude attack is correctly reported as a "dependent attack." Note that, based some embodiments described herein, passing the time separation test even for one previously detected attack may still be enough to report longitude as a dependent attack.

Figure 33:
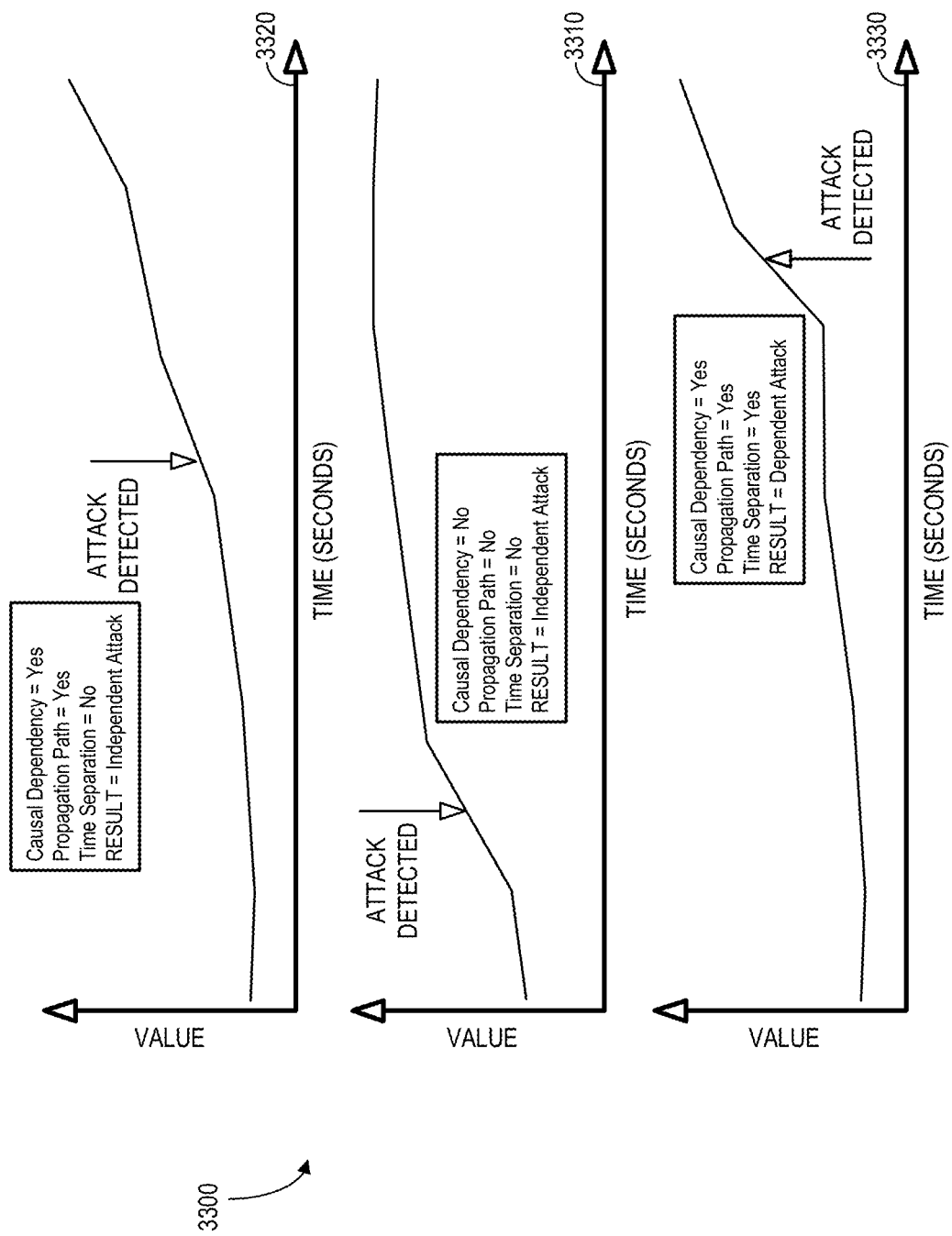
FIG. 33 is an example of attack dependency conformance tests associated with two independent attacks in accordance with some embodiments.

FIG. 33 is an example 3300 of attack dependency conformance tests associated with two independent attacks in accordance with some embodiments. In particular, a first graph 3310 illustrates when an attack on a first sensor was detected. With respect to the attack dependency conformance tests, none of the causal dependency, propagation path, and time separation tests were satisfied and, as a result, the attack is classified as an "independent attack." A second graph 3320 illustrates when an attack on a second sensor was detected. With respect to the attack dependency conformance tests, although the causal dependency and propagation path tests were satisfied, the time separation test was not satisfied and, as a result, this attack is also classified as an "independent attack." A third graph 3330 illustrates when an attack on a third sensor was detected. With respect to the attack dependency conformance tests, all of the causal dependency, propagation path, and time separation tests were satisfied and, as a result, the attack is classified as a "dependent attack."

Thus, embodiments may enable the automatic detection and localization of indications of multi-class abnormal operations using real-time signals from monitoring nodes. Moreover, the detection framework may allow for the development of tools that facilitate proliferation of the invention to various systems (e.g., different UAV models) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to UAV system operators so that an attack may be thwarted (or the effects of the attack may be blunted), reducing damage to equipment.

Figure 34:
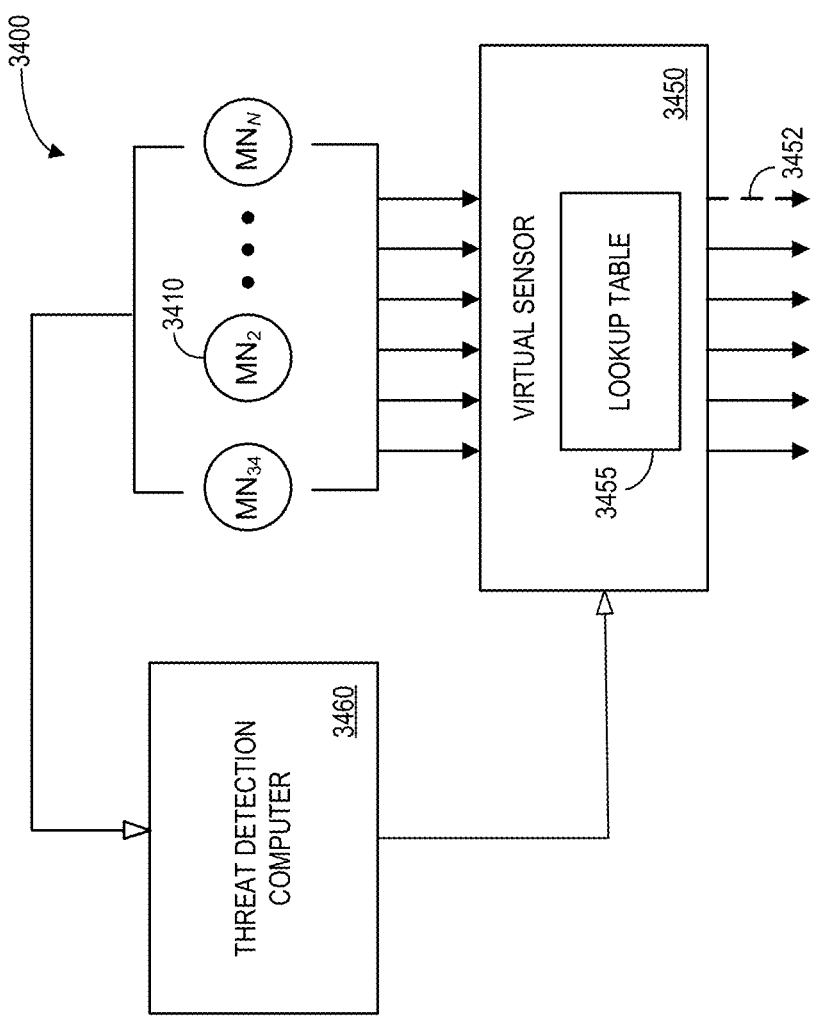
FIG. 34 is a high-level block diagram of a system to protect a UAV system according to some embodiments.

According to some embodiments, an operator of a UAV system might want to implement "accommodation" procedures such that critical functions of the UAV system may automatically still function even in the event of one or more cyber-attacks (e.g., by replacing unhealthy sensor node data values with virtual sensor data values based on information obtained from other, healthy nodes). FIG. 34 is a high-level architecture of a system 3400 that might be used to protect an asset. The system may include a plurality of monitoring nodes 3410, each monitoring node generating a series of monitoring node values over time that represent operation of the UAV system (e.g., altitude, velocity, latitude, etc.). A threat detection computer 3460 coupled to the monitoring nodes 3410 may be adapted to determine that a particular monitoring node is currently being attacked by a cyber-threat. A virtual sensor 3450 may receive an indication of the attacked monitoring node and, as a result, estimate a series of virtual node values for the attacked monitoring node based on information received from monitoring nodes that not currently being attacked (e.g., using a lookup table 3455). In some embodiments, preferably an estimation of series of virtual node values is happening in real-time during normal operation as opposed to estimating the virtual node values after the attack monitoring node information is received. Soon after the attacked monitoring node information is received, attacked monitoring nodes are replaced by the most current virtual node values. The virtual sensor may then replace the series of monitoring node values from the attacked monitoring node with the virtual node values (e.g., as illustrated by the dashed arrow output 3452 in FIG. 34).

Figure 35:
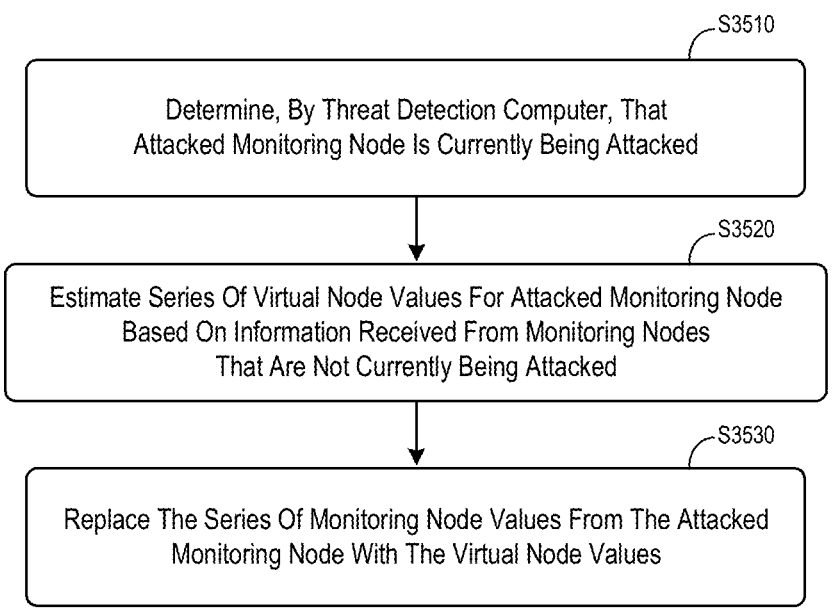
FIG. 35 is a UAV system protection method in accordance with some embodiments.

FIG. 35 is a UAV system protection method that might be associated with the elements of the system of FIG. 34. At S3510, a threat detection computer might determine that an attacked monitoring node is currently being attacked. Examples of systems and processes that might be used to make such a determination are described, for example, with respect to FIGS. 36 through 47. At S3520, a virtual sensor may estimate a series of virtual node values for the attacked monitoring node based on information received from monitoring nodes that are not currently being attacked. That is, information from "healthy" monitoring nodes may be used to estimate data from a monitoring node that is behaving abnormally. Note that the estimations associated with S3520 might be performed even before a determination is made that a particular node is currently being attacked (e.g., S3510). At S3530, the series of monitoring node values from the attacked monitoring node may be replaced with the virtual node values. As a result, the UAV system may continue to operate even when undergoing a cyber-attack.

Note that UAV processes may be controlled by Programmable Logic Controllers ("PLC") with Ethernet ports and IP addresses. Computer worms can live in the PLC and be inactive for many days and can replicate itself into many targets as it finds them. IT and OT protection mechanisms cannot completely keep a PLC safe and different approaches may be needed to protect critical infrastructures from more advanced viruses and allow for a UAV system to operate (including critical functions) even when being attacked. In particular, some embodiments described herein provide a multi-node virtual sensor to sustain operation of a UAV system with no loss of critical function. The virtual sensor might utilize, for example, some or all of the following information to estimate true signals; (1) information from localization about which nodes were attacked independently, (2) features from monitoring nodes, and (3) a multi-node feature-based virtual sensor model trained apriori from the system data set. Estimated true signals may then be used in the respective nodes instead of attacked signals.

In a control system during operational normalcy, the system may receive time series signals from various monitoring nodes (i.e., sensor, actuator, controller, etc.). Consider a general system (e.g., cyber-physical system, software system, bio-mechanical system, network system, communication system, etc.) that contains access to continuous streams of data in the form of time series signals from all these sensors. The time series signals might be generated from a set of output sensor nodes ("y"; both physical and virtual sensors already incorporated in the system), a set of actuator nodes ("u"; both hard and soft actuators generated from open or closed loop system), a set of output of controller nodes ("c"; controller node signals), and a set of reference nodes ("r"; reference signals). According to some embodiments, logicals are also considered as time series signals. Some or all combinations of these signals may be used for the purpose of accommodation with a virtual sensor.

The virtual sensor matrix used for this purpose may, for example, estimate not only system sensor outputs, y, when an attack takes place to any of the sensor nodes, but also other signals to the control system; actuator node signals, u, controller node signals, c, reference signals, r, etc. Thus, the virtual sensor based accommodation system may provide an intelligent system that is designed to estimate signals that are corrupted/attacked from the healthy signals it receives.

Figure 36:
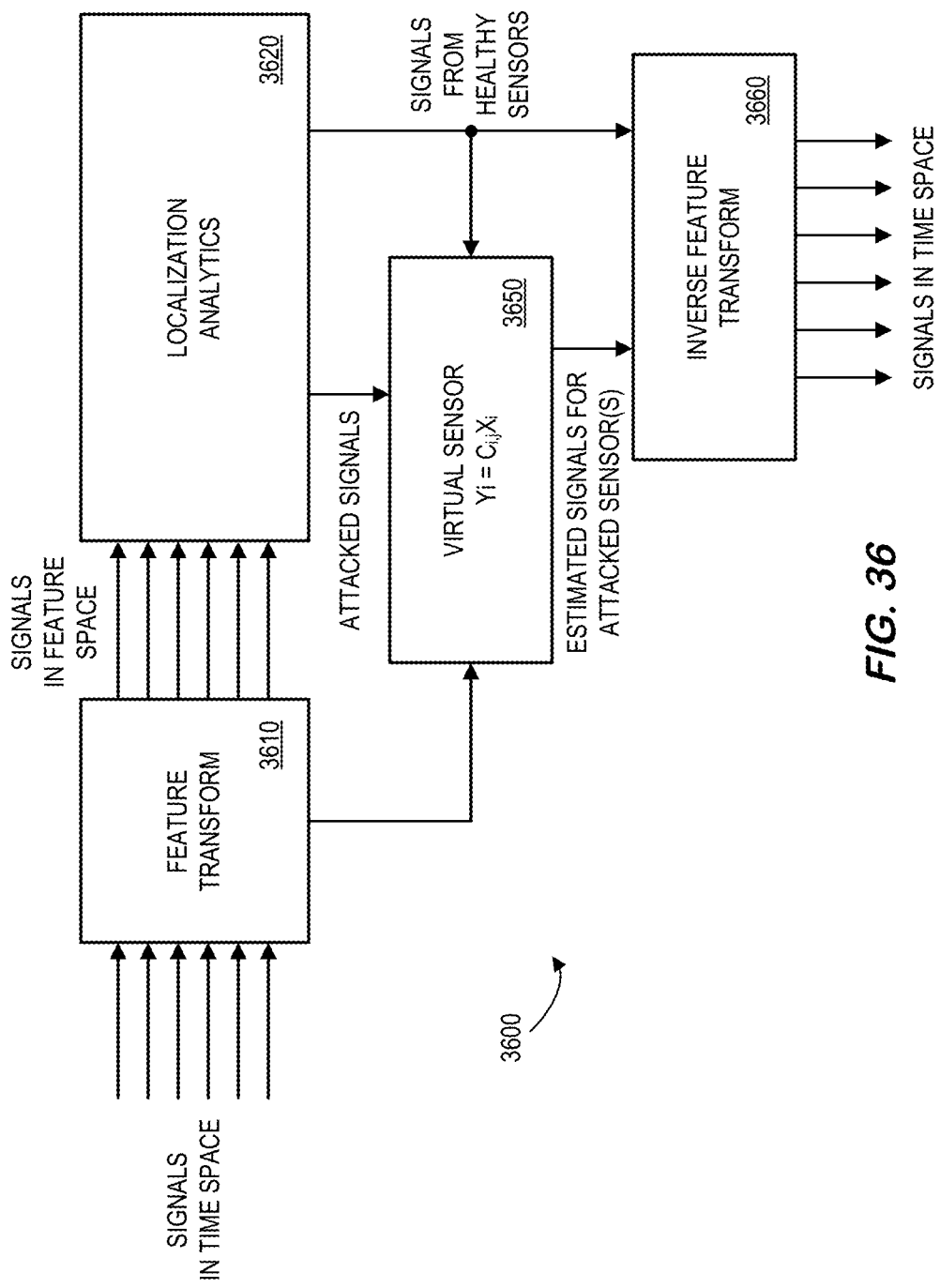
FIG. 36 is a high-level block diagram of a virtual sensor for neutralization in accordance with some embodiments.

Consider, for example, FIG. 36 which shows a schematic diagram of how the virtual sensor based accommodation system 3600 might estimate true signals. According to some embodiments, the system 3600 may handle many types of inputs from multiple heterogeneous data stream in a complex hyper connected system. Therefore, signals from time domain may be converted to features using Multi-Modal, Multi-Disciplinary ("MMMD") feature discovery framework and/or techniques such as linear PCA. Features may be arranged in vector form to estimate signals for attacked monitoring nodes as determined by localization analytics 3620. A virtual sensor model 3650 may include a matrix containing the model of the sensor which is then applied to feature vector to estimate the signals in feature space (e.g., after a feature transform 3610). Estimated true values in feature space may then be transformed to time domain using inverse feature transform 3660. Note that embodiments may operate in feature space and dynamically create virtual versions of the attacked sensors based on the healthy sensors that are left. Note that the virtual sensor 3650 may utilize a lookup table, such as the table 3700 illustrated in FIG. 37 including a virtual sensor matrix 3710 and a signal being estimated 3720, to create a value $Y_i = C_{i,j} X_i$ (where i represents the signals in feature space being estimated and j represents the number of attacked signals being estimated).

Figure 38:
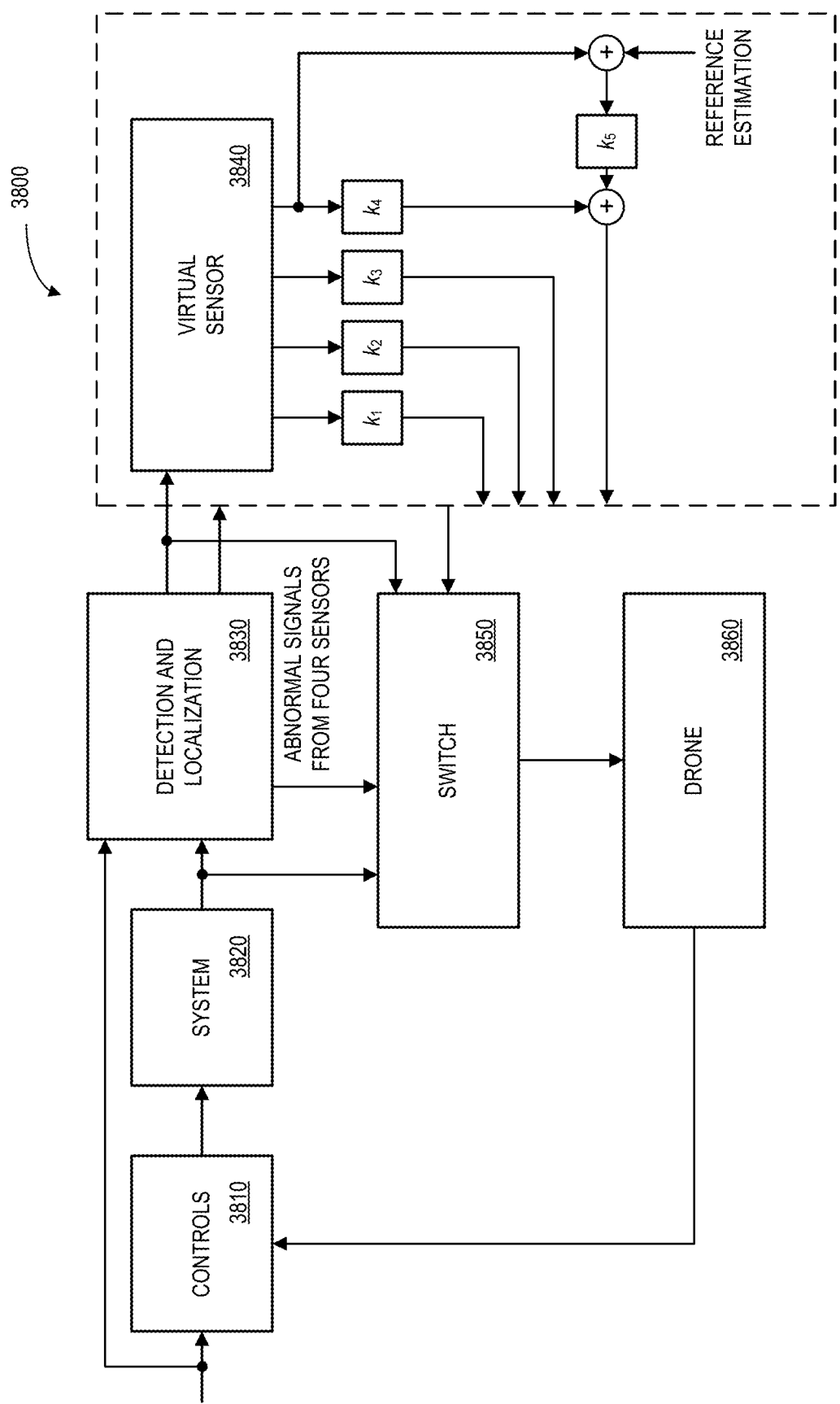
FIG. 38 illustrates an example of a virtual sensor implementation according to some embodiments.

FIG. 38 represents an architectural view of an accommodation system 3800 with a multi-node feature-based virtual sensor algorithm. Note that a set of output sensor nodes ("y"; both physical and virtual sensors already incorporated in the system), a set of actuator nodes ("u'"; both hard and soft actuators generated from open or closed loop system), a set of output of controller nodes ("c"; controller node signals) and a set of reference nodes ("r"; reference signals) may be continuously monitored by a detection and localization algorithm 3830 based on information from controls and/or a drone 3820 (and, in some embodiments, a forecasting algorithm). In the event of an attack, a forecasting algorithm may predict ahead of time that the operation of the system 3800 is moving closer to the decision boundary. In such an event, the forecasting algorithm may trigger the virtual sensor module 3840 to build a list of healthy sensor nodes in order to estimate the signals that may have been attacked. The virtual sensor 3840 at this stage prepares for the worst-case scenario with the assumption that all the nodes suggested by the forecasting algorithm have been attacked. The system may pick the corresponding C matrix (FIG. 37) to estimate the signals on the nodes that the forecasting algorithm suggested. Once the detection and localization algorithm detects that there is an attack, the switches associated with the input, reference, controller, and output signals are activated. This puts the signals estimated by the virtual sensor 3840 (e.g., $k_1$, $k_2$, $k_3$, and $k_4$ as modified by reference estimation k5) in the feedback control loop via a switch 3850 to the drone 3860 and disables the attacked signals. This may lead to a degraded performance of the system but the system may still be operational. Performance may be degraded more as a large number of nodes are attacked since the number of available healthy sensors diminish. Once the localization algorithm provides an accurate list of sensor nodes that have been attacked (and separates the dependent attacks from the independent attacks), the virtual sensor 3840 can pick the appropriate C matrix considering only the independent attacks. This will lead, according to some embodiments, to a more accurate estimation procedure. Once the estimation is complete, the estimated signals are fed back into the control loop to achieve normal operation. Since the virtual sensor approach proposed in accordance with some embodiments will estimate even the actuator signals that are compromised, control signals will eventually see an improvement. Hence, some embodiments will reduce the need to have a separate controller (i.e., a redundant controller).

Note that Intelligent Dual systems and Triple Modular Redundant ("TMR") sensing systems have been used in modern UAV control systems. The goals of these redundancy sensing systems were aimed at improving reliability when sensors fail. They are not designed for sustaining operations in the presence of malicious attacks since attacks on industrial system are generally multi-prong (meaning effects are seen on more than one node at the same time). They are also not designed to handle an intelligent attack where the values of the sensor are being manipulated to cause harm, not simply a fail state.

Thus, embodiments may improve cyber security and accommodate critical functionality associated with a UAV system. Moreover, embodiments may by-pass signals from attacked sensors using estimated signals created using data from healthy sensors just before the attack took place. This approach may allow for a correction mechanism to sustain the operations while alerting the operators about the cyber-attack. Increasing machine intelligence through multi-node feature-based virtual sensors may provide cyber-safe operations because of its abilities to estimate multiple attacked nodes simultaneously from an extremely large number of healthy nodes. A properly designed system, linking all critical nodes can provide increased resilience to attacks. Moreover, embodiments may result in an ability to install fewer redundant sensors due to the highly accurate virtual sensors described herein.

According to some embodiments, one may construct a multi-node virtual sensor in a hyper-connected network of control system signals from sensors, actuators and controllers. Unlike normal approaches used in UAV systems, some embodiments may use signals from a large number of monitoring nodes as inputs to estimate the signals for single or multiple faulty or attacked nodes. The signals may be generated from output sensor nodes (e.g., physical and/or virtual sensors), actuator nodes (e.g., hard and/or soft actuators generated from open or closed loop system), controller nodes (e.g., controller node signals), reference nodes (e.g., reference signals), and the like. Thus, the Feature-based Multi-node Virtual ("FMV") sensing may use system-wide information simultaneously and hence can be accurate.

Figure 39:
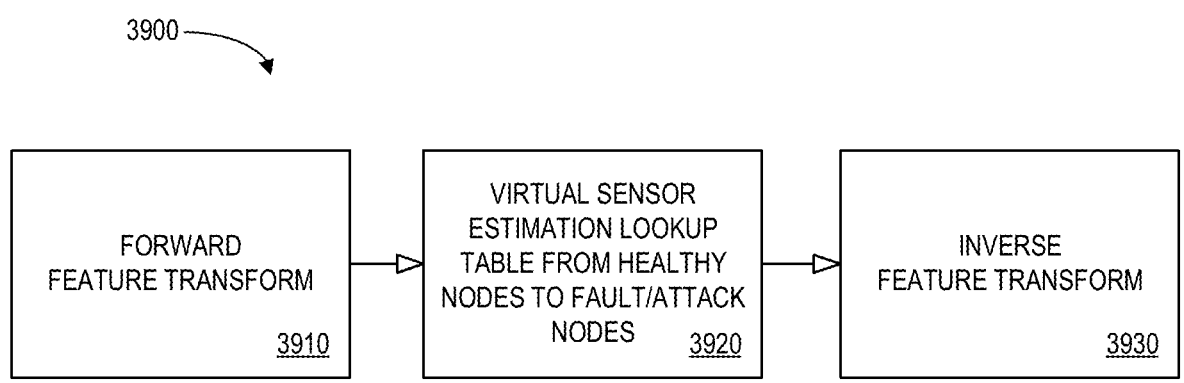
FIG. 39 is a high-level block diagram of components associated with a feature-based, multi-node virtual sensing system for cyber-physical system in accordance with some embodiments.

An FMV sensor may incorporate an algorithm 3900 that uses many computational blocks as shown in FIG. 39. In particular, the blocks may include a forward feature transform 3910, a virtual sensor estimation lookup table from healthy nodes to faulty/attacked nodes 3920, and an inverse feature transform 3930. At its core, a sensor estimates the features of signals from nodes (for this purpose all nodes may be referred to as "sensors") that are faulty or under attack from the features of the signals from other nodes (i.e., sensors) that are healthy or not under attack. The mapping between various combinations of the set of signals being estimated and the set of healthy signals may be stored in a lookup table. The lookup table may be computed, for example, in feature space during training using signals from multiple healthy nodes. Once the lookup table is ready, the FMV sensor can be used in real time for the intended purpose.

Figure 40:
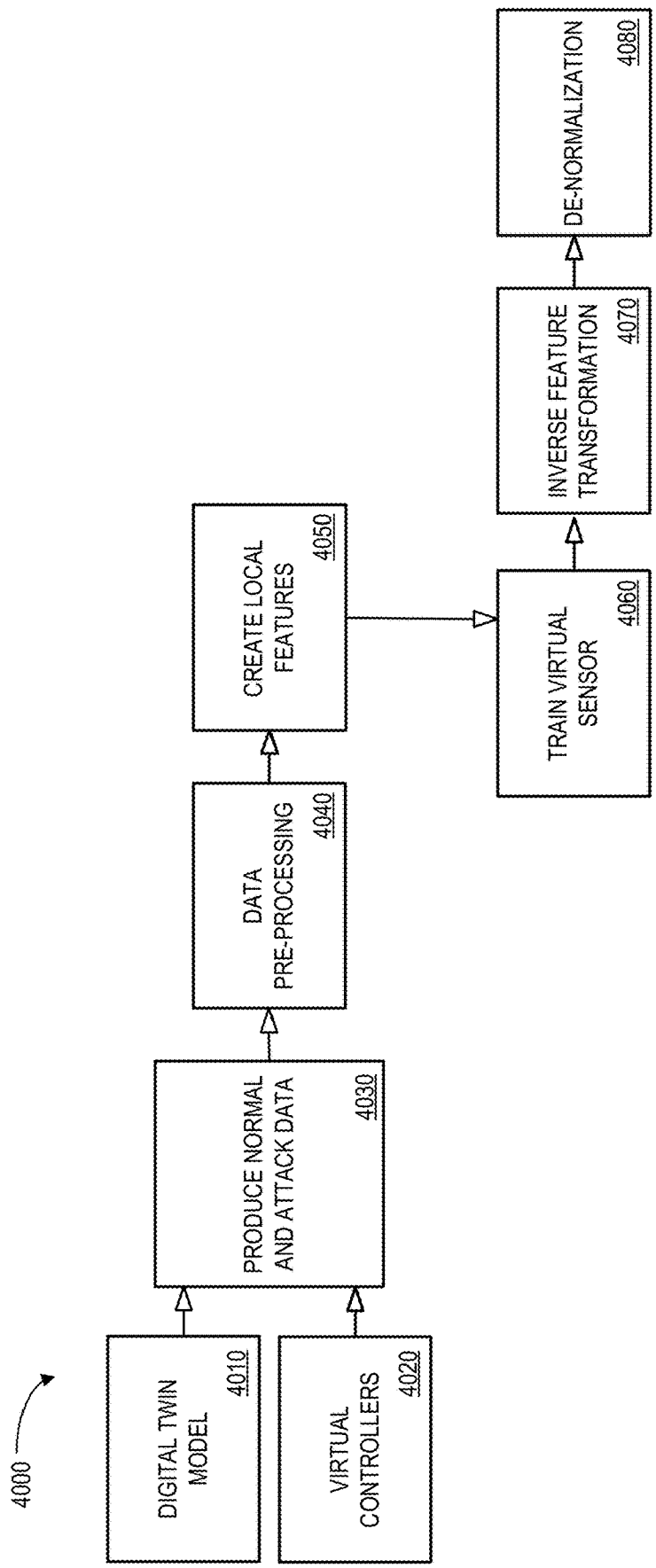
FIG. 40 is a more detailed diagram of a feature-based, multi-node virtual sensor training phase process according to some embodiments.

FIG. 40 shows various components and process steps for training the sensor from a large set of data. In particular, the system produces normal and attack data 4030 using a digital twin 4010 (e.g., a high-fidelity, physics-based model) and virtual controllers 4020. The data set can be created from DoE runs on the digital twin model 4010 with attacks, faults and normal operational state or directly from operational data. Data pre-processing 4040 may then be performed to create local features 4050 that can be used to train the virtual sensor 4060. Next, an inverse feature transformation may be executed to generate estimated time series data and de-normalization 4080 may be performed.

According to some embodiments, a sensing approach may handle many types of inputs from multiple heterogeneous data stream in a complex hyper connected system. This will enable multiple redundancies inside the computational blocks which are needed to estimate accurate signals from the sensor. To do this, continuous signals from time domain are converted to feature space using a MMMD feature discovery framework or PCA type techniques. Only invertible features from MMMD feature discovery process are considered for this purpose.

A "feature" may refer to, for example, mathematical characterizations of data and is computed in each overlapping batch of the data stream. Examples of features as applied to sensor data can be classified broadly into knowledge-based, shallow and deep features. Knowledge-based features use domain or engineering knowledge of physics of the system to create features. These features can be simply statistical descriptors (e.g., max, min, mean, variance), and different orders of statistical moments, calculated over a window of a time-series signal and its corresponding FFT spectrum as well. Shallow features are from unsupervised learning (e.g., k-means clustering), manifold learning and nonlinear embedding (e.g., isoMap, LLE), low dimension projection (e.g., PCA, independent component analysis), and neural networks, along with genetic programming and sparse coding.

Deep learning features (e.g., auto encoders) may be generated using deep learning algorithms which involve learning good representations of data through multiple levels of abstraction. By hierarchically learning features layer-by-layer, with higher-level features representing more abstract aspects of the data, deep learning can discover sophisticated underlying structure and features. Still other examples include logical features (with semantic abstractions such as "yes" and "no"), and interaction features. Logical features might not be required for FMV sensors in some embodiments, but can be used for diagnostic purpose.

One example of a feature transform, referred to as Linear PCA, that may be used to construct an example FMV sensor will now be described. Note that this approach can be extended to include various other features described above. The Linear PCA based feature transform may project the time series signals (e.g., 40 second batch length) onto a set of orthonormal basis vectors. The procedure is described by the following equations:

$$y = y_0 + \sum_{j=1}^{M} w_j \Psi_j$$

$$w_j = \Psi_j^T (y - y_0)$$

The weights ($w_j$'s) represent the features of the time series signal y in the feature space with reduced dimensionality. Prior to the feature transformation, the time series signals may be pre-processed using normalization.

With respect to a virtual sensor estimator, suppose $w_j^{(i)}$ is the j-th feature of the i-th sensor. The virtual sensor estimates the features of a given sensor(s) from the features of the other sensors. For example, the j-th feature of the first sensor is estimated from the features of the other sensors in the following way:

$$\hat{w}_j^{(1)} = C_j^{(1)} \begin{bmatrix} w_j^{(2)} \\ w_j^{(3)} \\ \dots \\ w_j^{(n)} \end{bmatrix}$$

In this equation, n is the number of sensors and $C_j^{(1)}$ is a matrix with one row and n−1 columns. Suppose each sensor is represented by m features. Then, the estimation procedure can be represented by the following equation:

$$\begin{bmatrix} \hat{w}_1^{(1)} \\ \hat{w}_2^{(1)} \\ \dots \\ \hat{w}_m^{(1)} \end{bmatrix} = \begin{bmatrix} C_1^{(1)} & 0 & 0 \\ 0 & \dots & 0 \\ 0 & 0 & C_m^{(1)} \end{bmatrix} \begin{bmatrix} w_1^{(2)} \\ w_1^{(3)} \\ \dots \\ w_1^{(n)} \\ \vdots \\ w_m^{(2)} \\ w_m^{(3)} \\ \dots \\ w_m^{(n)} \end{bmatrix}$$

where:

$$C = \begin{bmatrix} C_1^{(1)} & 0 & 0 \\ 0 & \dots & 0 \\ 0 & 0 & C_m^{(1)} \end{bmatrix}_{m \times m(n-1)}$$

$$W_y^T = [\hat{w}_1^{(1)} \; \hat{w}_2^{(1)} \; \dots \; \hat{w}_m^{(1)}]_{m \times 1}$$

$$W_x^T = [w_1^{(2)} \; w_1^{(3)} \; \dots \; w_1^{(n)} \; \dots \; w_m^{(2)} \; w_m^{(3)} \; \dots \; w_m^{(n)}]_{m(n-1) \times 1}$$

$$W_y = C W_x$$

The quadratic and cubic terms of the features in $W_x$ can be included to improve the estimation accuracy. Thus, for example, one could define $W_x^T$ as equaling:

$$[w_1^{(2)} w_1^{(3)} \dots w_1^{(n)} (w_1^{(2)})^2 \dots (w_1^{(n)})^2 (w_1^{(2)})^3 \dots (w_m^{(2)}) \dots w_m^{(n)} (w_m^{(2)})^3 \dots (w_m^{(n)})^3]_{3m(n-1) \times 1}$$

The matrix C is computed during the training phase using regression from the data set which is described next.

With respect to linear least squares regression consider the prior equation for $W_y$:

$$W_y^T = W_x^T C^T$$

$$W_x W_y^T = W_x W_x^T C^T$$

$$C^T = (W_x W_x^T)^{-1} W_x W_y^T$$

That last equation represents the linear least squares based regression solution to compute the C matrix. One can manually compute the C matrix as shown in the equation or one could use the built-in function of MATLAB called the 'nlinfif' for regression. At the end, a virtual sensor lookup table may be constructed using the C matrix for various combinations of the signals being estimated.

With respect to the virtual sensor lookup table, the system may build a lookup table with matrices $C_{ij}$ where j indicates the number of signals being estimated by the virtual sensor and i indicates the signals being estimated. For instance, in the case of UAV data, FIG. 37 represents an example virtual sensor lookup table 3700. As an example, $C_{1,1}$ in FIG. 37 corresponds to the virtual sensor that estimates the altitude signal while $C_{15,2}$ corresponds to the virtual sensor that estimates two signals namely pitch and latitude.

With respect to an inverse feature transform 4070, it may need to be performed to map the feature vectors back to the input space. This step may be important during the training phase 4060 (i.e., while generating accurate virtual sensor lookup table) to evaluate the performance of the virtual sensor lookup table. In the verification step, virtual sensor lookup table output is used to verify how close the estimated sensor values are to the original sensor values in the input space.

When PCA is performed to obtain the features of the time series signals, the following procedure is used to map the features back to the input space:

$$\hat{y} = y_0 + \sum_{j=1}^{M} \hat{w}_j \Psi_j$$

Here $\hat{y}$ represents the estimated signal in the input space and $w_j$ is the j-th feature of the given sensor signal estimated by the virtual sensor algorithm. Given that the PCA based feature transform is a linear map, the inverse map from the feature space to the input space is well defined. The pre-image for each feature vector exists and is unique.

Figure 41:
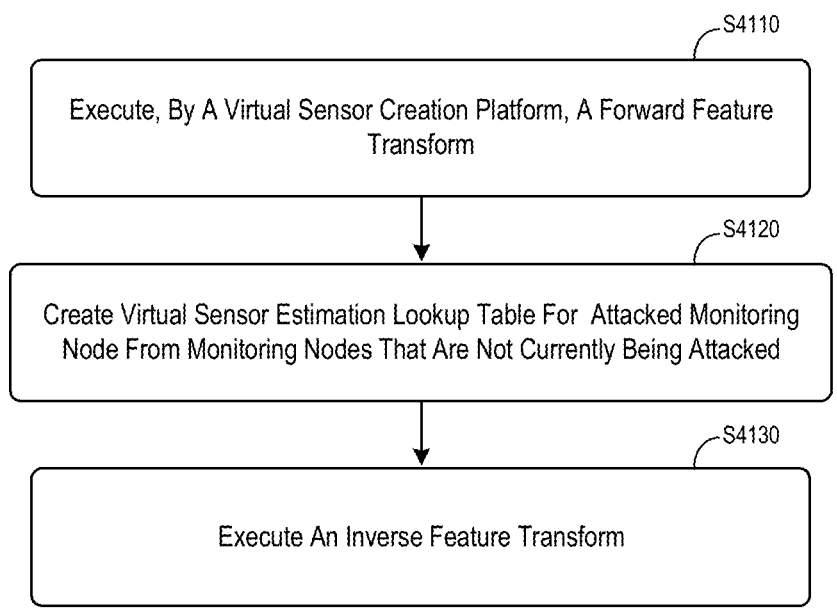
FIG. 41 is an example of a method associated with an algorithm for a feature-based, multi-node virtual sensor according to some embodiments.

FIG. 41 illustrates a virtual sensor creation method that may be performed in accordance with some embodiments. At S4110, a virtual sensor creation platform may execute a forward feature transform (e.g., creating local features and vectors after data pre-processing is performed on normal space and attacked space data). At S4120, the system may create a virtual sensor estimation lookup table for an attacked monitoring node from monitoring nodes that are not currently being attacked. At S4130, an inverse feature transform may be executed to generate estimated time series data (which may then be de-normalized).

Figure 42:
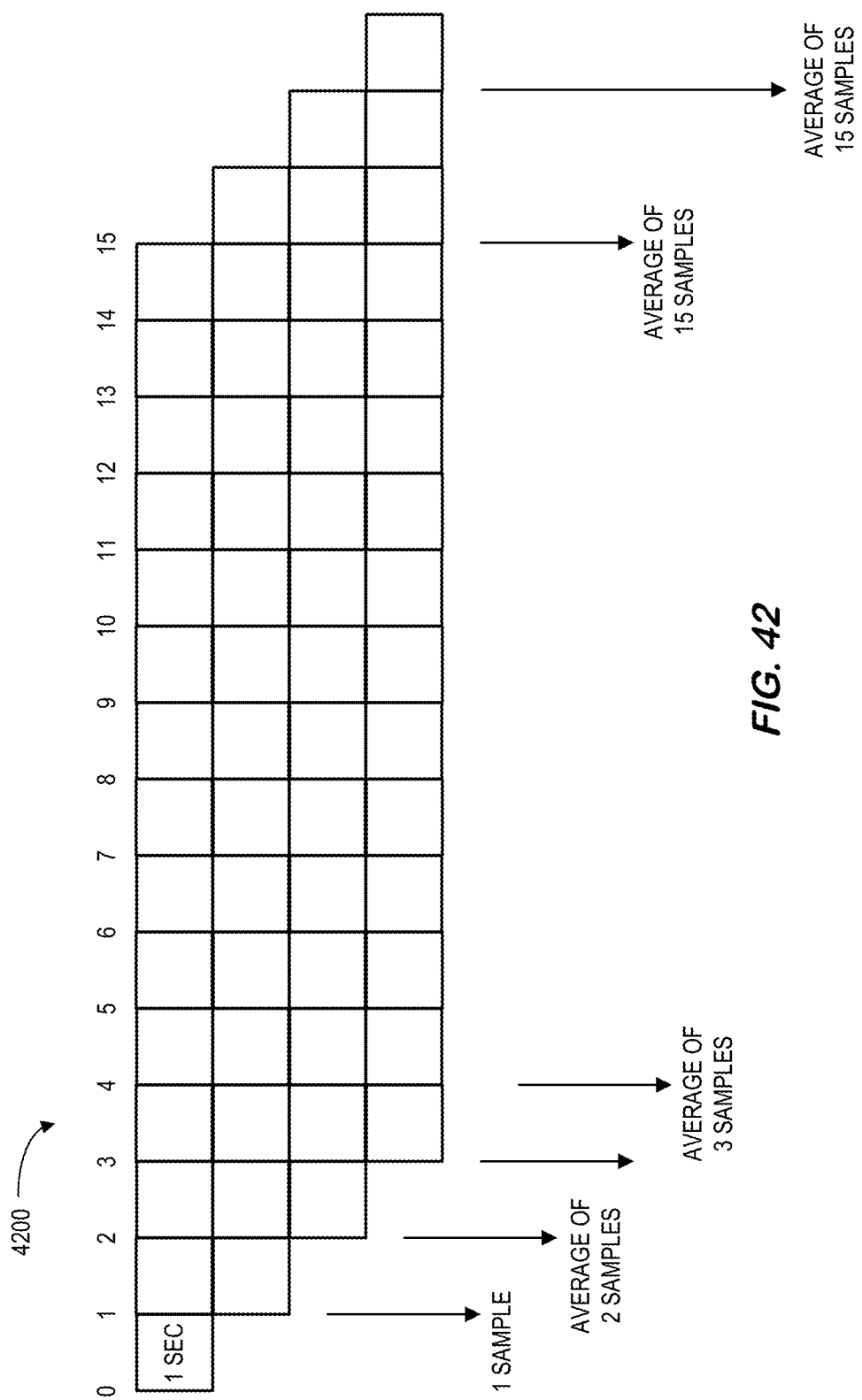
FIG. 42 illustrates a sliding window technique for real-time measurements in accordance with some embodiments.
Figure 43:
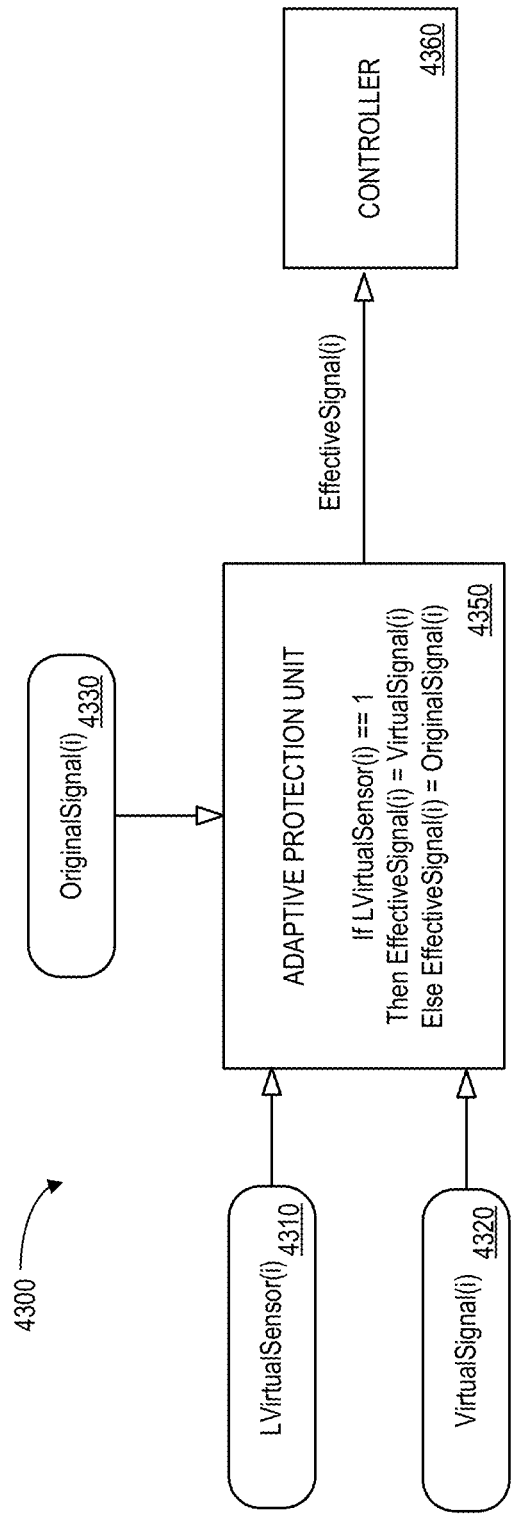
FIG. 43 is a system-level protection unit functional explanation according to some embodiments.

FIG. 42 illustrates how input signals may be processed in a sliding window 4200 during real-time detection. The virtual sensor algorithm performs smoothing of the time series signal using the sliding window technique. Consider for example a window of size 40 seconds, then at the end of the batch (say, the first second for this purpose), the system has one sample of the data from the FMV sensor time series signal. At the end of two seconds, the system has the average of the sample at the 1st second and the sample at the 2nd second. Similarly, at the end of 40 seconds, the system has the average of all the samples in the last 40 seconds. Mathematically, this can be expressed as follows:

$$s_i = 0 \forall i \leq 0$$

$$s_i = \frac{1}{i}\sum_{j=0}^{i} s_{i-j} \text{ for } i < n_{win}$$

$$s_i = \frac{1}{n_{win}}\sum_{j=0}^{n_{win}} s_{i-j} \text{ for } i \geq n_{win}$$

$$s_i = \frac{1}{N - n_{win} + 2}\sum_{j=0}^{n_{win}} s_{i-j} \text{ for } i \geq N - n_{win} + 2$$

Here $n_{win}$ is the size of the window, $s_i$ is the signal value at time i and N is the total number of samples.

The goal in the training phase is to compute the basis vectors for the linear PCA and a C matrix as in equation for $W_y$ that estimates the features of a given sensor(s) using the features of the remaining sensors. If other types of features are used, then a feature discovery process is adopted to find the best features for this purpose. For PCA features, the system may need to compute principal components which require computation of orthonormal basis set.

According to some embodiments, the basis vectors $\psi_j$ are computed for a batch of 45 seconds in the following manner for a UAV data set. Suppose $X^{(m)}$ represents the m-th training data point with 45 second long time series data. The 45 second window might be chosen, for example, to best capture the system dynamics. However, in real time, the transients in the data occur within a much shorter window. Hence, to track the transients with higher accuracy, the system may segment this 45 second data window into three 40 second windows. Thus, if the training data before segmentation is represented as:

$$X = \begin{bmatrix} X_1^{(1)} & \cdots & X_1^{(m)} \\ \vdots & \cdots & \vdots \\ X_{45}^{(1)} & \cdots & X_{45}^{(m)} \end{bmatrix}$$

then after the segmentation, the training data is represented as:

$$\hat{X} = \begin{bmatrix} X_1^{(1)} & \cdots & X_1^{(m)} & X_{16}^{(1)} & \cdots & X_{16}^{(m)} & X_{31}^{(1)} & \cdots & X_{31}^{(m)} \\ \vdots & \cdots & \vdots & \vdots & \cdots & \vdots & \vdots & \cdots & \vdots \\ X_{45}^{(1)} & \cdots & X_{15}^{(m)} & X_{30}^{(1)} & \cdots & X_{30}^{(m)} & X_{45}^{(1)} & \cdots & X_{45}^{(m)} \end{bmatrix}$$

$\hat{X}$ is used for computing the basis vectors. These basis vectors map the 40 dimensional data to a lower dimensional space (for example, 5 dimensions) represented by the basis vectors or Principal Components.

The second step in the training phase involves computing the C matrix in the equation for $W_y$. During the training phase, $W_x$ is a matrix containing the features of the healthy sensors from various training samples as the columns of the matrix. Thus, $W_y$ represents the matrix with the estimated features of the given sensor(s). The first column of $W_y$ corresponds to the estimated features of the given sensor(s) for the training sample 1, the second column of $W_y$ corresponds to the estimated features of the given sensor(s) for the training sample 2 and so on.

When a new test sample arrives, the sensor(s) whose features may need to be estimated is (are) identified. The corresponding C matrix is picked from the virtual sensor lookup table. The new sample is first normalized using various normalization techniques. The normalized sample is then mapped to the feature space using one of the feature transformation techniques described earlier. The equation for $W_y$ is applied on the thus obtained feature space sample using the chosen C matrix. The result of that equation is the features of the given sensor(s) estimated by the virtual sensor lookup table. The estimated features may then be mapped to the input space using the corresponding inverse feature transform.

FMV sensor provides a simple and efficient solution to exploiting these system-wide redundancies in estimating the sensor signals with higher accuracy. Thus, embodiments described herein provide a feature-based framework using a substantial number of inputs from healthy sensors to reconstruct a signal expected from faulty or attacked nodes and, as a result, provides opportunities for creating highly reliable systems. According to some embodiments, a method to sustain the operation of a cyber-physical system with no loss of critical function during a cyberattack may be facilitated using the virtual sensor. Another application may be associated with fault accommodation in which a successful implementation regains the operation lost from a fault occurrence. Note that embodiments described herein may also reduce costs associated with a system by optimizing a number of needed redundancies (i.e., intelligent dual or triple mode redundancies).

Regardless of hardware architecture, an algorithm/computing platform sitting in the communication path from any endpoint to a controller could enable adaptive system-level protection of the controller via virtual sensor integration. The adaptive system-level protection unit may function to filter the signals the controller sees. The high-level function is detailed by the system-level protection unit functional explanation 4300 of FIG. 43. In particular, a system-level Adaptive Protection Unit ("APU") 4350 may act as a signal filter to a controller 4360. An original signal 4330 can pass through the APU if the virtual sensor subsystem has determined the original sensor to be valid (as indicated by LVirtualSensor(i) 4310). If the virtual sensor subsystem determines that the original sensor is not close to the estimated value, then the virtual sensor subsystem will transmit a logical to the APU (LVirtualSensor(i) 4310), which will then prompt the APU to switch the output array of signals (EffectiveSignal) to the corresponding i-th entry to the value of the virtual sensor VirtualSignal(i) 4320. This may be performed in real-time and may be control software agnostic. Therefore, control software changes can be avoided, which provides extensive time savings.

Figure 44:
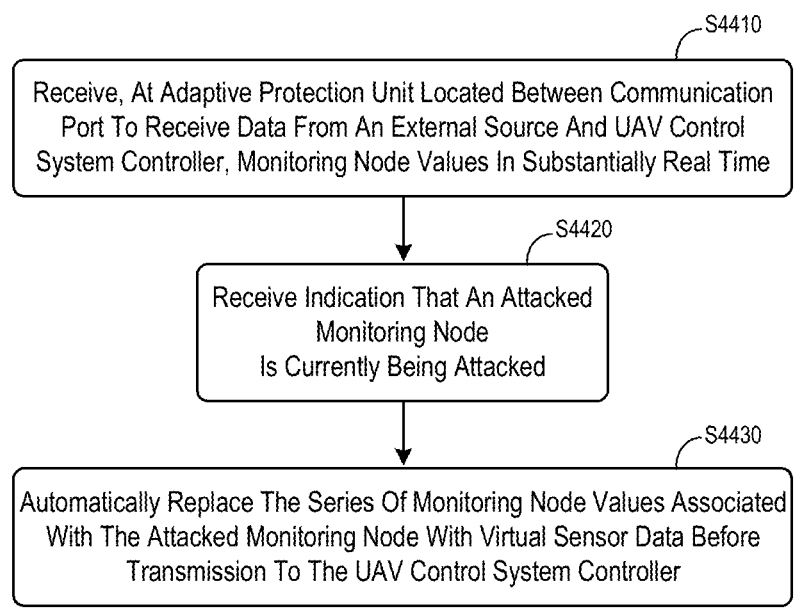
FIG. 44 is an example of a method in accordance with some embodiments.

FIG. 44 illustrates an adaptive protection unit method according to some embodiments. At S4410, an adaptive protection unit located between a communication port (to receive data from an external source) and a UAV system controller may receive the monitoring node values in substantially real time. At S420, an indication may be received that an attacked monitoring node is currently being attacked. At S4430, the adaptive protection unit may automatically replace the series of monitoring node values associated with the attacked monitoring node with virtual sensor data before transmission to the UAV system controller.

Figure 45:
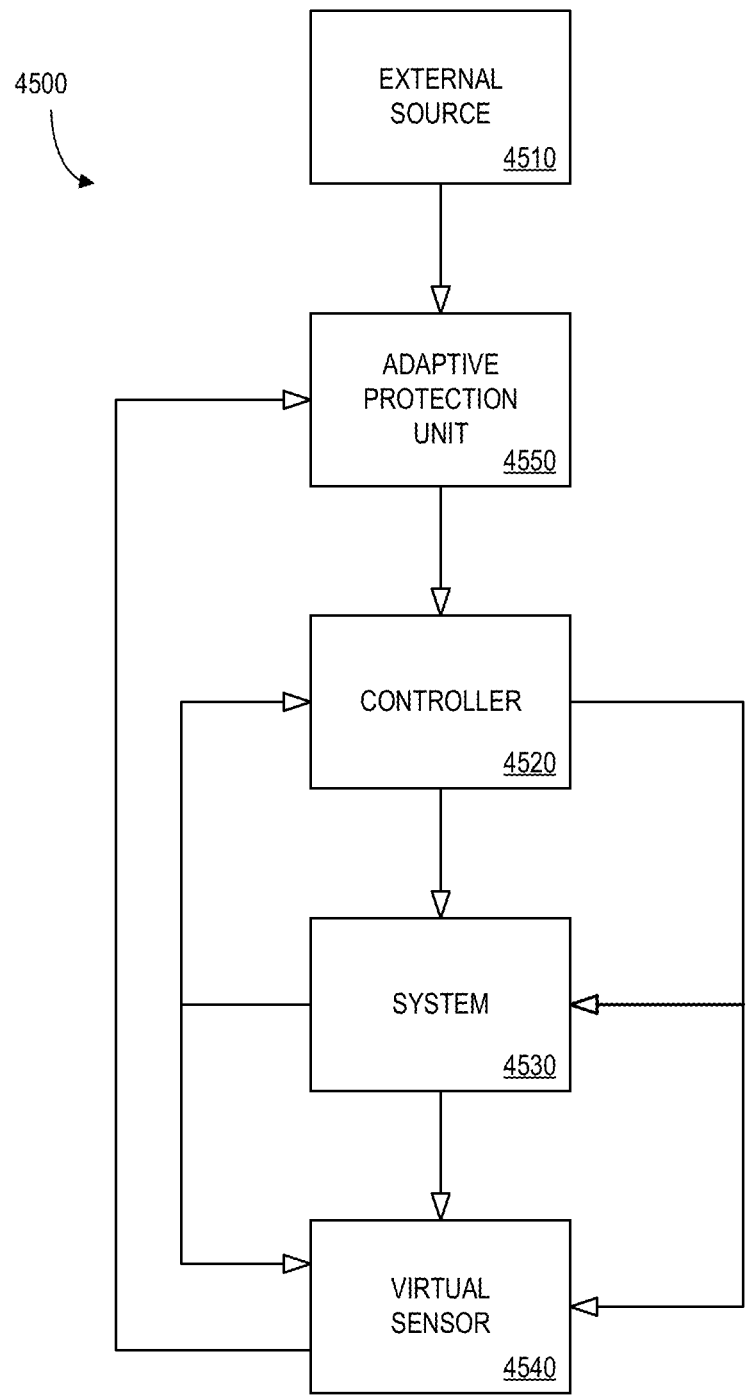
FIGS. 45 through 47 demonstrate various architectures to incorporate an adaptive protection unit according to some embodiments.
Figure 46:
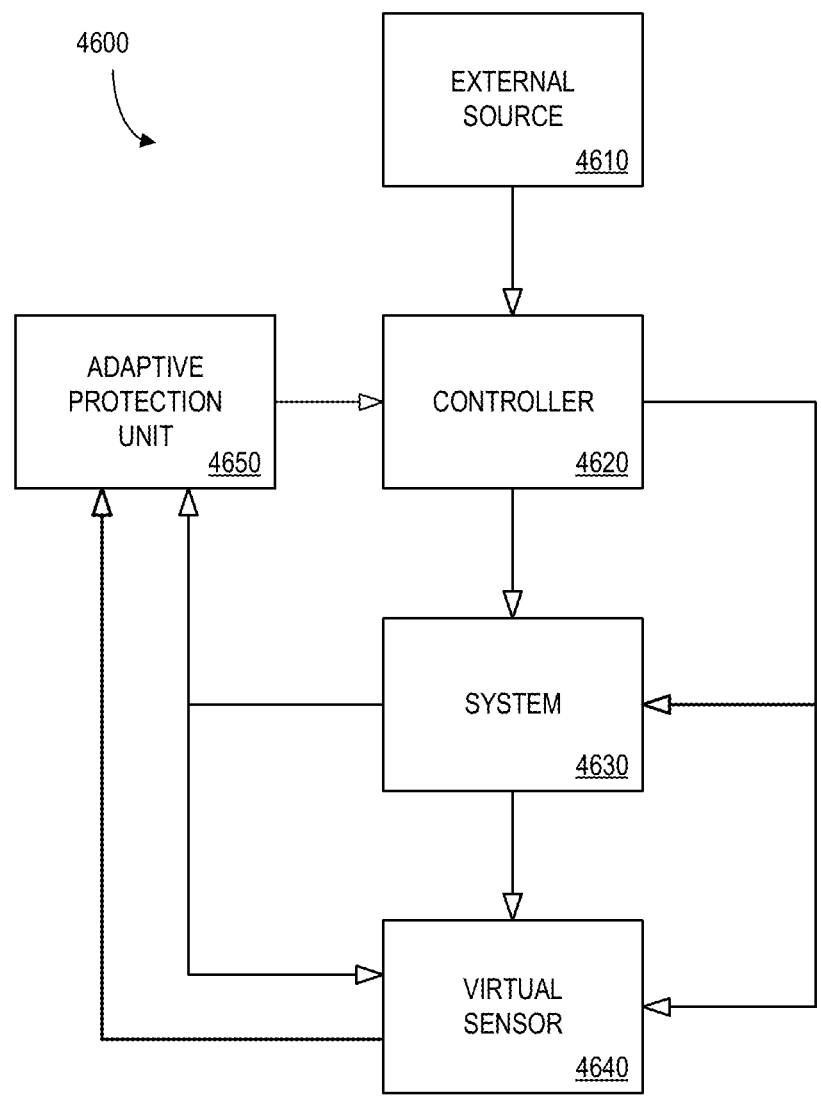
Figure 47:
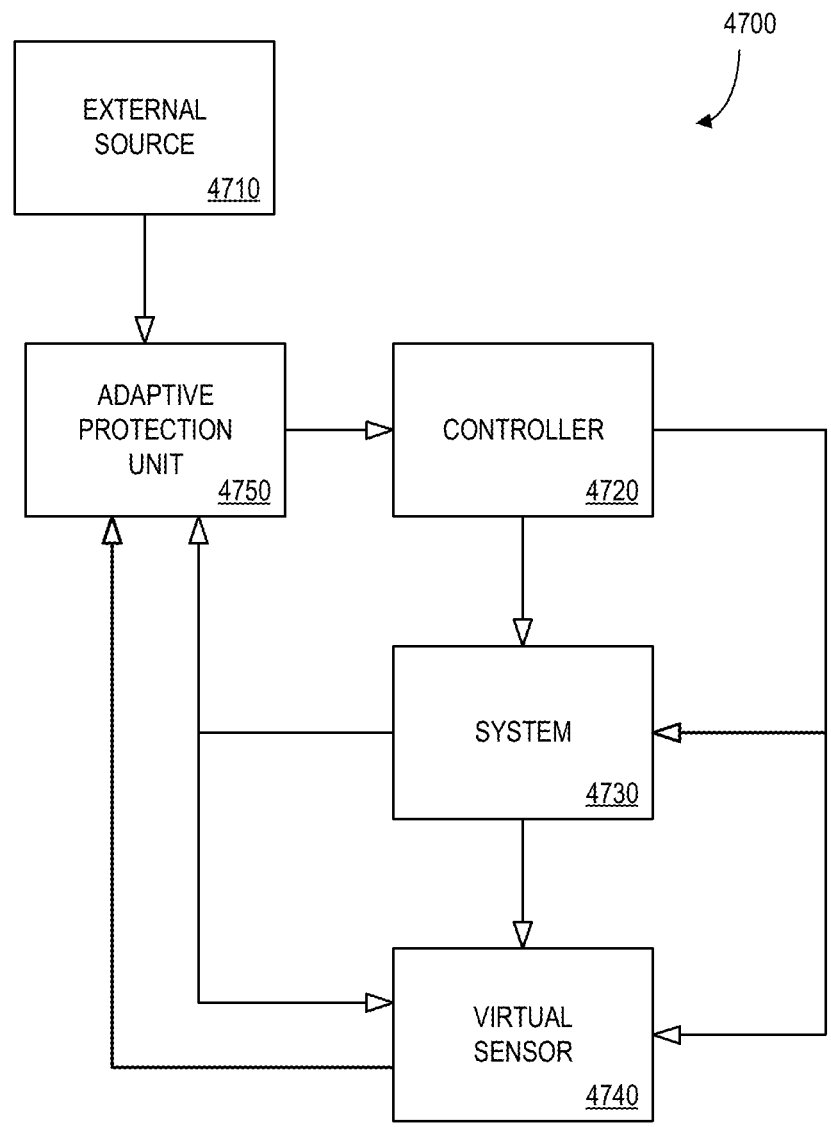

Several example architectures are shown in FIGS. 45 through 47 in accordance with various embodiments. In the system 4500 of FIG. 45, an adaptive protection unit 4550 sits directly between an external source 4510 and a controller 4520. The controller 4520 transmits information to a system 4530 and a virtual sensor 4540. As a result, the adaptive protection unit 4550 can act in the communication path between an external source 4510 and the controller 4520 (such as an HMI). In the system 4600 of FIG. 46, the adaptive protection unit 4650 is implemented in the communication path between the system 4630 and the controller 4620. In the system 4700 of FIG. 47, the adaptive control unit 4750 is implemented in the communication path of both an external source 4710 and the system 4730.

In the event that a signal of a control system network is attacked or corrupted, the network may have no way of accommodating to the corrupt signal. This can lead to degraded performance or catastrophic failure in the case of a cyber-attack. The adaptive protection unit may allow for the control system to neutralize the corrupt signal in real-time and continue functioning seamlessly. Thus, embodiments may help satisfy governmental security regulations. Moreover, embodiments may protect assets from ICS cyber-attacks.

Some embodiments described herein may achieve resiliency to cyber-attacks to provide uninterrupted, equipment-safe, controlled operation for a UAS system while attacks are in progress. As described herein, resiliency is the ability of a control system to force signals (or states) required for operational normalcy. As in a human body, once the method described herein detects a threat (e.g., an infection), the method destroys the threat. Analogous to biomimicry stated above, the example embodiments are directed to a method that extends domain-level security by creating a cyber-based "immune system" specifically desirable to UAV systems.

The methods herein are not only able to identify threats, but may also block the threats by automatically neutralizing their effects on the control system even while the attacks are in progress. Neutralization of the affects may be achieved at key signals by estimating true operational states of the system with new Boundary and Performance-constrained Resilient Estimators ("BPRE"). Furthermore, true signals for operational normalcy may be computed from estimated states enabling the system to continue to function properly. Some methods and systems described herein may deter threats by replicating protection mechanisms adapted by biological systems. How the human body fights off pathogens and other infections is a natural marvel. It automatically detects and triggers a self-defense mechanism to fight. The example embodiments replicate a similar kind of automatic detection and trigger functions for masking or otherwise neutralizing the attack signals. The neutralization approach disclosed here can also be used for securing any system where continuous data stream is available for monitoring purpose.

The neutralization methods described herein may be implemented as software such as an application or a service and may be incorporated within a UAV system such as a control system, a computer, a server, a cloud platform, a machine, an equipment, an aircraft, a locomotive, and the like. While progress with machine and equipment automation has been made over the last several decades, and assets have become "smarter,": he intelligence of any individual asset pales in comparison to intelligence that can be gained when multiple smart devices are connected together, for example, in the cloud. As described herein, an asset is used to refer to equipment and/or a machine used a UAV system. Aggregating data collected from or about multiple assets can enable users to improve business processes, for example by improving effectiveness of asset maintenance or improving operational performance if appropriate industrial-specific data collection and modeling technology is developed and applied.

For example, an asset such as a drone can be outfitted with one or more sensors configured to monitor respective operations or conditions thereof. Data from the sensors can be added to the cloud platform. By bringing such data into a cloud-based environment, new software applications and control systems informed by industrial process, tools and expertise can be constructed, and new physics-based analytics specific to a UAV environment can be created. Insights gained through analysis of such data can lead to enhanced asset designs, enhanced software algorithms for operating the same or similar assets, better operating efficiency, and the like. However, when data is transferred from an edge of the cloud to the cloud platform, attacks may occur. The attacks may affect the processing of signals received from the edge of the cloud. The example embodiments provide a neutralization process that is capable of filtering signals that are transmitted from the edge to the cloud platform backend, as well as transmitting in other situations.

Assets described herein can include or can be a portion of an Industrial Internet of Things ("IIoT"). In an example, an IIoT connects assets including machines and equipment, such as UAVs and the like, to the Internet and/or a cloud, or to each other in some meaningful way such as through one or more networks. The examples described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Assets may have strict requirements for cost, weight, security, performance, signal interference, and the like, in which case enabling such an interface is rarely as simple as combining the asset with a general purpose computing device. To address these problems and other problems resulting from the intersection of certain industrial fields and the IIoT, embodiments provide a cloud platform that can receive and deploy applications from many different fields of industrial technologies. In order for these applications to successfully consume data from machines and equipment also connected to the cloud, the embodiments provide a threat neutralization method that can be implemented within the cloud and that can filter signals between an edge of the cloud and the cloud platform enabling the control of the asset to be maintained as normal.

The PREDIX™ platform available from GE is a novel embodiment of an Asset Management Platform ("AMP") technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

Figure 48:
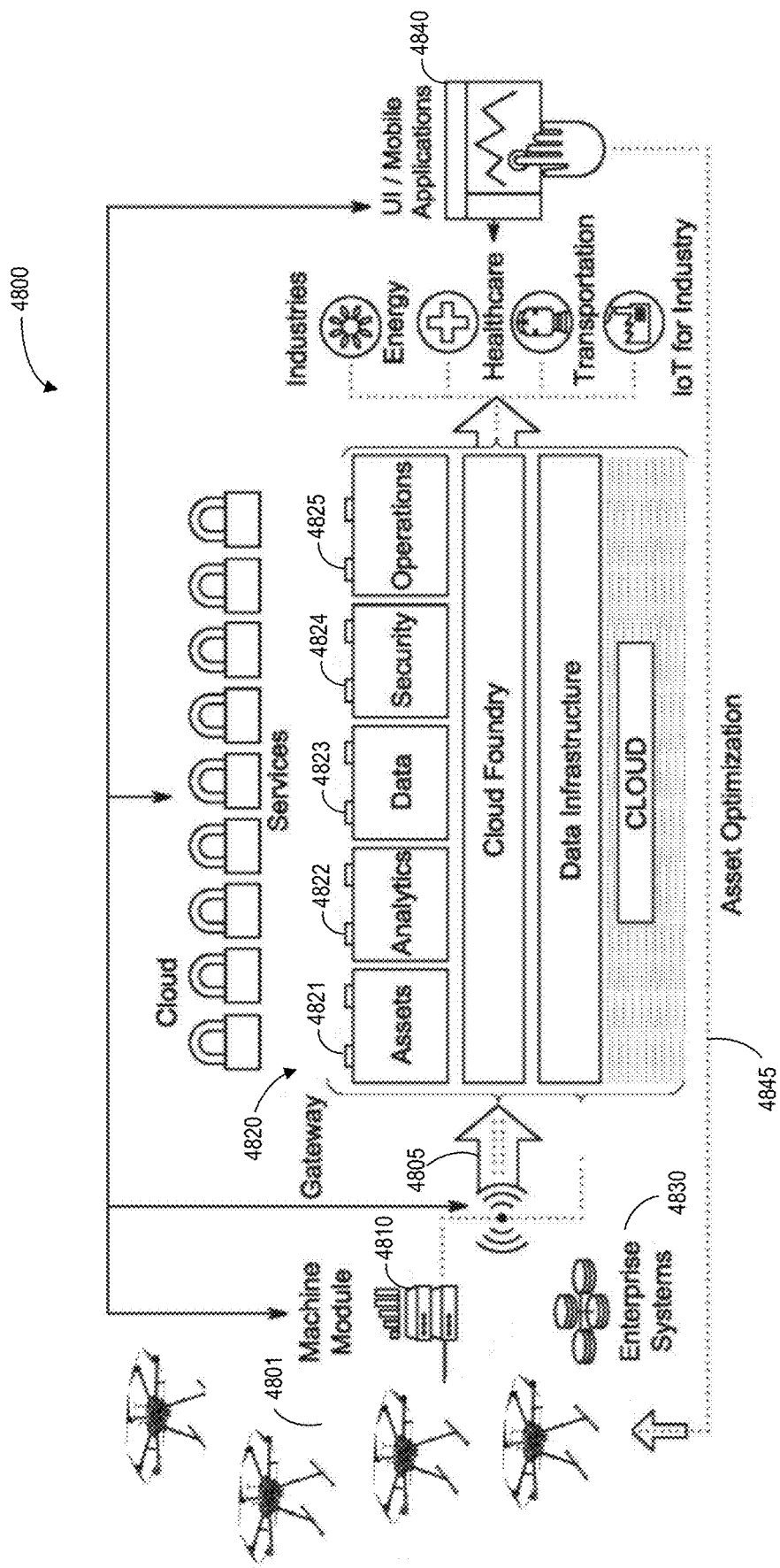
FIG. 48 is a diagram illustrating a cloud-computing environment associated with UAV systems in accordance with an example embodiment.

FIG. 48 illustrates a cloud computing environment associated with UAV systems in accordance with an example embodiment. FIG. 48 illustrates generally an example of portions of a cloud-computing environment, such as one associated with an Asset Management Platform ("AMP") 4800. As further described herein, one or more portions of an AMP can reside in a cloud computing system 4820, in a local or sandboxed environment, or can be distributed across multiple locations or devices. The AMP 4800 can be configured to perform any one or more of data acquisition, data analysis, or data exchange with local or remote assets, or with other task-specific processing devices. The AMP 4800 includes an asset community (e.g., UAVs, drones, etc.) that is communicatively coupled with the cloud computing system 4820. In an example, a machine module 4810 receives information from, or senses information about, at least one asset member of the asset community, and configures the received information for exchange with the cloud computing system 4820. In an example, the machine module 4810 is coupled to the cloud computing system 4820 or to an enterprise computing system 4830 via a communication gateway 4805.

In an example, the communication gateway 4805 may include or may use a wired or wireless communication channel that extends at least from the machine module 4810 to the cloud computing system 4820. The cloud computing system 4820 may include several layers, for example, a data infrastructure layer, a cloud foundry layer, and modules for providing various functions. In FIG. 48, the cloud computing system 4820 includes an asset module 4821, an analytics module 4822, a data acquisition module 4823, a data security module 4824, and an operations module 4825, but the embodiments are not limited thereto. Each of the modules includes or uses a dedicated circuit, or instructions for operating a general purpose processor circuit, to perform the respective functions. In an example, the modules 4821-4825 are communicatively coupled in the cloud computing system 4820 such that information from one module can be shared with another. In an example, the modules 4821-4825 are co-located at a designated datacenter or other facility, or the modules 4821-4825 can be distributed across multiple different locations.

An interface device 4840 (e.g., user device, workstation, tablet, laptop, appliance, kiosk, and the like) can be configured for data communication with one or more of the machine module 4810, the gateway 4805, and the cloud computing system 4820. The interface device 4840 can be used to monitor or control one or more assets. As another example, the interface device 4840 may be used to develop and upload applications to the cloud computing system 4820. As another example, the interface device 4840 may be used to access analytical applications deployed on the cloud computing system 4820. In an example, information about the asset community 4801 may be presented to an operator at the interface device 4840. The information about the asset community may include information from the machine module 4810, information from the cloud computing system 4820, and the like. The interface device 4840 can include options for optimizing one or more members of the asset community based on analytics performed at the cloud computing system 4820.

FIG. 48 further includes the device gateway 4805 configured to couple the asset community to the cloud computing system 4820. The device gateway 4805 can further couple the cloud computing system 4820 to one or more other assets or asset communities, to the enterprise computing system 4830, or to one or more other devices. The AMP 4800 thus represents a scalable industrial solution that extends from a physical or virtual asset (e.g., the UAV 4801) to a remote cloud computing system 4820. The cloud computing system 4820 optionally includes a local, system, enterprise, or global computing infrastructure that can be optimized for industrial data workloads, secure data communication, and compliance with regulatory requirements.

The cloud computing system 4820 can include the operations module 4825. The operations module 4825 can include services that developers can use to build or test Industrial Internet applications, and the operations module 4825 can include services to implement Industrial Internet applications, such as in coordination with one or more other AMP modules. In an example, the operations module 4825 includes a microservices marketplace where developers can publish their services and/or retrieve services from third parties. In addition, the operations module 4825 can include a development framework for communicating with various available services or modules. The development framework can offer developers a consistent look and feel and a contextual user experience in web or mobile applications. Developers can add and make accessible their applications (services, data, analytics, etc.) via the cloud computing system 4820.

Information from an asset, about the asset, or sensed by an asset itself may be communicated from the asset to the data acquisition module 4823 in the cloud computing system 4820. In an example, an external sensor can be used to sense information about a function of an asset, or to sense information about an environment condition at or near an asset. The external sensor can be configured for data communication with the device gateway 4805 and the data acquisition module 4823, and the cloud computing system 4820 can be configured to use the sensor information in its analysis of one or more assets, such as using the analytics module 4822. Using a result from the analytics module 4822, an operational model can optionally be updated, such as for subsequent use in optimizing the first UAV 4801 or one or more other assets, such as one or more assets in the same or different asset community. For example, information about the UAV 4801 can be analyzed at the cloud computing system 4820 to inform selection of an operating parameter for a remotely located second UAV that belongs to a different asset community.

The cloud computing system 4820 may include a Software-Defined Infrastructure ("SDI") that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 4820 may be based on Cloud Foundry ("CF"), an open source Platform as a Service ("PaaS") that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 4820 can include a data services module that can facilitate application development. For example, the data services module can enable developers to bring data into the cloud computing system 4820 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 4820. A special emphasis may be placed on time series data, as it is the data format that most sensors use.

Security can be a concern for data services that exchange data between the cloud computing system 4820 and one or more assets or other components. Some options for securing data transmissions include using Virtual Private Networks ("VPN") or a Secure Sockets Layer/Transport Security Layer ("SSL/TLS") model. In an example, the AMP 4800 can support two-way TLS, such as between a machine module and the security module 4824. In an example, two-way TLS may not be supported, and the security module 4824 can treat client devices as OAuth users. For example, the security module 4824 can allow enrollment of an asset (or other device) as an OAuth client and transparently use OAuth access tokens to send data to protected endpoints.

The threat detection and neutralization system and method according to various embodiments may be implemented within the security module 4824 stored on the cloud computing system 4820, within the asset, within an intermediate device between the asset and a control system, and the like. As another example, the threat detection and neutralization method may also or instead be implemented elsewhere such as within an asset, within the cloud computing system 4820, within another device within the system, and the like. Raw data may be provided to the cloud computing system 4820 via the assets included in the asset community and accessed by applications deployed on the cloud computing system 4820. During operation, an asset may transmit sensor data to the cloud computing system 4820 and prior to the cloud computing system 4820 storing the sensor data, the sensor data may be filtered using the threat detection and neutralization method described herein.

Figure 49:
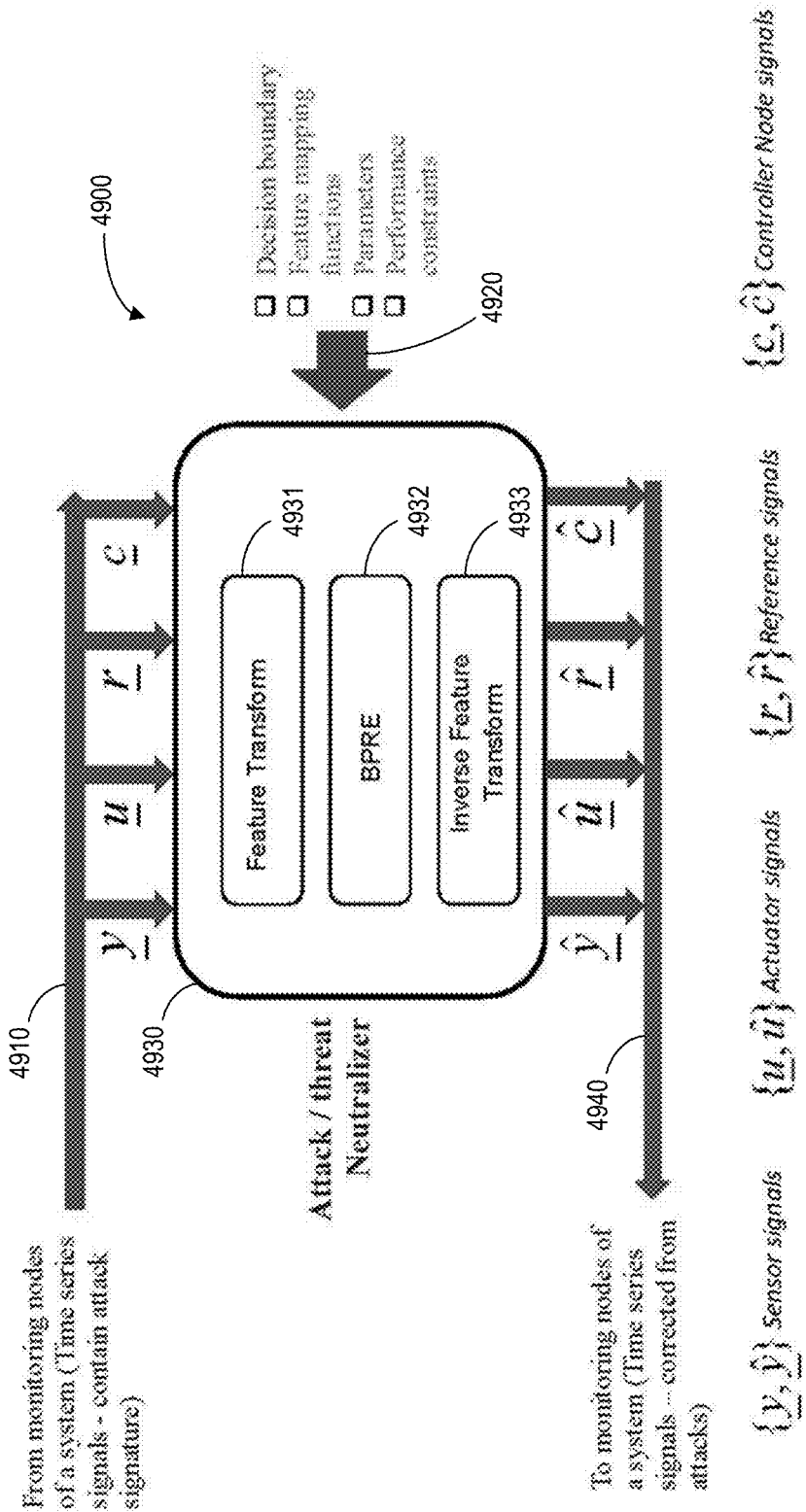
FIG. 49 is a diagram illustrating a threat neutralizer for filtering input signals in accordance with an example embodiment.

FIG. 49 illustrates 4900 a threat neutralizer 4930 for filtering input signals in accordance with an example embodiment. The threat neutralizer 4930 may be implemented within an asset or a device associated therewith, within a control system or a device associated with or coupled to the control system, within a cloud platform, within an intermediate device, and the like. There is no limitation on a location of the threat neutralizer 4930. The threat neutralizer 4930 may receive signals that have been sensed from or about an asset such as a UAV, a drone, and the like. The threat neutralizer 4930 receives at least one input signal 4910 that includes time series data. The time series data may include measurements or other readings captured at various time intervals. Examples of time series data include speed, intensity, acceleration, weight, force, thrust, and the like.

When deployed and operating, assets may be attacked or otherwise compromised. As a result, the data received from an asset (e.g., input signals 4910) may be faulty or otherwise inaccurate. There are many different types of attacks that an asset system may be subjected to such as espionage attacks, denial of service attacks, deception attacks (e.g., covert/stealthy attack), zero dynamics attack, false data injection attack, replay attack, and the like, which are just a short sampling of potential threats that exist. Present information technology and operational technology approaches do not adequately protect the system automatically. In contrast, as further described herein, the threat neutralizer 4930 may automatically detect and neutralize the effects of an attack within an input signal 4910 just as a human immune system is capable of detecting and neutralizing an infection or other disease.

As an example, the threat neutralizer 4930 may be included in a general system such as a cyber-physical system, a software system, a bio-mechanical system, a network system, a communication system, and/or the like, which contains access to continuous stream of data in the form of time series signals. The time series signals may be generated from output sensor nodes (e.g., physical and/or virtual sensors), actuator nodes (e.g., hard and/or soft actuators generated from open or closed loop system), controller nodes (e.g., controller node signals), reference nodes (e.g., reference signals), and the like. In some examples, logical signals may also be considered as time series signals. A total number of signals that may be used for providing immunity to a system may be equal to a total number of nodes that exist in sensors, actuators, controllers and reference nodes, or it may be more or less nodes. Some or all combinations of these nodes can be used for monitoring and neutralization.

In the example of FIG. 49, the threat neutralizer 4930 includes multiple computational blocks including a feature transform 4931, a BPRE 4932, and an inverse feature transform 4933, which are further described herein. Using a dynamic or a static model obtained through system identification or other known modeling methods, the BPRE 4932 is designed to compute an estimate of the true value of the feature vector under adversarial attacks. The computational elements inside the threat neutralizer 4930 may thus act as a filter to remove attack signatures present in each node. As a result, an output signal 4940 (or neutralized signals) may contain true estimates of signals at these nodes for use with the rest of the system for operational normalcy. In this example, y corresponds to a sensed signal, u corresponds to an actuator signal, c corresponds to a control node signal, and r corresponds to a reference signal. These are vectors of such signals. For convenience, underscores from each vector are removed.

Feature Transform:

For a given scenario, time series signals (e.g., ~45 seconds) may be captured and pre-processed. These signals may be processed by the feature transform 4931 into feature extraction algorithms (e.g., principal component analysis) to reduce the dimensionality or order of the system. For example, time series data from sensor nodes may be converted into feature vectors. The procedure is same for all other signals. When principal components are used as features as in the current implementation, weights become the features in reduced dimensions within the feature space. In the pre-processing step performed by the feature transform 4931, temporal normalization of node data may be performed. As an example, when principal components are used as features, the normalized output may be expressed as a weighted linear combination of basis functions. In this feature extraction algorithm, weights are considered as features for y.

$$y = y_0 + \sum_{j=1}^{M} w_j \psi_j \qquad \text{Equation 1}$$

$$w_j = \psi_j^T (y - y_0)$$

In this example, $y_0$=average sensor output, $w_j$=jth weight (i.e., PCA feature), and $\psi_j$=jth basis vector. Because of the orthonormal nature of the basis vectors, each feature may be computed using Equation 1 shown above. The basis vectors can be obtained using ensemble data set from the system collected over time (i.e., historical data) or with perturbations on a virtual model (e.g., digital twin) of the asset.

System Identification (Dynamic Modeling):

Under normal operation, features are extracted from overlapping batch of a time series data by the feature transform unit 4931. The process may be continued by the feature transform unit 4931 over each overlapping batch resulting in a new time series of feature evolution in the feature space. Then, the feature time series are used for performing system identification (i.e., dynamic modeling). A selected subset of the features may be used for dynamic modeling using state space system identification methods. For example, in a UAV system, out of 15 PCA features for each sensor node, 5 PCA features may be used.

The dynamic models are in the state space format. The dynamic modeler may use multivariate Vector Auto-Regressive ("VAR") model for fitting dynamic models into feature time series data. If this approach is not adequate, another model may be used such as a tuned feature-based digital twin model, or a static model computed from feature evolution data or a priori to obtain various matrices representing state space form (i.e., system matrix, control matrix, output matrix and feedforward matrix; i.e., {A, B, C} matrices). In the example of a UAV system, the time-series evolution of the features may be modeled using the following state-space dynamics:

$$x(k+1) = Ax(k) + b$$

$$y(k) = Cx(k) + e(k) \qquad \text{Equation 2}$$

In the example of Equation 2, $e(k)$ is the attack component of the "measured" feature vector, $y(k)$. Here, $x(k)$ is the "true" feature vector to be determined. System matrix, A, control vector, b, and output matrix, C, are computed offline using experimental and simulated data and may be updated in real-time using real-time features obtained from actual sensor measurements.

Boundary and Performance Constrained Resilient Estimator (BPRE):

The example embodiments attempt to estimate true states using a modified resilient estimator called BPRE 4932. Using a model represented by the operator, $\Omega(A, b, C)$, such as for the example state-space model shown above in Equation 2, the BPRE 4932 is designed to estimate the true value of the feature vector under adversarial attacks. The BPRE 4932 is a resilient estimator that may solve the following optimization problem:

$$\underset{x_k \in \mathbb{R}^n, k \in \{1, \ldots, T\}}{\text{minimize}} \sum_{k=1}^{T} \| y_k - \Omega(A, b, C) x_k - y_b \|_q + \qquad \text{Equation 3}$$

$$\frac{1}{2} \rho \sum_{j=1}^{T-1} \| x_j^{prev} - x_j \|_2^2$$

subject to $$\text{score}(x_k, p_1) \leq -\epsilon$$

$$|f(x_k, p_2)| \leq \varepsilon$$

for $k \in \{1, \ldots, T-1\}$

Figure 50:
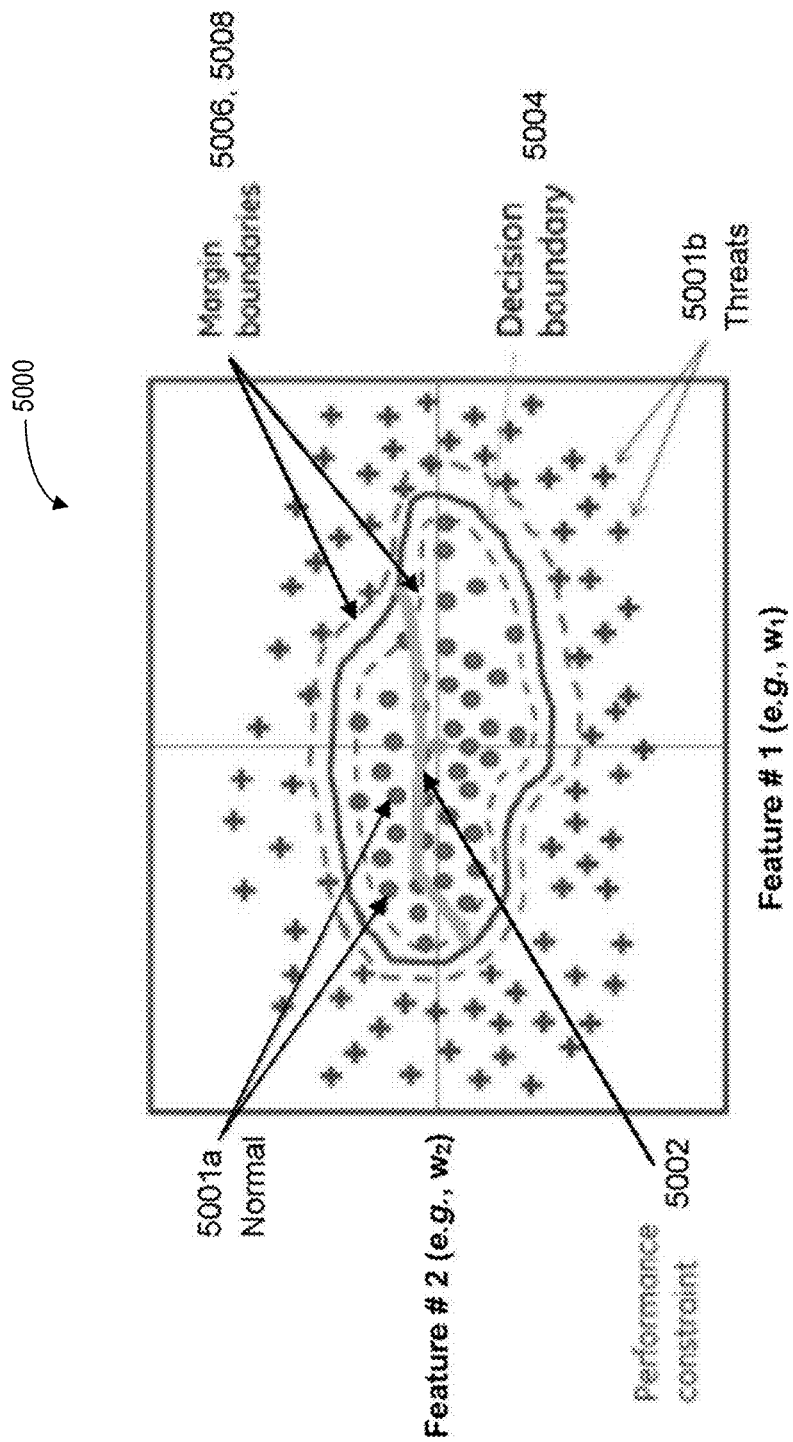
FIG. 50 is a diagram illustrating a boundary and performance estimation process for threat detection in accordance with an example embodiment.

In this example, $y_k$ is the sequence of measured/observed values, $x_k$ is the feature vector in the current time step, $x_k^{prev}$ is the feature vector in the previous time step, $\Omega(A, b, C)$ is an operator representing state space model or a transfer function from the feature space to the signal space. $p_1$ and $p_2$ are respective parameter values for the boundary and invariance relationship. q is used to describe optimization approach such as $l_1$ when q=1, $l_2$ when q=2 well-known in the optimization literature. The first constraint in the optimization may ensure that the final estimate falls within the safety envelop with some factor of safety given by $\in$ which can be an arbitrary positive number, or something more intuitive like the distance of the farthest support vector from the multi-dimensional decision boundary. The BPRE 4932 may compute a threat/attack boundary and also compute a performance constrained resilient estimator from the normal data values received historically from the asset. FIG. 50 illustrates conceptually an example of a boundary and performance estimation process for threat detection in accordance with an example embodiment. In the example of FIG. 50, a graphical view 5000 of the boundary constraint is shown with inner margin boundary 5006 specified by positive $\in$. Negative $\in$ represents outer margin boundary 5008. Also, $\in$=0 represents hard decision boundary 5004. The "score" function in Equation 3 depends on a particular algorithm used to learn the safety envelop. For instance:

$$\text{score}(x, p) = \phi(x)^T p_{[1]} + p_0 \qquad \text{Equation 4}$$

Equation 4 defines the safety envelop obtained using a Support Vector Machine ("SVM") with kernel function $\phi(.)$. The second constraint is related to achieving normal performance by the system. Here, the ensuing solution may satisfy an implicit invariance relationship inherent to the system that was operating normally and is shown graphically in FIG. 50 by a thick curve 5002 inside the normal operating space. This constraint is termed "performance constraint" and may be required during optimization. The value E is used to capture the uncertainty due to noise in the system. For example, in the case of PCA, the invariance relation is captured by the singular vectors corresponding to the smallest singular values of the feature covariance of data matrix. For example, let $Y = [y_i \ldots y_r]$ be the data matrix constructed using ensemble data set from the system collected over time (i.e., historical data) or with perturbations on digital twin models of the asset with each row being the corresponding instantaneous time-series measurement. Then the invariance relationship is captured by the linear inequality $l \leq VY \leq u$, where (l, u) are the minimum and maximum values in the matrix VY and the columns of V are the singular vectors of $Y^T Y$ corresponding to the smallest singular values.

In FIG. 50, the feature vectors corresponding to normal operating signals 5001*a* are not considered potential threats while the feature vectors positioned outside the boundary 5004 are considered threats 5001*b* or attack signals. These points outside the boundary may also be referred to as attack points 5001*b*. These attack points may be due to cyberattacks moving the previously normal feature vectors represented by points anywhere near or on the normal performance region 5002 to anywhere to the attack region designated by points 5001b. Referring now to both FIGS. 49 and 50, if the feature vectors are outside the boundary 5004, indicating an abnormal event 5001b, the BPRE estimator 4932 can find an estimate of the feature vector along performance constraints inside the boundary 5004 that preserves the normal operation of the asset with respect to the control system or other device connected to the asset.

The optimization used in Equation 3 contains two weighted objectives. The first objective involves a q-norm (q∈{0, 1, 2, . . . }) of the error between observed and modeled features. Although, q=0 is ideal for this problem, it results in an NP-hard problem. Consequently, in order to have a well-behaved convex program, the value q≥1 may be used, where the particular value used in any case may depend on the desired error characteristics for that case. For instance, the value q=1 may provide the closest approximation to the ideal case but results in a mixed-norm problem while the value q=2 is further from ideal but unifies the norm in the objective and the overall optimization problem is a subclass of the well-known second order cone program. The measured, as well as estimated "true" feature vectors may then be transformed into time series signal by inverting the feature transform.

Inverse Feature Transforms:

When PCAs are used as feature vectors, being a linear transform, inversion can be obtained by the inverse feature transform unit 4933. For example, estimated true features may be used to perform a weighted linear sum of basis vectors and then sum the signals with average sensor output. The inverse feature transform unit 4933 may transform the features obtained from the boundary and performance constrained resilient estimator back to the signal space. In this example, the true signal for normalcy under attack is given by:

$$\hat{y} = y_0 + \sum_{j=1}^{M} \hat{w}_j \psi_j \qquad \text{Equation 5}$$

Where, $\hat{y}$=Estimated sensor time series data; $y_0$=Average sensor output as before, $\hat{w}_j$=$j^{th}$ true feature; $\psi_j$=$j^{th}$ basis vector The BPRE 4932 forces the attacked sensor signals back into the normalcy boundary 5004 which also translates to normal operation of the original system. As a result, neutralized signals 4940 are output from the threat neutralizer 4930. This inversion approach assumes that the feature transform algorithm is well defined and has only trivial kernels (at least injective). The MMMD feature discovery framework may be used to identify knowledge-based, shallow and/or deep learning features. Note that the MMMD feature discovery framework may be associated with feature engineering (e.g., associated with analysis such as batch selection, basis vector computation, feature extraction, dimensionality reduction, etc.) and engineered and dynamic system feature vectors. Knowledge-based feature engineering may use domain or engineering knowledge of the system to create features from different sensor measurements. These features might simply be statistical descriptors (e.g., maximum, minimum, mean, variance, different orders of moments, etc.) calculated over a window of a time-series signal and its corresponding Fast Fourier Transformation ("FFT") spectrum as well. The knowledge-based features might also utilize analysis of the system, such as basis vector decomposition, state estimation, observability matrices, topology matrices, system drone matrices, frequency domain features and system poles and zeros. These analyses may represent a characterization of the system through steady-state, transient, and small signal behaviors. The feature extraction process may be further associated with a shallow feature learning technique, such as unsupervised learning, k-means clustering, manifold learning, non-linear embedding, an isomap method, LLE, PCA as described above in one example, Non-linear PCA, ICA ("Independent Component Analysis"), neural networks, a SOM ("Self-Organizing Map") method, genetic programming, and/or sparse coding. A numerical inversion algorithm may be used to convert true features to their equivalent time series form when the features are not well defined as in the PCA case described above. Furthermore, smoothing of the time series signal from previous batches may be required while performing continuous updates.

Figure 51:
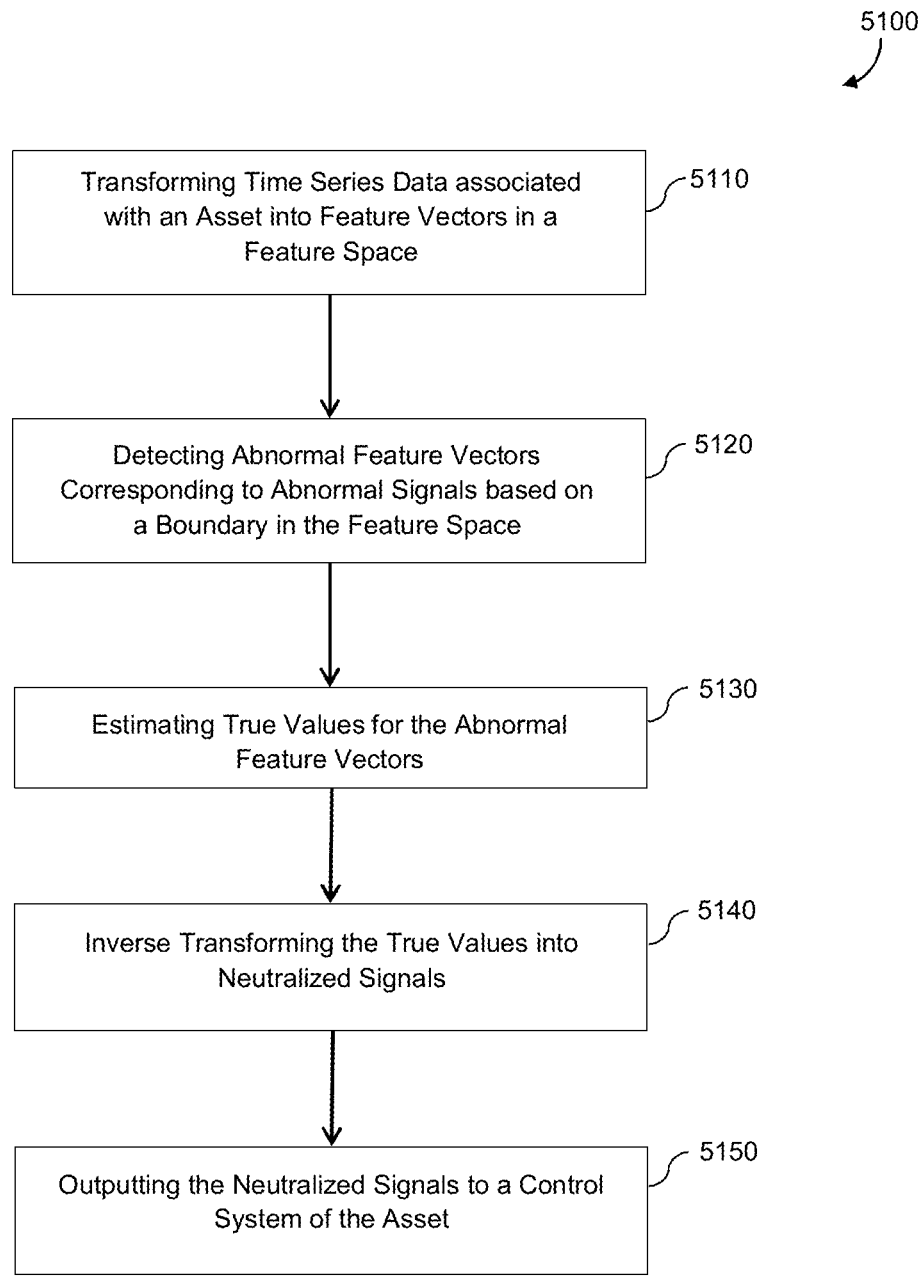
FIG. 51 is a diagram illustrating a method for neutralizing cyber-based threats in accordance with example embodiments.

FIG. 51 illustrates a method 5100 for neutralizing cyber-based threats in accordance with example embodiments. For example, the method 5100 may be performed by the neutralizer 4930 shown in FIG. 49. Referring to FIG. 51, in 5110 the method includes receiving input signals from an asset including time series data associated with the asset and transforming the input signals into feature values in a feature space. The asset may be a physical asset such as a drone. The input signals may include signals related to a physical asset included within an IIoT. Examples of input signals include measured parameters from the asset, control signals, reference signals, and the like. In response to receiving the input signals, the method may transform the input signals from the time domain into the frequency domain. For example, the input signals may be transformed into frequency values such as frequency vectors. The feature vectors may have at least two dimensions (e.g., magnitude, location, time, etc.) and be graphed in a multi-dimensional feature space.

In 5120, the method includes detecting one or more abnormal feature values in the feature space based on a predetermined normalcy boundary associated with the asset. The normalcy boundary may be determined based on historical data (i.e., normal and/or abnormal) data previously received from the asset. In some embodiments, the normalcy boundary may be continually updated based on newly received sensor data from the asset. The abnormal values may be identified based on the position of feature vector in the feature space with respect to the normalcy boundary, also referred to as an attack boundary. In this case, the values plotted inside the boundary may be determined as normal while the values plotted outside the boundary may be determined as abnormal or threats. Here, the detected abnormal feature values may correspond to an attack signal associated with the asset.

In 5130, the method includes determining estimated true feature values (i.e., true feature vector) for each abnormal feature value (i.e., abnormal feature vector). For example, an estimated true feature values in a true feature vector may be determined by masking a portion of the feature vector associated with an attack signal such that the resulting feature vector with feature values is located within the predetermined normalcy boundary in the feature space. In this example, the true feature vector may be an estimate of the true features of normal signal with the attack signal removed. In some examples, prior to determining the true value for a feature vector, the method may include determining that an observability condition (Not shown in Figures) associated with the feature space is satisfied prior to estimating the true value. Examples of estimating the true value in the true feature vector are described with reference to FIGS. 49 and 50. In 5140, the method includes performing an inverse transform of each estimated true feature vector to generate neutralized signals comprising time series data and outputting the neutralized signals, in 5150. For example, the neutralized signals may be output to a control system or another device associated with the asset.

Figure 52:
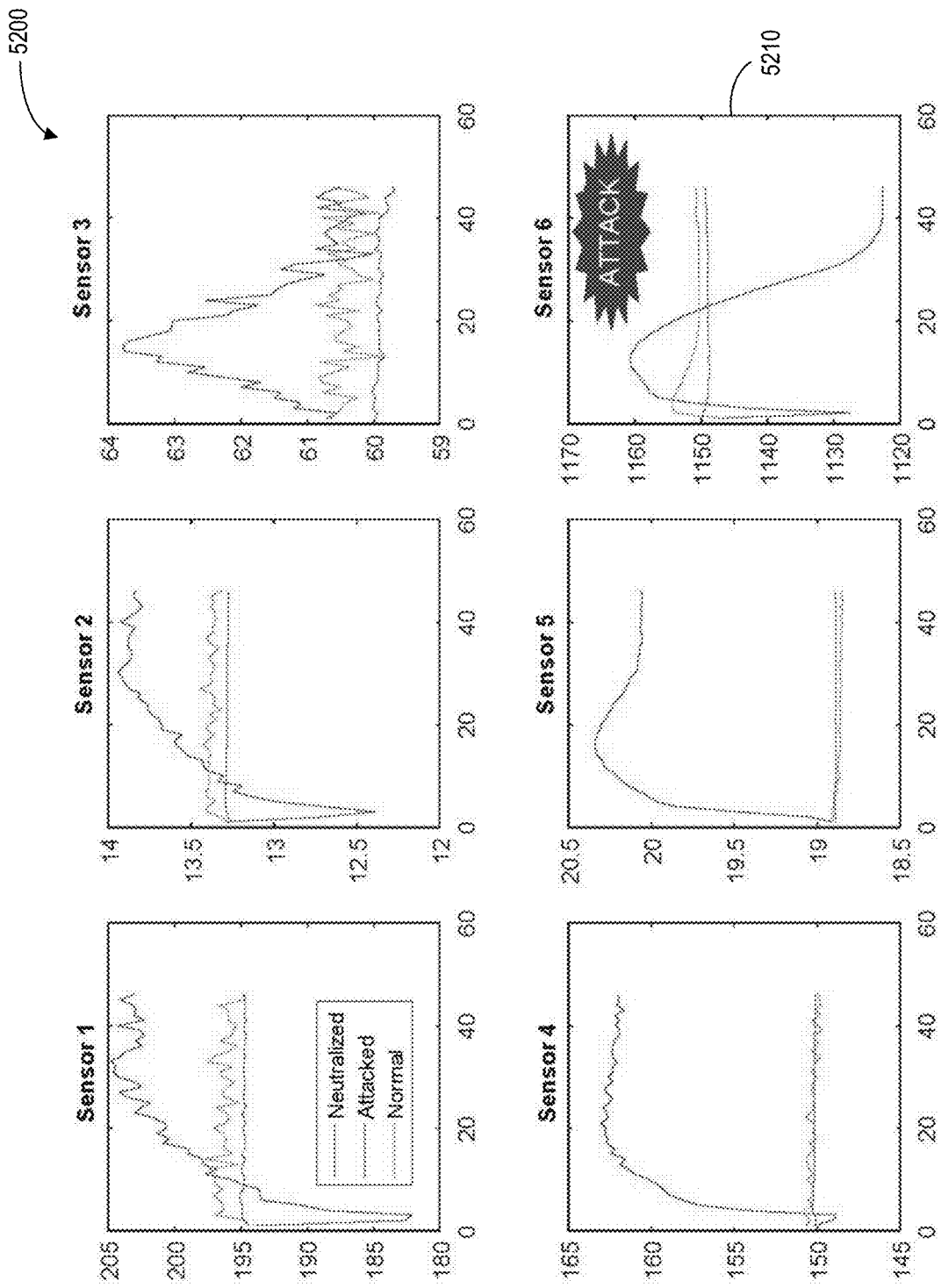
FIG. 52 is a diagram illustrating a computing device for neutralizing cyber-based threats in accordance with an example embodiment.

FIG. 52 illustrates an example 5200 of the simulated performance of a boundary and performance constrained resilient estimator as described above. In this example, 45 seconds of a time series signal is shown for six sensor nodes (sensors 1 to 6). The top signal corresponds to output of sensors during an attack when sensor 610 was subjected to a bias attack. The middle signal of each graph corresponds to the normal operational condition prior to the attack while the bottom signal of each graph corresponds to neutralized signals obtained after processing through techniques described in the example embodiments.

For this example simulation, the system identification in the feature space is not used. Consequently, the parameters of the optimization used are:

$$\Omega(A, b, C) = \begin{bmatrix} \Psi_1 & & \\ & \ddots & \\ & & \Psi_n \end{bmatrix} \Phi \quad \text{Equation 6}$$

$$y_b = y_0 + \begin{bmatrix} \Psi_1 & & \\ & \ddots & \\ & & \Psi_n \end{bmatrix} w_0 \quad \text{Equation 7}$$

Where $\psi_j$=jth basis vector matrix for jth sensor node. n is the total number of sensors. In this example n=6. $\Phi$ is the basis vector matrix for global feature vectors. Global feature vectors are obtained by augmenting feature vectors from each sensor node and then performing dimensionality reduction with further Principal Component Analysis. $w_0$ is the average for global feature vectors. In some cases, $\rho$=0 in equation 3 may be used. After performing optimization true global feature vectors are obtained. They were then transformed to time series using inverse feature transform. Clearly, FIG. 52 shows, neutralized signals generated by BPRE algorithm are inside the attack boundary and is very close to the operational normalcy.

The example embodiments are aimed at going beyond detecting attacks/anomalies. The threat neutralizer described herein provides an automated accommodation when cyber disruptions, such as stealthy attacks occur to a UAV system. Attacks have become very sophisticated and can be challenging to detect because they are multi-prong and not detectible using current fault detection systems. Also, many fault detection systems do not estimate true states for operational normalcy. The boundary and performance constrained resilient estimator included within the threat neutralizer described herein may be able to automatically find true estimates of signals and hence provide adjustments to system operations in response to ongoing attacks while maintaining the operations expected for performance. The threat neutralizer may self-detect attacks and then nullify the attack signatures by finding true value of signals, mechanistically the same way as human immune system does to destroy pathogens.

Figure 53:
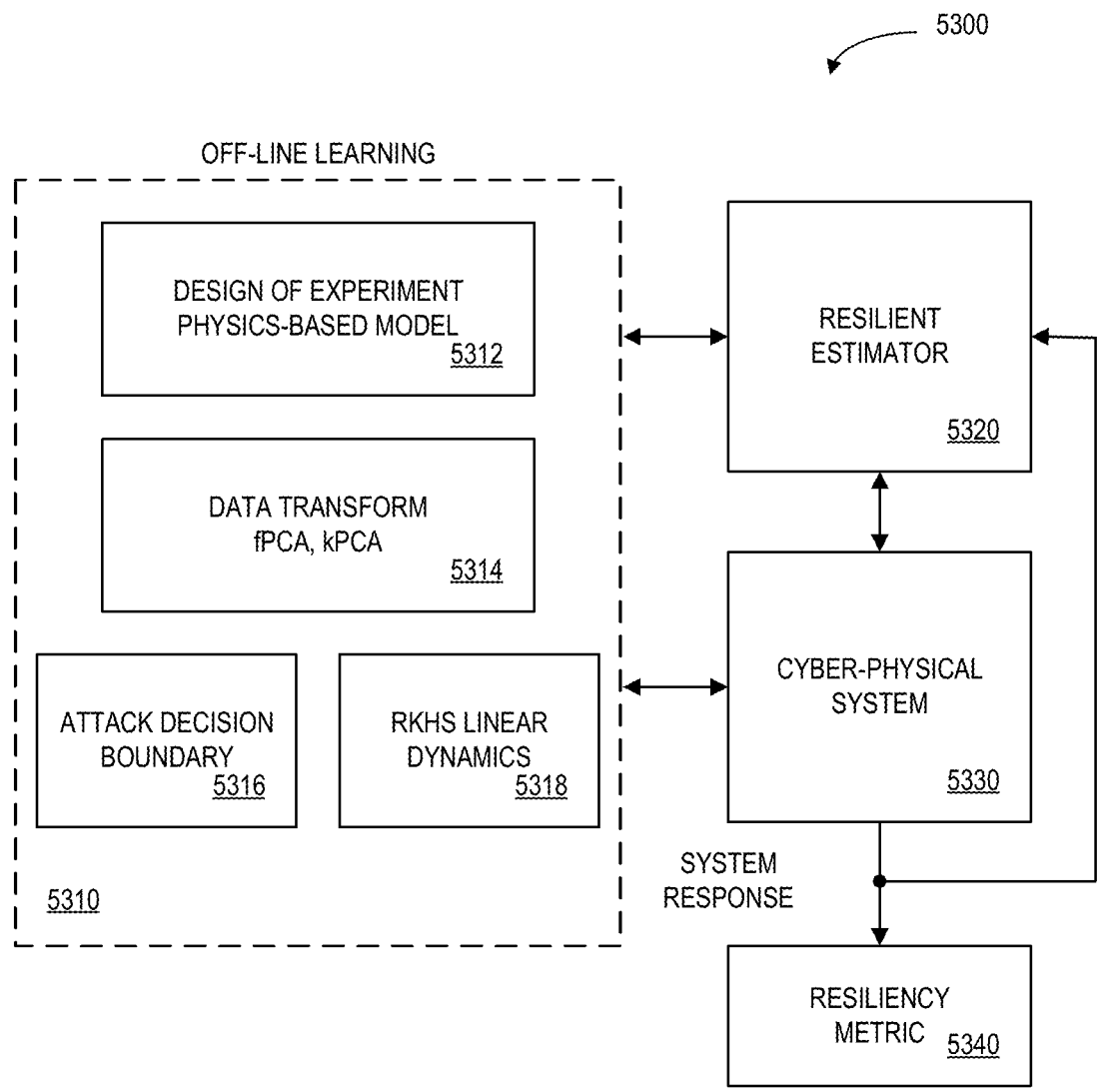
FIG. 53 illustrates a resilient estimator with off-line learning and real-time execution according to some embodiments.

FIG. 53 illustrates 5300 a resilient estimator 5320 with off-line learning 5310 and real-time execution according to some embodiments. The resilient estimator 5320 exchanges information with a Cyber-Physical System ("CPS") and receives system response data (that is also provided to a resiliency metric 5340). The resilient estimator 5320 may be an optimization-based data-driven process that merges results from control theory, compressive sensing, and/or machine learning to provide a framework that enables synergizing important results from the different fields to build resilience against malicious cyber-intruders.

The off-line learning 5310 may include a DoE physics based model, data transformation 5314, an attack decision boundary 5316, and/or Reproducing Kernel Hilbert Space ("RKHS") linear dynamics. Note that a hybrid control systems and machine learning dynamical model may be built to characterize information exchange among the monitoring nodes. According to some embodiments, a dynamical model is built entirely in a RKHS to provide linearity assumptions in a high (possibly infinite) dimensional RKHS. Such an approach may capture nonlinearities in the underlying process and classifiers which are linear in RKHS then thus can be incorporated into the resulting resilient estimator algorithm. The learning process may start by carrying out DoE to collect data that span the operating space of the system. Then an invertible dimensionality reduction may be performed using function Principal Component Analysis ("fPCA"). The reduced dimension data can then be transformed to a high dimensional (possibly infinite) RKHS. Next, a linear transition operator may be learned using a regularized least square optimization. A parameterized lower fidelity model of the UAV system, if available, may be augmented with the learned transition operator. The output equation may be learned the same way. For computational feasibility, the very dimensional RKHS is restricted to finite dimension of a given size using kernel PCA ("kPCA").

At run-time, the resilient estimator 5320 may provide correction for compromised signals. The correction may be obtained by solving an optimization problem which is centered on the classical error correction problem. The attack signals are assumed to be sparse and the decoding operation is that of reconstructing a sparse vector from observation which is cast as a compressive sensing problem. A multi-dimensional decision boundary and various mapping parameters may be input to the resilient estimator which is designed to perform like a filter to remove attack signatures present in each monitoring nodes. At the end, the output may contain true estimates of signals at these nodes for use with the rest of the system for operational normalcy.

The optimization problem may be to minimize lie $\|e\|_{l_0}$ such that $|y-\Phi x-e| \lessapprox \Delta$ and $Px+b \lessapprox 0$, where e is the estimation error, y is the measured vector in signal space (e.g., measurements from sensors, actuators, and reference inputs), $\Phi$ is the global basis matrix used for representing system with global features, x is the global feature vector, P is the unit normal of the hyperplane described by the equation $Px+b$, b is the offset of the hyperplane, and $l_0$ is the $0^{th}$-norm. Note that the solution may identify the minimum number of corrupted nodes under which the observations (y) can be completely explained by the offline model (given by x) up to an accuracy level dictated by the robustness term $\Delta$. Moreover, the resulting state (x) must remain within the safe zone of the boundary given by the hyper plane $Px+b \lessapprox 0$ in restricted RKHS.

Figure 54:
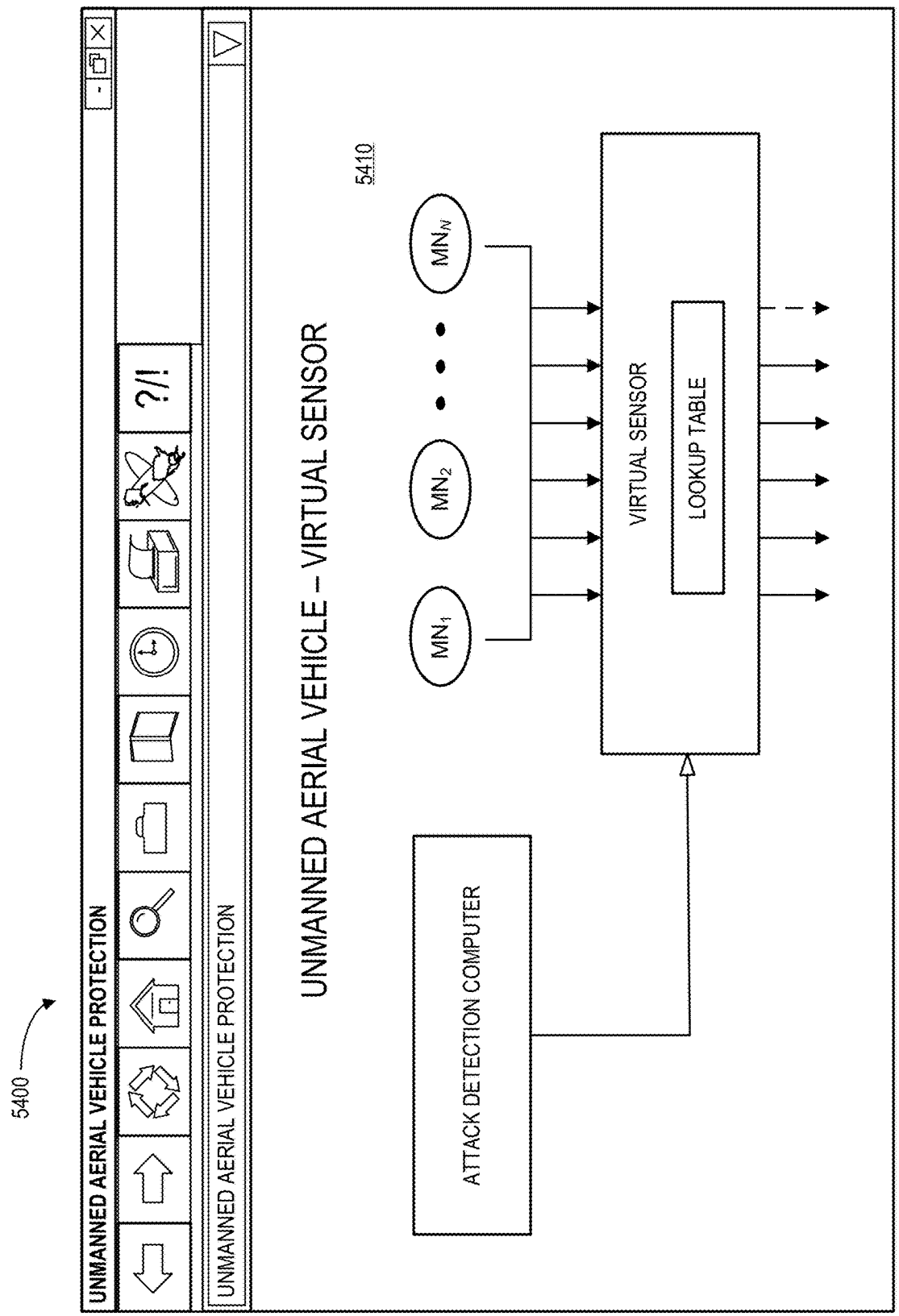
FIG. 54 is a UAV system display in accordance with some embodiments.
Figure 55:
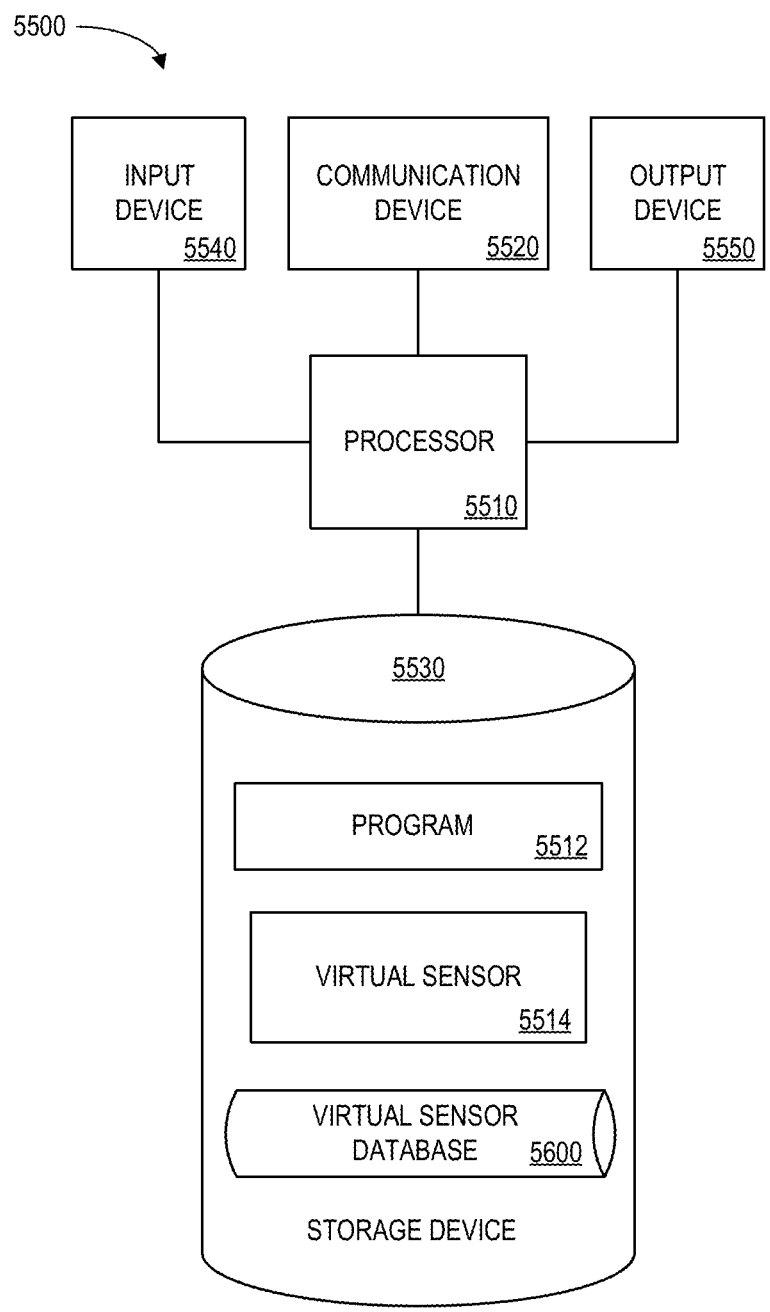
FIG. 55 is a UAV protection platform according to some embodiments.

FIG. 54 is an example of virtual sensor display 5400 that might be used, for example, to provide a graphical depiction 5410 to an operator and/or to provide an interactive interface allowing an operator to adjust virtual sensors as appropriate. Selection of an item on the display 5400 (e.g., via a touchscreen or computer mouse points) may let the operator see more information about that particular item and/or adjust operation of that item (e.g., by replacing actual monitoring node data with virtual sensor data). Note that the embodiments described herein may be implemented using any number of different hardware configurations. For example, FIG. 55 is a block diagram of a UAV system protection platform 5500 that may be, for example, associated with the system 100 of FIG. 1 and/or any other system described herein. The UAV system protection platform 5500 comprises a processor 5510, such as one or more commercially available Central Processing Units ("CPUs") in the form of one-chip microprocessors, coupled to a communication device 5560 configured to communicate via a communication network (not shown in FIG. 55). The communication device 5560 may be used to communicate, for example, with one or more remote monitoring nodes, user platforms, digital twins, etc. The UAV system protection platform 5500 further includes an input device 5540 (e.g., a computer mouse and/or keyboard to input virtual sensor and/or predictive modeling information) and/an output device 5550 (e.g., a computer monitor to render a display, provide alerts, transmit recommendations, and/or create reports). According to some embodiments, a mobile device, monitoring physical system, and/or PC may be used to exchange information with the UAV system protection platform 5500.

The processor 5510 also communicates with a storage device 5530. The storage device 5530 may comprise any appropriate information storage device, including combinations of magnetic storage devices (e.g., a hard disk drive), optical storage devices, mobile telephones, and/or semiconductor memory devices. The storage device 5530 stores a program 5512 and/or a virtual sensor model 5514 for controlling the processor 5510. The processor 5510 performs instructions of the programs 5512, 5514, and thereby operates in accordance with any of the embodiments described herein. For example, the processor 5510 may estimate a series of virtual node values for an attacked monitoring node based on information received from monitoring nodes that are not currently being attacked. The processor 5510 may also replace a series of monitoring node values for the attacked monitoring nodes with the virtual node values.

The programs 5512, 5514 may be stored in a compressed, uncompiled and/or encrypted format. The programs 5512, 5514 may furthermore include other program elements, such as an operating system, clipboard application, a database management system, and/or device drivers used by the processor 5510 to interface with peripheral devices.

As used herein, information may be "received" by or "transmitted" to, for example: (i) the UAV system protection platform 5500 from another device; or (ii) a software application or module within the UAV system protection platform 5500 from another software application, module, or any other source.

In some embodiments (such as the one shown in FIG. 55), the storage device 5530 further stores a virtual sensor database 5600. An example of a database that may be used in connection with the UAV system protection platform 5500 will now be described in detail with respect to FIG. 56. Note that the database described herein is only one example, and additional and/or different information may be stored therein. Moreover, various databases might be split or combined in accordance with any of the embodiments described herein.

Referring to FIG. 56, a table is shown that represents the virtual sensor database 5600 that may be stored at the UAV system protection platform 5500 according to some embodiments. The table may include, for example, entries identifying UAV systems to be protected. The table may also define fields 5602, 5604, 5606, 5608, 5610, 5612 for each of the entries. The fields 5602, 5604, 5606, 5608, 5610, 5612 may, according to some embodiments, specify: a UAV system identifier 5602, a UAV description 5604, a virtual sensor identifier 5606, a matrix 5608, description 5610, and a status 5612. The virtual sensor database 5600 may be created and updated, for example, when a new physical system is monitored or modeled, an attack is detected, etc.

The UAV system identifier 5602 and description 5604 may define a particular drone or system that will be protected. The virtual sensor identifier 5606 might be a unique alphanumeric code identifying a particular sensor being modeled for the UAV system. The matrix 5608 might be associated with a lookup table, the description 5610 might indicate what sensor is being estimated, and the status 5612 might indicate, for example, whether the associated monitoring node is operating normally or is currently undergoing a cyber-attack.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on UAV, any of the embodiments described herein could be applied to other types of autonomous vehicles including cars, submarines, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an Unmanned Aerial Vehicle ("UAV") system, comprising:
   a plurality of monitoring nodes each generating a series of current monitoring node values over time that represent a current operation of the UAV system; and
   an attack detection computer platform, coupled to the plurality of monitoring nodes, to:
      receive the series of current monitoring node values and generate a set of current feature vectors, wherein the set of current feature vectors is generated by processing the series of current monitoring node values via one of: feature transforms, identity transforms and feature-based dynamic models,
      access an attack detection model having at least one decision boundary created using a set of normal feature vectors and a set of attacked feature vectors,
      execute the attack detection model,
      localize an origin of an attack to a particular monitoring node, wherein the localizing is performed in accordance with a time at which a decision boundary associated with one monitoring node was crossed as compared to a time at which a decision boundary associated with another monitoring node was crossed, and transmit an attack alert signal based on the set of current feature vectors and the at least one decision boundary, wherein an indication of the particular monitoring node is transmitted with the attack alert signal.

2. The system of claim 1, wherein at least one of the set of normal feature vectors and the set of attacked feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

3. The system of claim 1, wherein information from each of the plurality of monitoring nodes is normalized and an output is expressed as a weighted linear combination of basis functions.

4. The system of claim 1, wherein the monitoring nodes are associated with at least one of: (i) critical sensor nodes, (ii) actuator nodes, (iii) controller nodes, and (iv) key software nodes.

5. The system of claim 1, wherein the attack detection model including the at least one decision boundary is associated with at least one of: (i) a line, (ii) a hyperplane, and (iii) a non-linear boundary separating normal space and attacked space.

6. The system of claim 1, further comprising:
a normal space data source storing, for each of the plurality of monitoring nodes, a series of normal monitoring node values over time that represent normal operation of the UAV system;
an attacked space data source storing, for each of the plurality of monitoring nodes, a series of attacked node values over time that represent an attacked operation of the UAV system; and
an attack detection model creation computer, coupled to the normal space data source and the attacked space data source, to:
receive the series normal monitoring node values and generate the set of normal feature vectors,
receive the series of attacked monitoring node values and generate the set of attacked feature vectors, and
automatically calculate and output the at least one decision boundary for the attack detection model based on the set of normal feature vectors and the set of attacked feature vectors.

7. The system of claim 6, wherein at least one of the series of normal attack node values and the series of attacked attack node values are associated with a high-fidelity equipment model.

8. The system of claim 6, wherein at least one decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

9. The system of claim 1, wherein the attack detection computer platform is further to:
detect that a particular monitoring node has passed the corresponding decision boundary and classifying that particular monitoring node as being under attack, and
automatically determine if the attack on that particular monitoring node is an independent attack or a dependent attack.

10. The system of claim 9, wherein the automatic determination based at least in part on a causal dependency between the attack on that particular monitoring node and a previously detected attack on another monitoring node, wherein the causal dependency is that the attack on that particular monitoring node is caused by the previously detected attack on another monitoring node.

11. The system of claim 9, wherein the automatic determination is based at least in part on potential fulfillment of a propagation path from another monitoring node where a previous attack was detected.

12. The system of claim 9, wherein the automatic determination is based at least in part on a potential time window and a time when a previously detected attack on another monitoring node was detected.

13. The system of claim 12, wherein the potential time window is based at least in part on a propagation time through a dynamic estimator model.

14. The system of claim 13, wherein the propagation time is based on a number of features, a number of lags in the dynamic estimator model, and a time constant of a control loop responsible for a monitoring node.

15. The system of claim 1, further comprising:
a virtual sensor, coupled to the plurality of monitoring nodes and the attack detection computer platform, to, responsive to an indication that an attacked monitoring node is being attacked:
estimate a series of virtual node values for the attacked monitoring node based on information received from monitoring nodes that are not currently being attacked, and
replace the series of monitoring node values from the attacked monitoring node with the virtual node values.

16. The system of claim 1, wherein the attack detection computer platform is further to:
determine an estimated true value for an abnormal feature value, and
perform an inverse transform of each estimated true value to generate neutralized signals comprising time series data.

17. The system of claim 16, wherein input signals correspond to time series data sensed by sensors associated with an Industrial Internet of Things ("IIoT").

18. The system of claim 1, further comprising:
a resilient estimator implementing an optimization-based data-driven process utilizing Reproducing Kernel Hilbert Space ("RKHS") linear dynamics.

19. The system of claim 18, wherein the optimization process is to minimize:

$$\|e\|_{l_o} \text{ such that } |y-\Phi x-e|\leq\Delta \text{ and } Px+b\leq 0,$$

where e is the estimation error, y is the measured vector in signal space (e.g., measurements from sensors, actuators, and reference inputs), φ is the global basis matrix used for representing system with global features, x is the global feature vector, P is the unit normal of the hyperplane described by the equation Px+b, b is the offset of the hyperplane, and $l_0$ is the $0^{th}$-norm.

20. A method to protect an Unmanned Aerial Vehicle ("UAV") system, comprising:
performing cyber-attack detection for the UAV system including receiving a series of current monitoring node values and generating a set of current feature vectors that represent a current operation of the UAV system, wherein generation of the set of current feature vectors comprises processing the series of current monitoring node values via one of: feature transforms, identity transforms and feature-based dynamic models, and wherein the cyber-attack detection is associated with a plurality of monitoring nodes, each generating the series of current monitoring node values over time that represent the current operation of the UAV system;

accessing an attack detection model having at least one decision boundary created using a set of normal feature vectors and a set of attacked feature vectors;

executing the attack detection model;

performing cyber-attack localization for the UAV system to localize an origin of an attack to a particular monitoring node, wherein the localization is performed in accordance with a time at which a decision boundary associated with one monitoring node was crossed as compared to a time at which a decision boundary associated with another monitoring node was crossed;

transmitting an attack alert signal based on the set of current feature vectors and the at least one decision boundary, wherein an indication of the particular monitoring node is transmitted with the attack alert signal; and performing cyber-attack neutralization for the UAV system.

\* \* \* \* \*